(12) United States Patent
Ichikawa et al.

(10) Patent No.: US 9,602,733 B2
(45) Date of Patent: Mar. 21, 2017

(54) IMAGE FORMING OPTICAL SYSTEM AND ELECTRONIC IMAGE PICKUP APPARATUS USING THE SAME

(71) Applicant: OLYMPUS CORPORATION, Tokyo (JP)

(72) Inventors: Keisuke Ichikawa, Tokyo (JP); Shinichi Mihara, Tokyo (JP)

(73) Assignee: Olympus Corporation, Tokyo (JP)

( * ) Notice: Subject to any disclaimer, the term of this patent is extended or adjusted under 35 U.S.C. 154(b) by 52 days.

(21) Appl. No.: 14/704,632

(22) Filed: May 5, 2015

(65) Prior Publication Data
US 2015/0237266 A1    Aug. 20, 2015

Related U.S. Application Data

(63) Continuation of application No. PCT/JP2013/081527, filed on Nov. 22, 2013.

(30) Foreign Application Priority Data

Dec. 3, 2012  (JP) .................. 2012-264328

(51) Int. Cl.
  *G02B 9/34* (2006.01)
  *H04N 5/232* (2006.01)
  *G02B 15/177* (2006.01)

(52) U.S. Cl.
  CPC ....... *H04N 5/23296* (2013.01); *G02B 15/177* (2013.01)

(58) Field of Classification Search
  CPC ...... G02B 15/177; G02B 13/004; G02B 9/34; H04N 5/23296
  See application file for complete search history.

(56) References Cited

U.S. PATENT DOCUMENTS

| | | | |
|---|---|---|---|
| 6,417,973 B2 | 7/2002 | Mihara et al. | |
| 6,538,824 B1 | 3/2003 | Mihara et al. | |
| 7,042,651 B2 | 5/2006 | Kuba et al. | |
| 7,142,371 B2 | 11/2006 | Mihara | |
| 7,212,242 B2 | 5/2007 | Watanabe et al. | |
| 7,289,152 B2 | 10/2007 | Watanabe et al. | |
| 7,417,684 B2 | 8/2008 | Watanabe et al. | |
| 7,420,611 B2 | 9/2008 | Watanabe et al. | |

(Continued)

FOREIGN PATENT DOCUMENTS

| | | |
|---|---|---|
| JP | 2002-048975 | 2/2002 |
| JP | 2002-365545 | 12/2002 |

(Continued)

OTHER PUBLICATIONS

International Preliminary Report on Patentability, dated Jun. 18, 2015, issued in corresponding International Application No. PCT/JP2013/081527.

(Continued)

*Primary Examiner* — Joseph P Martinez
(74) *Attorney, Agent, or Firm* — Andrews Kurth Kenyon LLP

(57) ABSTRACT

An image forming optical system includes, a negative first lens unit, a positive second lens unit, a negative third lens unit, and a positive fourth lens unit, and the first lens unit either includes a negative lens and a positive lens, or includes a negative lens, a negative lens, and a positive lens, and the second lens unit includes a first lens component and a second lens component, and the second lens component includes a cemented lens, and the third lens unit includes either one lens or two lenses as a whole, and a lens having a curvature of a surface on an image side larger than a curvature of a surface on the object is disposed nearest to an object, and the fourth lens unit includes one positive lens component.

17 Claims, 32 Drawing Sheets

(56) References Cited

U.S. PATENT DOCUMENTS

| | | | |
|---|---|---|---|
| 7,540,671 B2 | 6/2009 | Minakata et al. | |
| 7,573,650 B2 | 8/2009 | Minakata et al. | |
| 7,583,447 B2 | 9/2009 | Minakata et al. | |
| 7,583,448 B2 | 9/2009 | Minakata et al. | |
| 7,633,686 B2 | 12/2009 | Souma | |
| 8,446,512 B2 | 5/2013 | Ichikawa et al. | |
| 8,482,861 B2 | 7/2013 | Tashiro | |
| 8,582,212 B2 | 11/2013 | Ogata et al. | |
| 8,659,836 B2 | 2/2014 | Imaoka | |
| 8,743,471 B2 | 6/2014 | Imaoka | |
| 2005/0030641 A1* | 2/2005 | Kuba | G02B 15/177 359/686 |

FOREIGN PATENT DOCUMENTS

| | | |
|---|---|---|
| JP | 2003-131130 | 5/2003 |
| JP | 2003-140043 | 5/2003 |
| JP | 2005-055496 | 3/2005 |
| JP | 2005-156828 | 6/2005 |
| JP | 2006-208889 | 8/2006 |
| JP | 2008-233611 | 10/2008 |
| JP | 2008-304777 | 12/2008 |
| JP | 2012-022106 | 2/2012 |
| JP | 2012-027262 | 2/2012 |
| JP | 2012-058406 | 3/2012 |
| JP | 2012-133228 | 7/2012 |
| JP | 2012-133230 | 7/2012 |
| JP | 2012-181350 | 9/2012 |

OTHER PUBLICATIONS

Japanese Office Action, dated Jan. 13, 2016, issued in corresponding Japanese Patent Application No. 2014-551033.

International Search Report, dated Jan. 28, 2014, issued in corresponding International Application No. PCT/JP2013/081527.

* cited by examiner

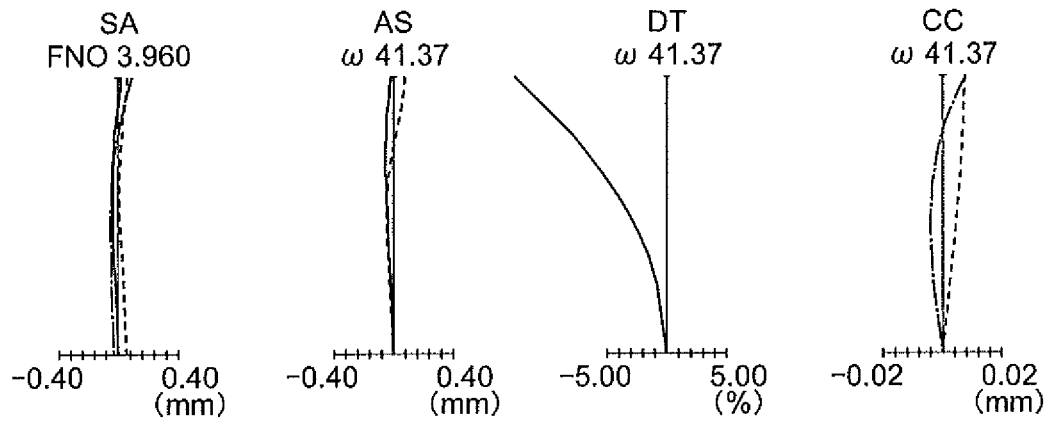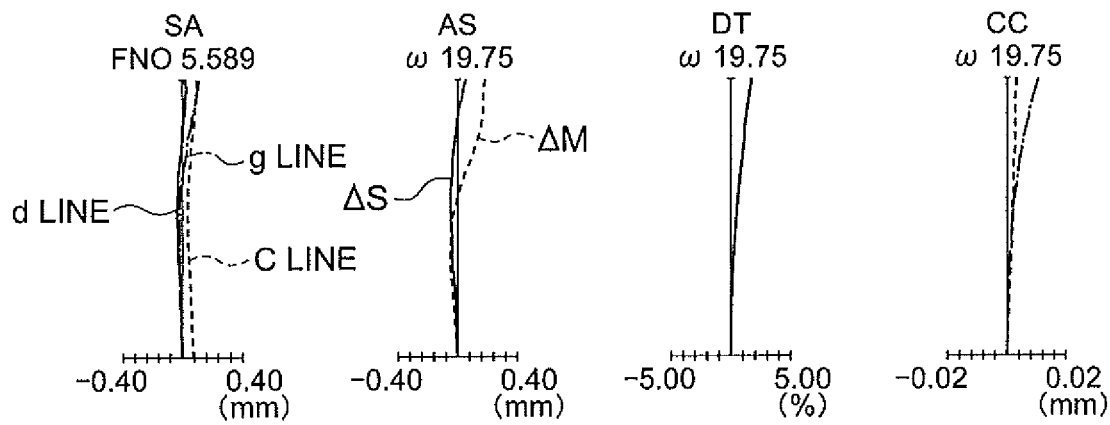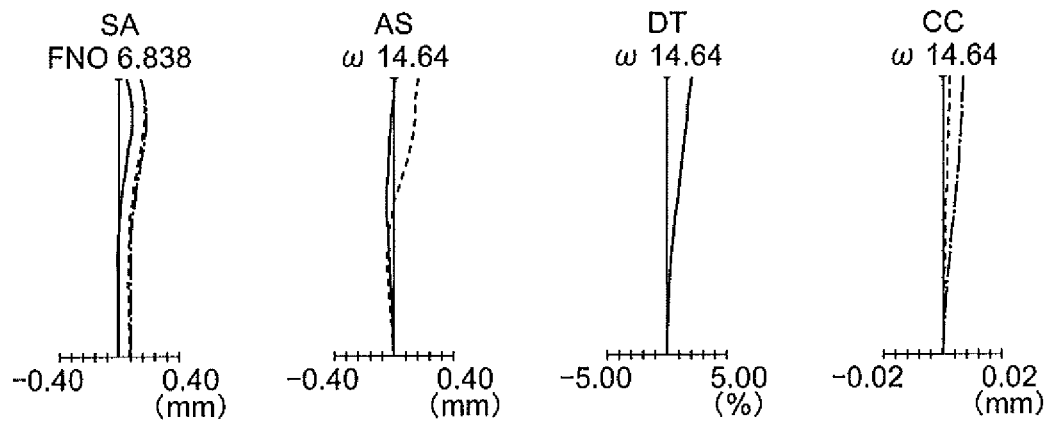

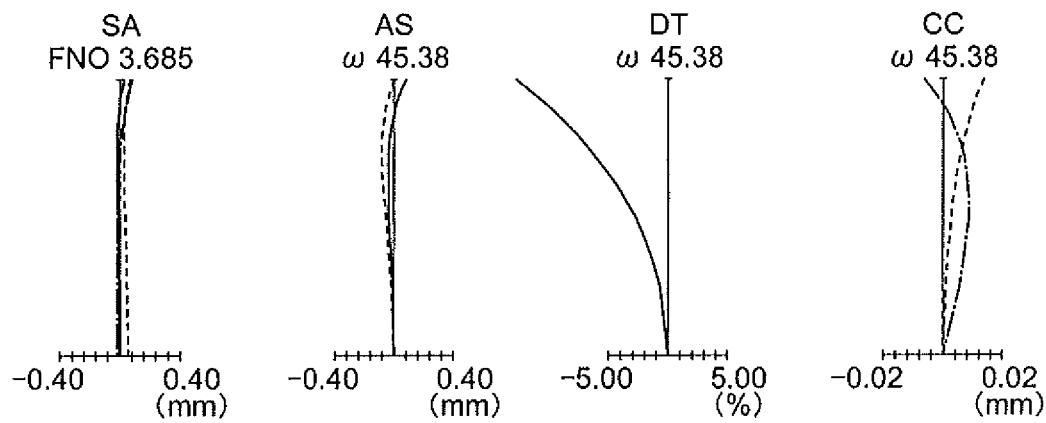
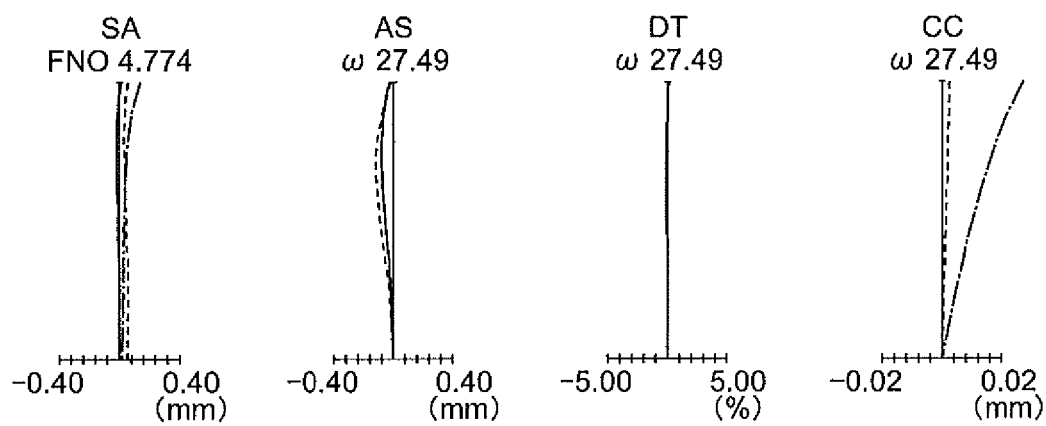
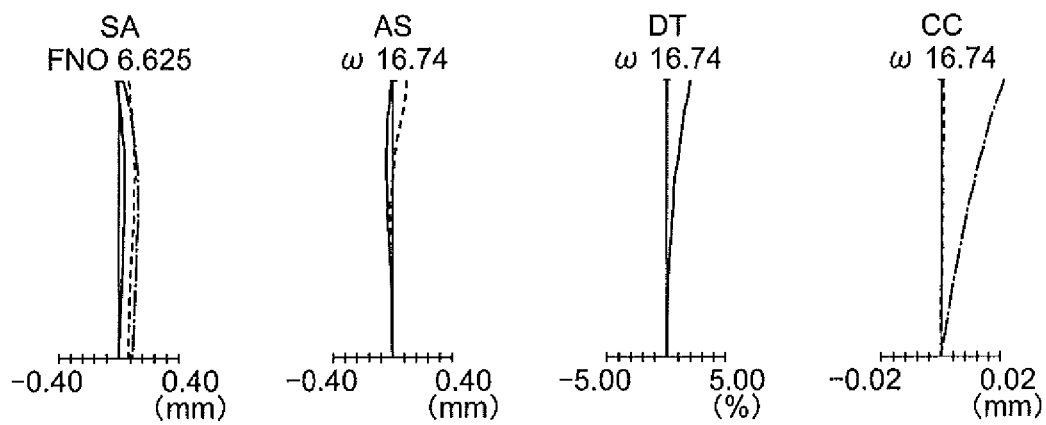

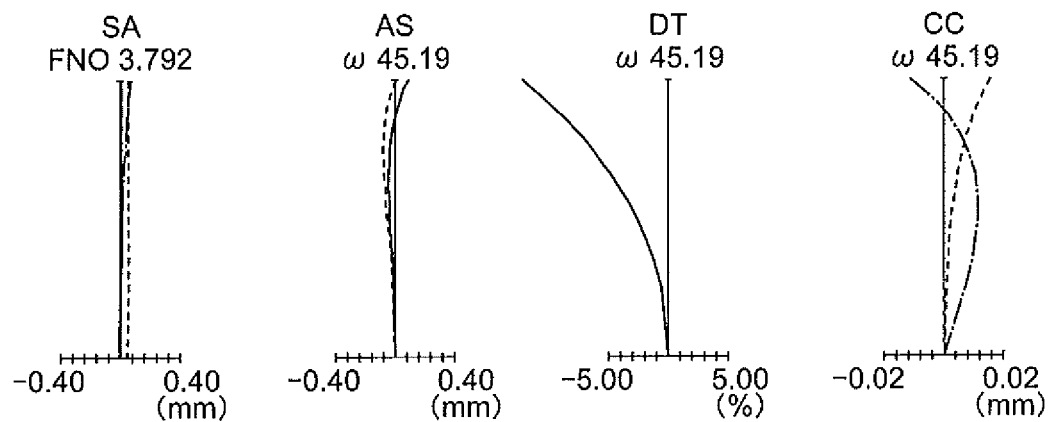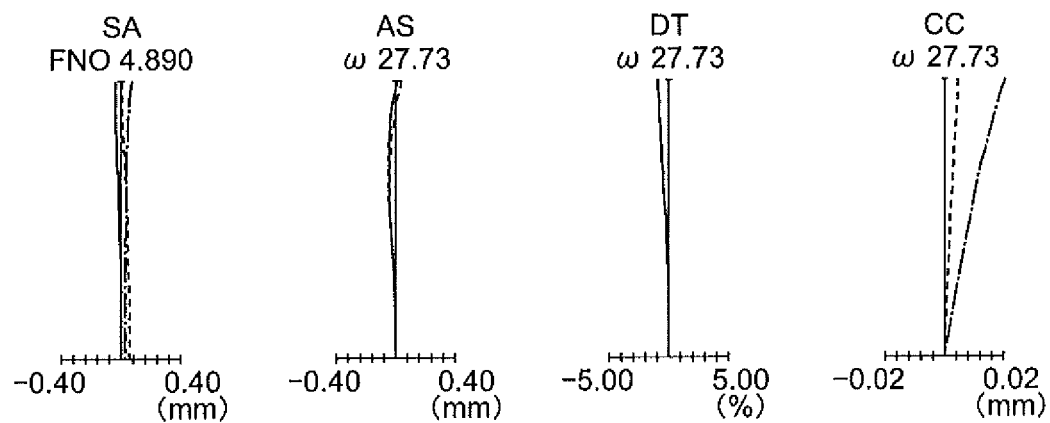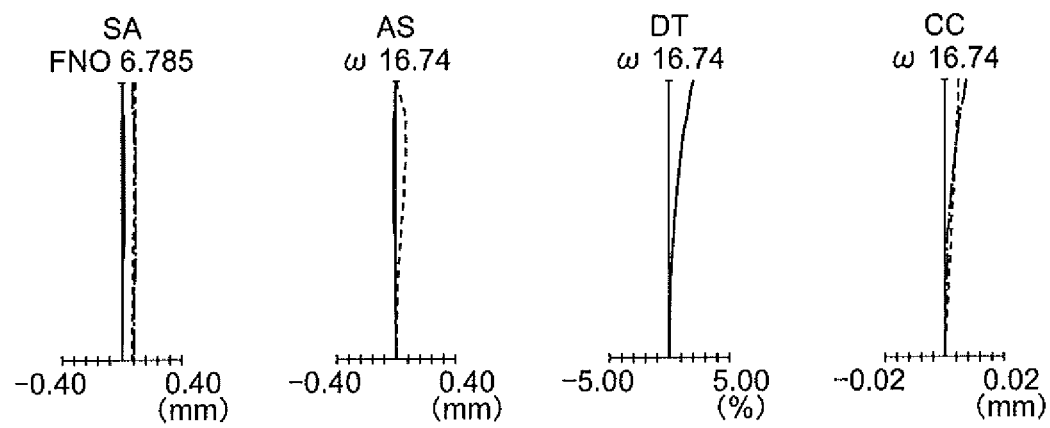

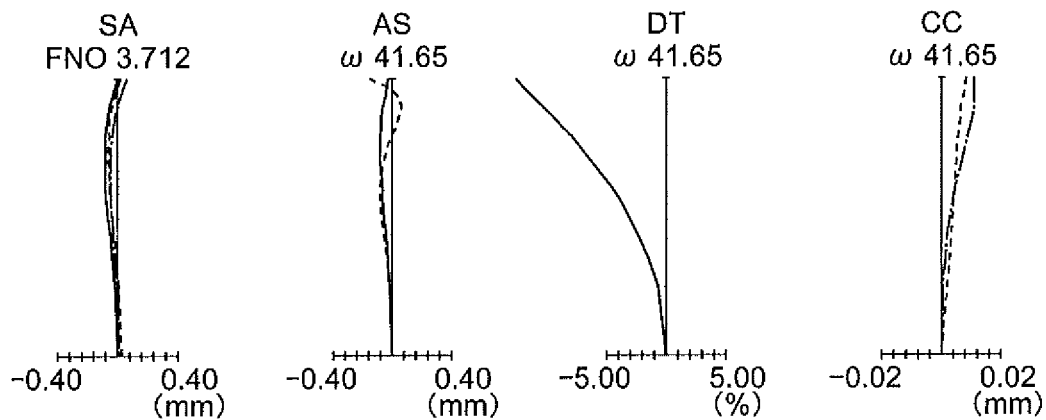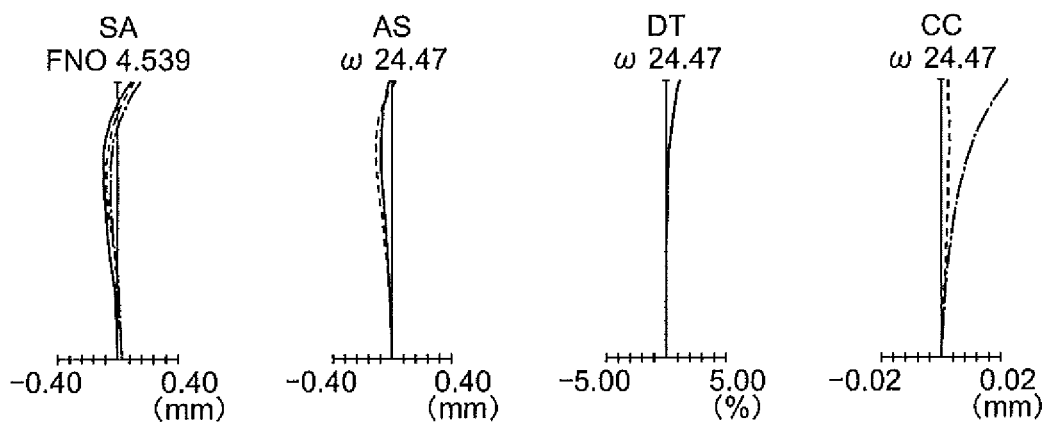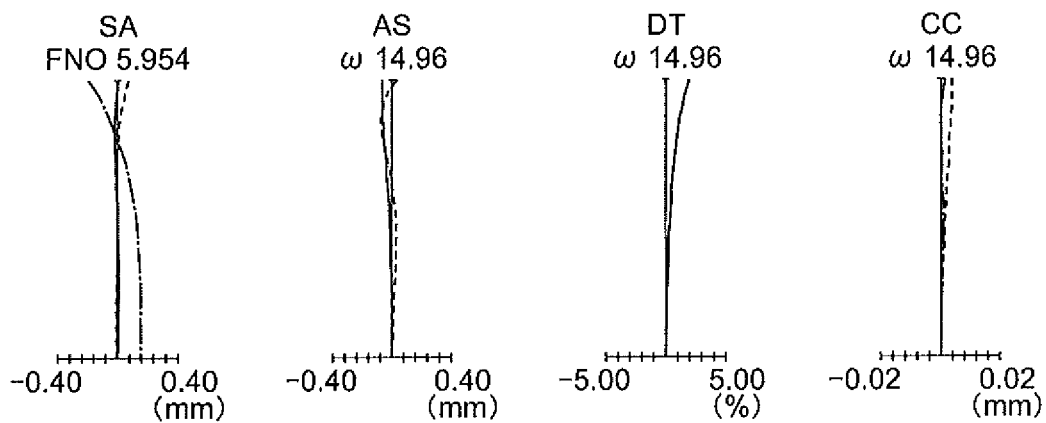

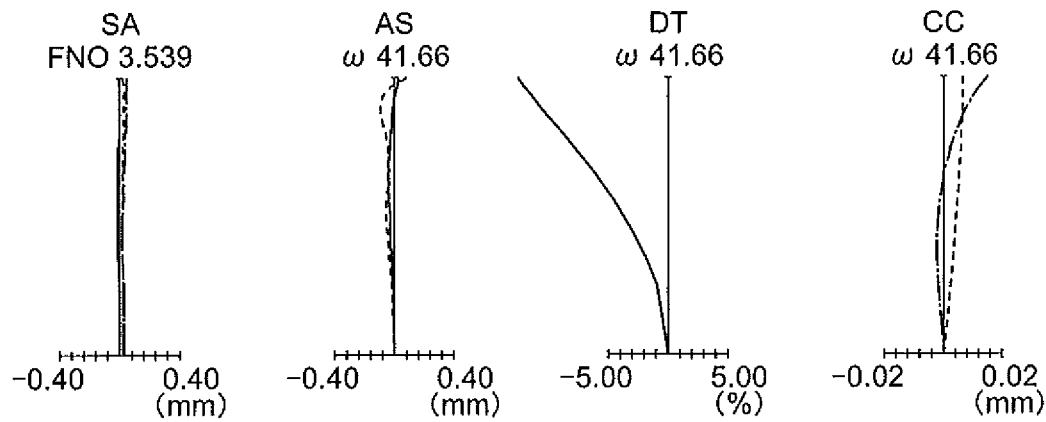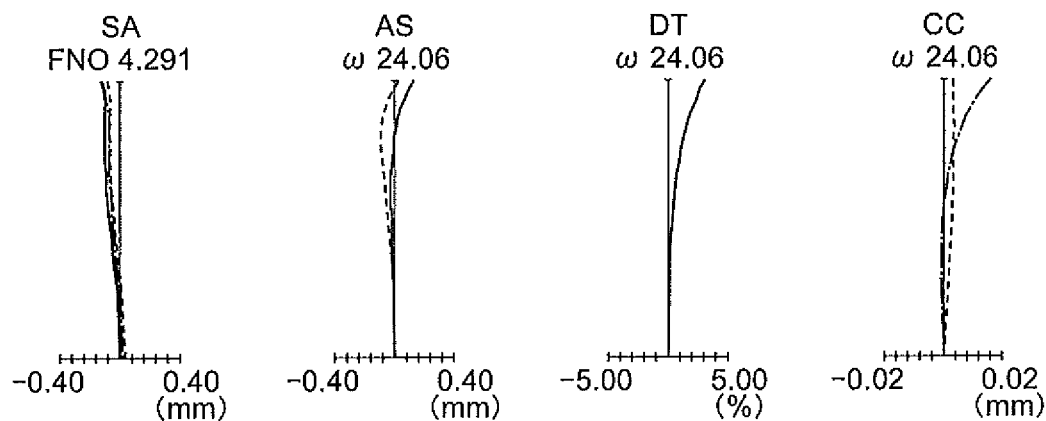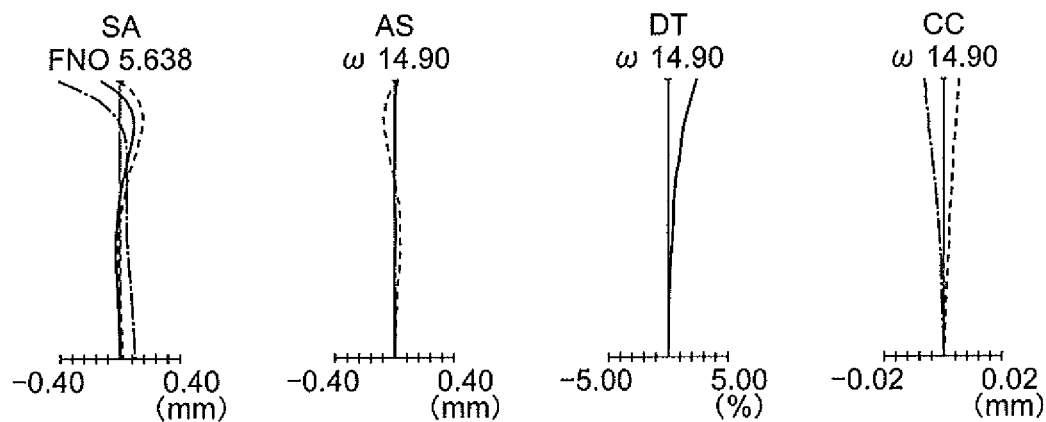

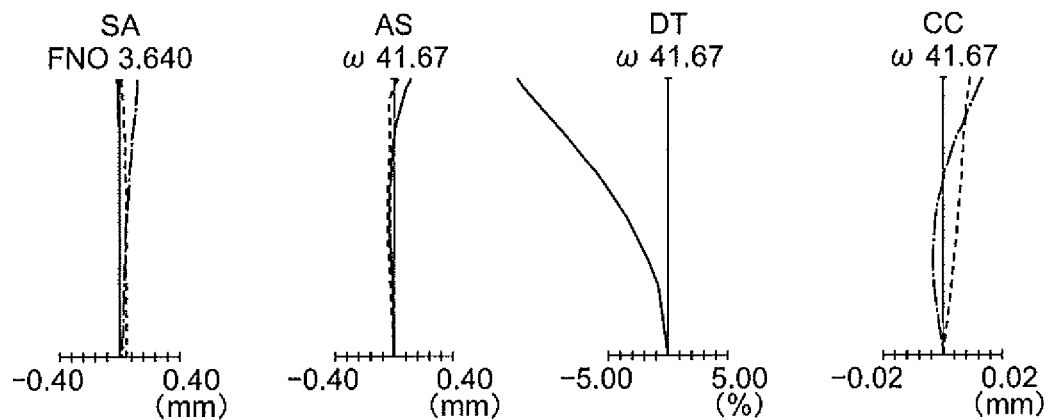
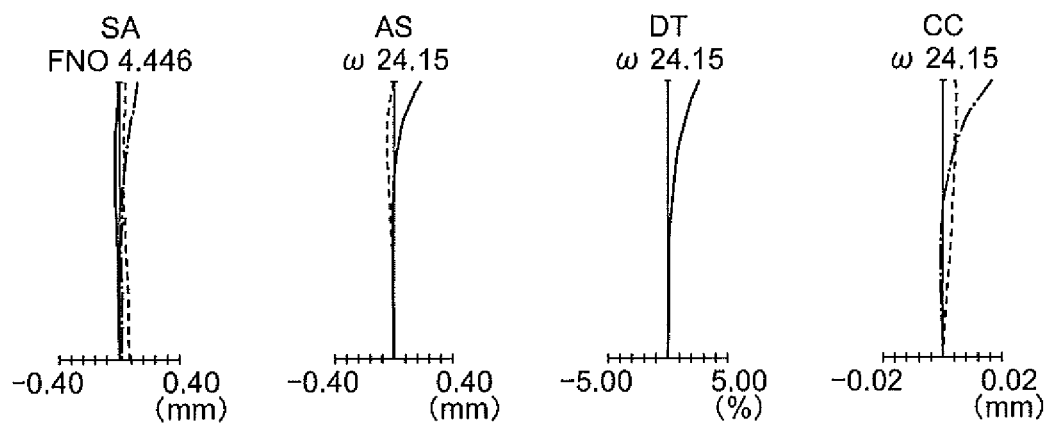
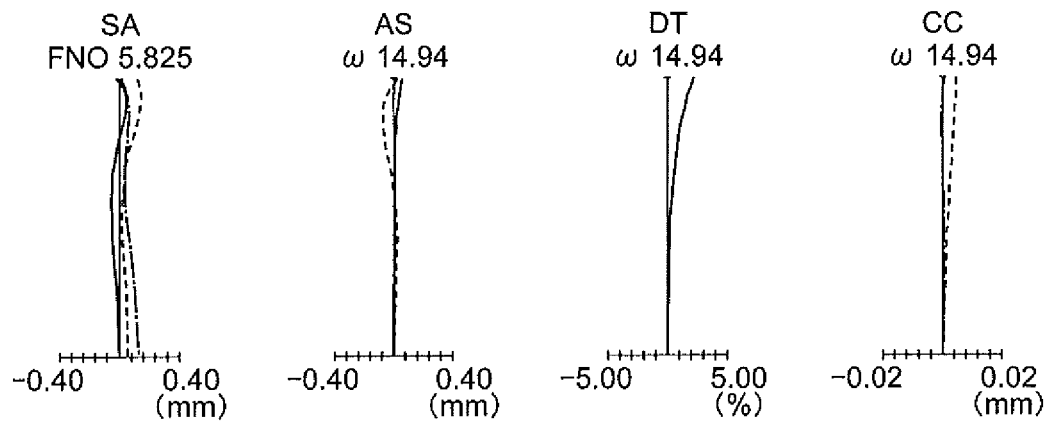

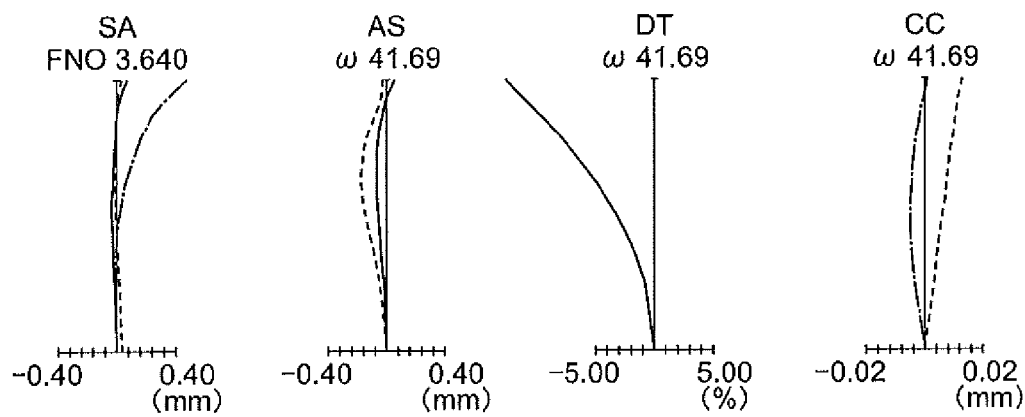
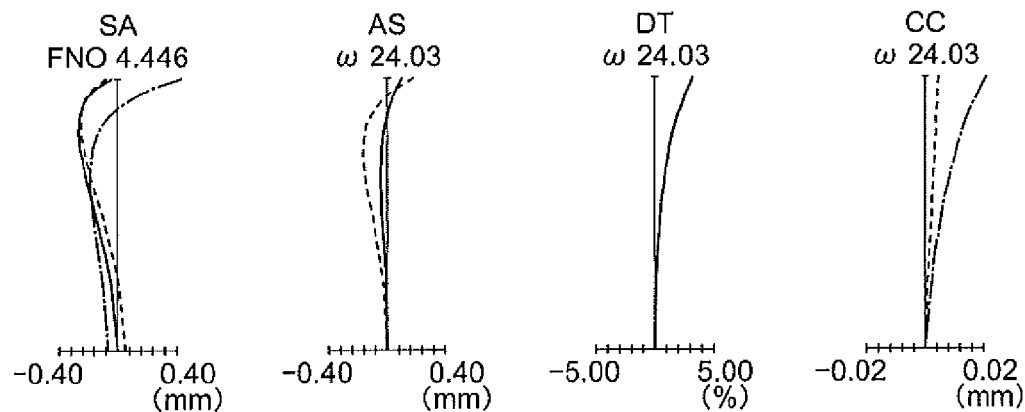
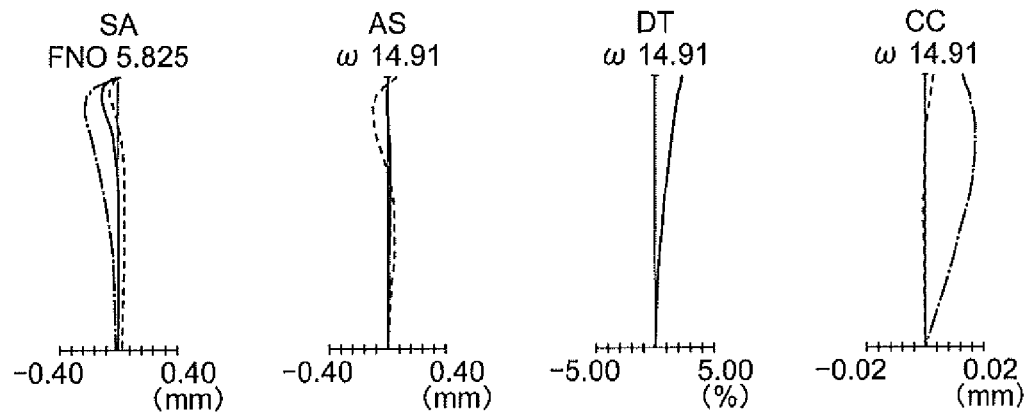

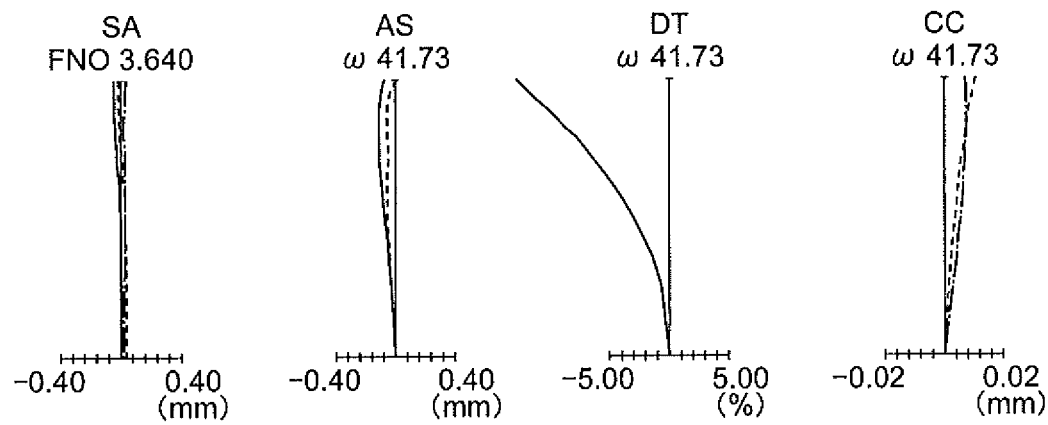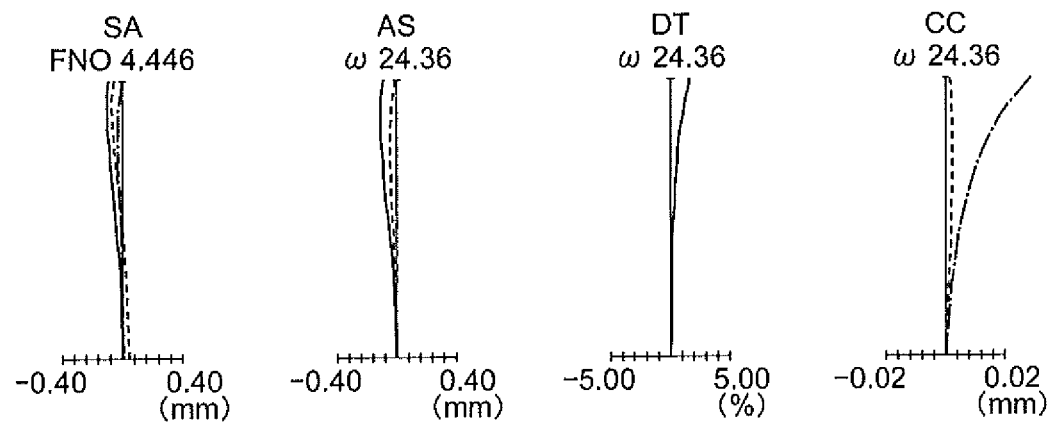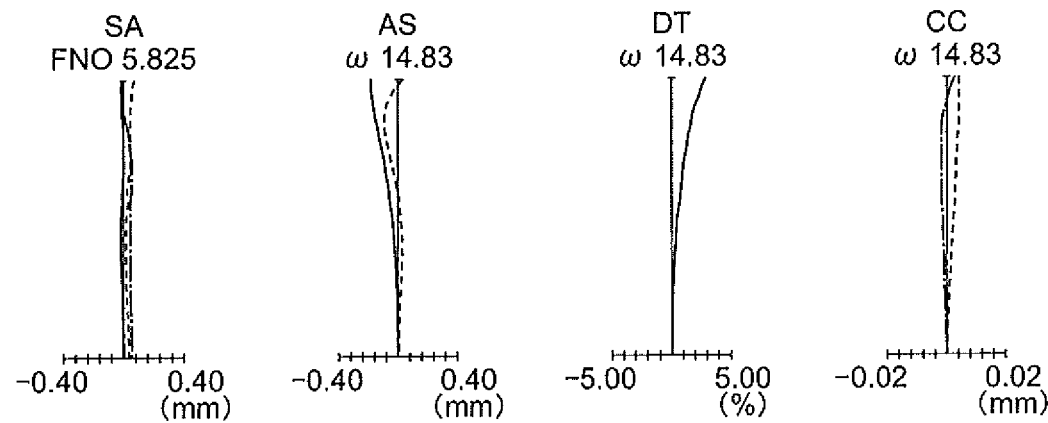

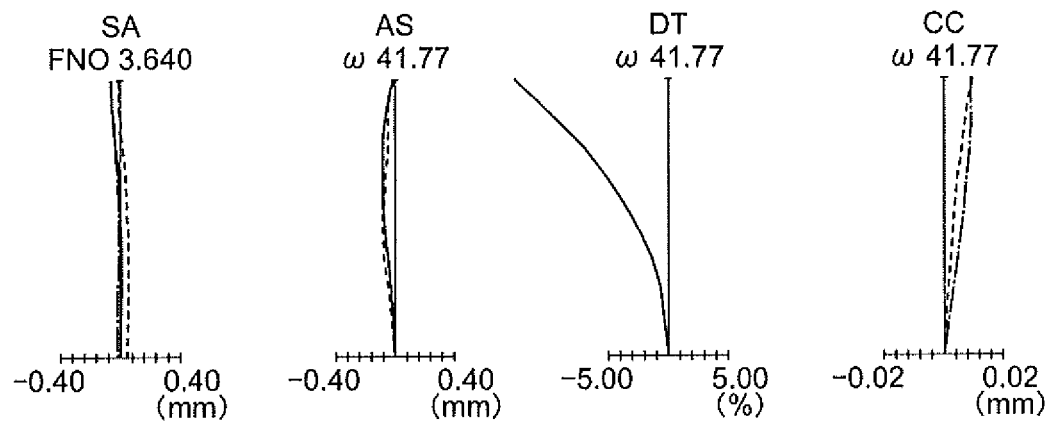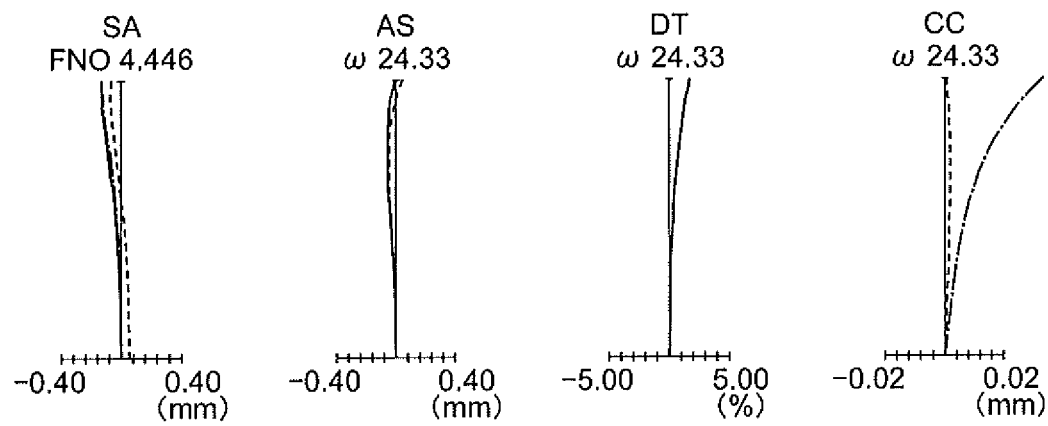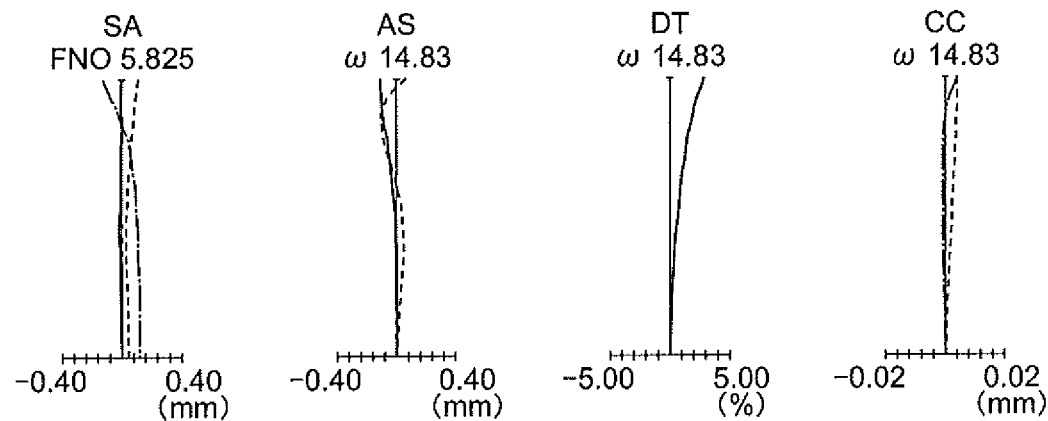

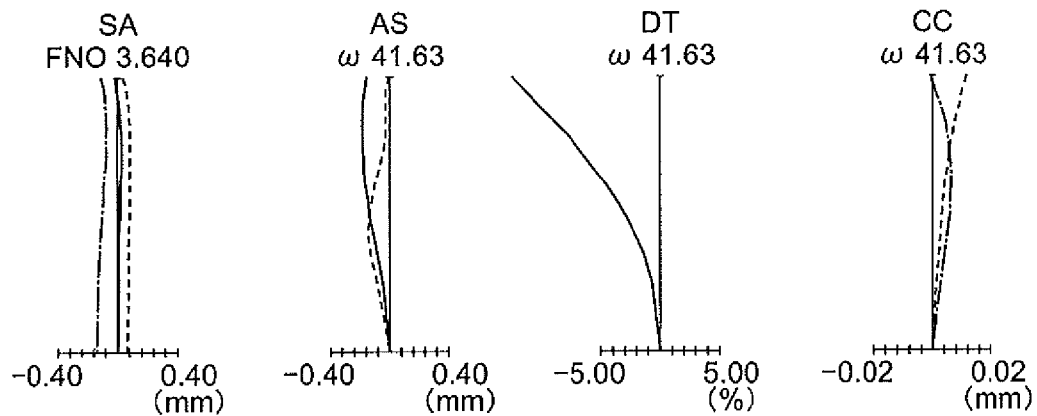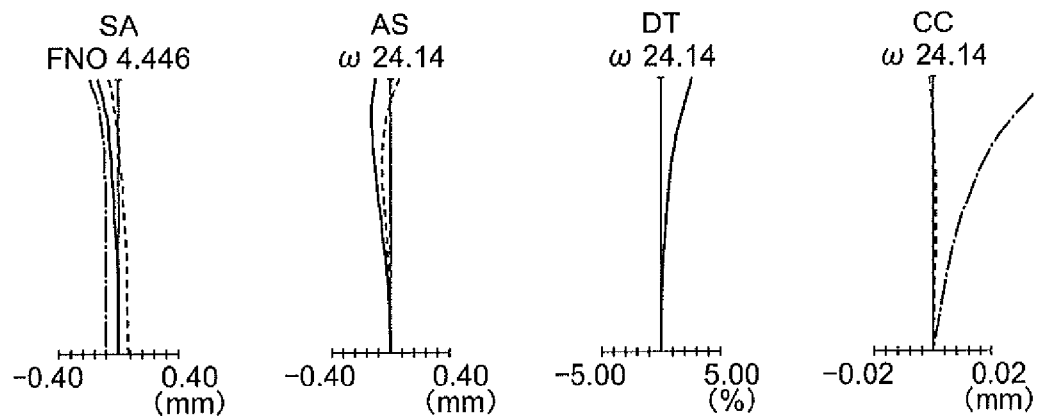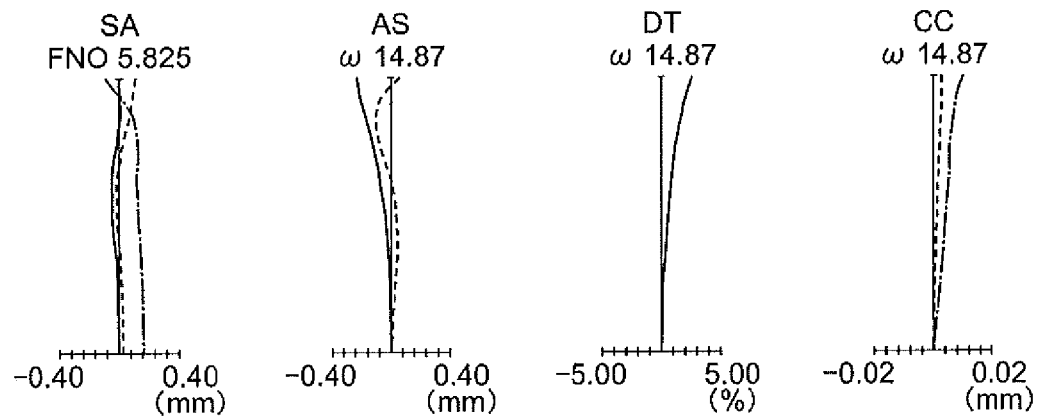

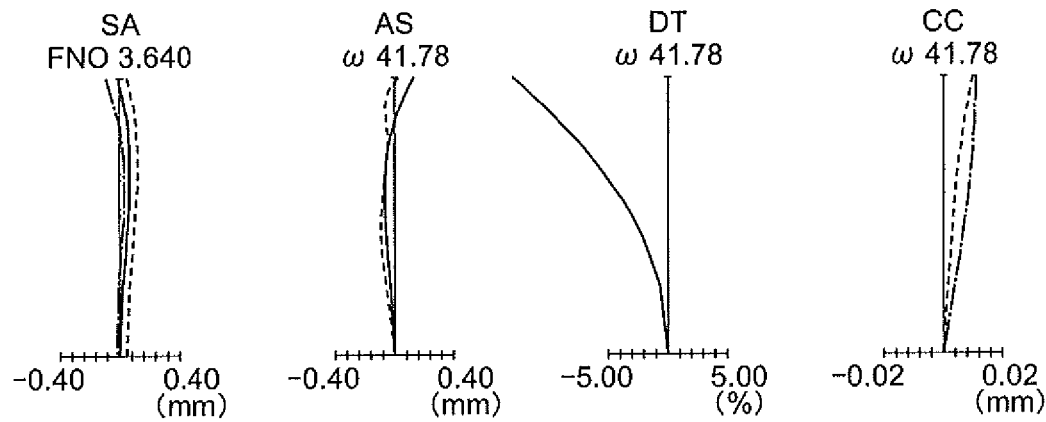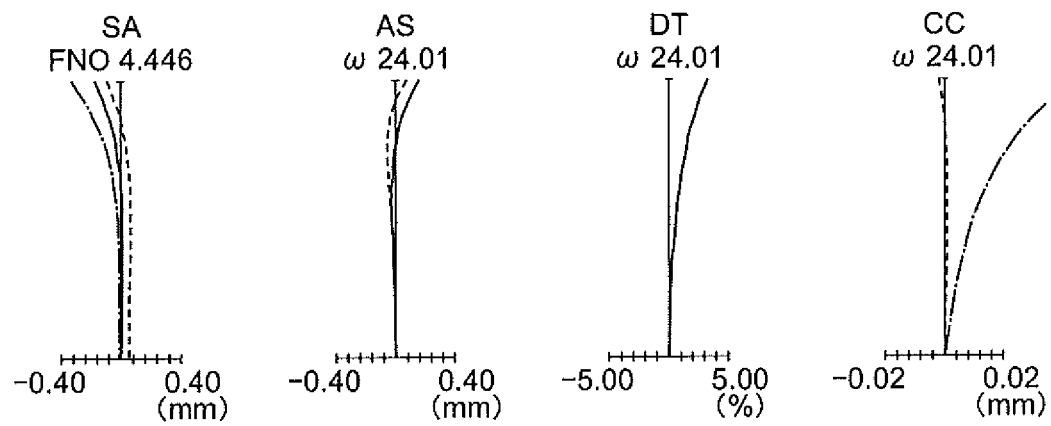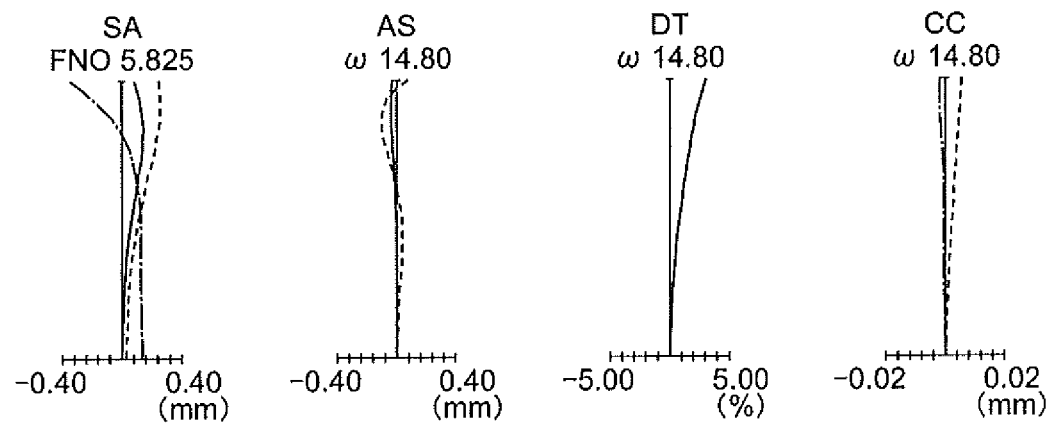

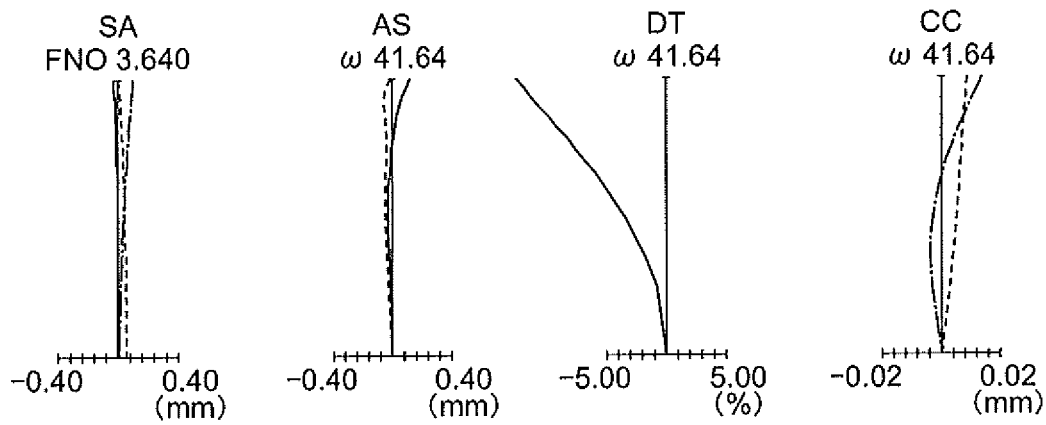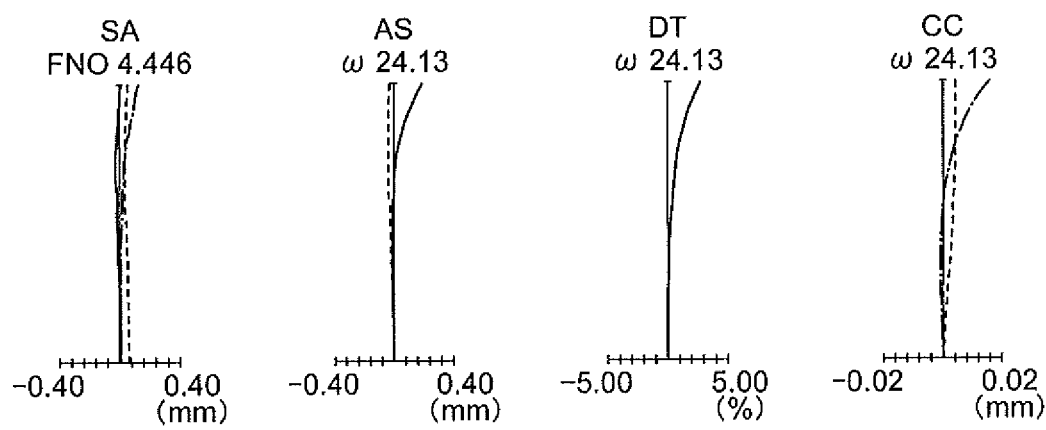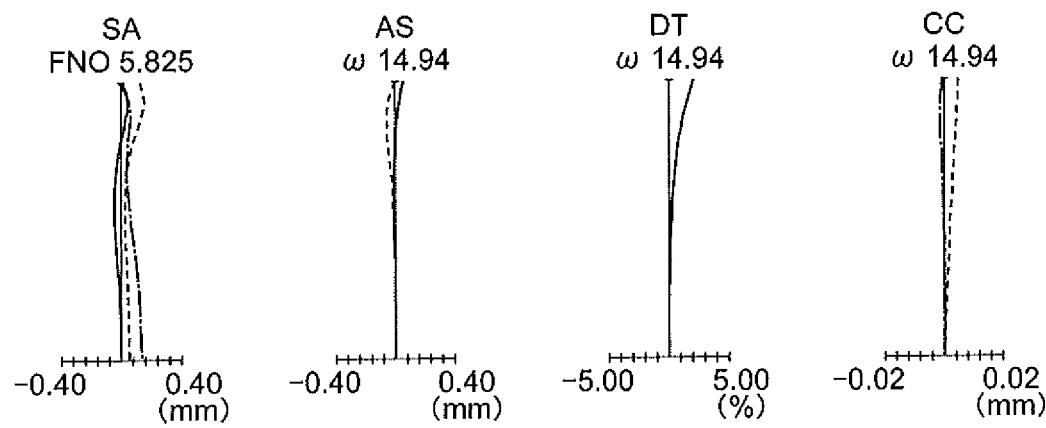

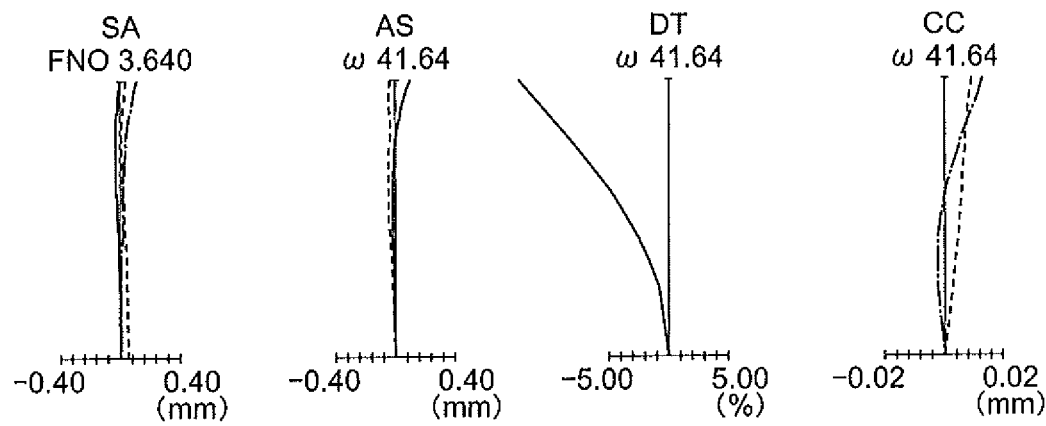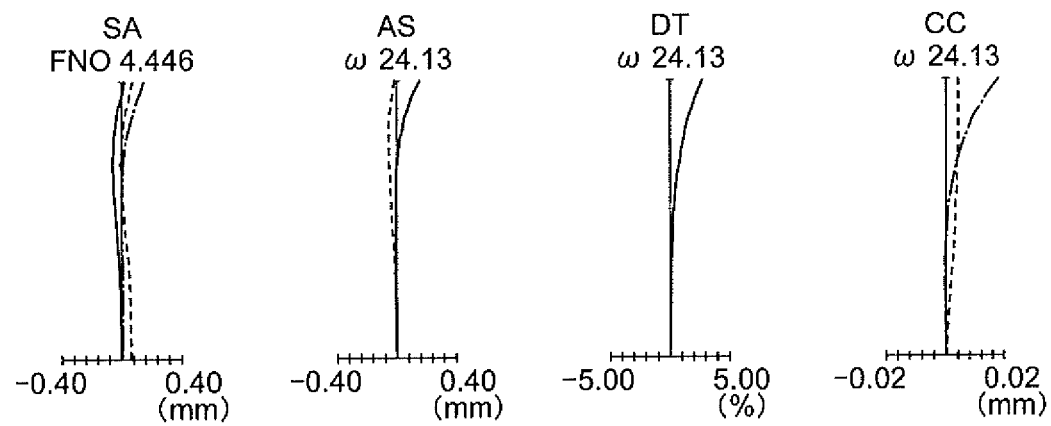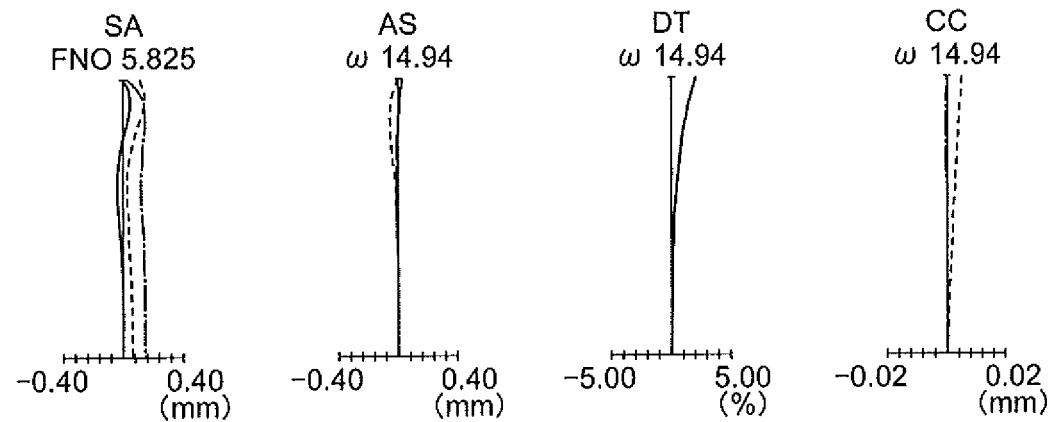

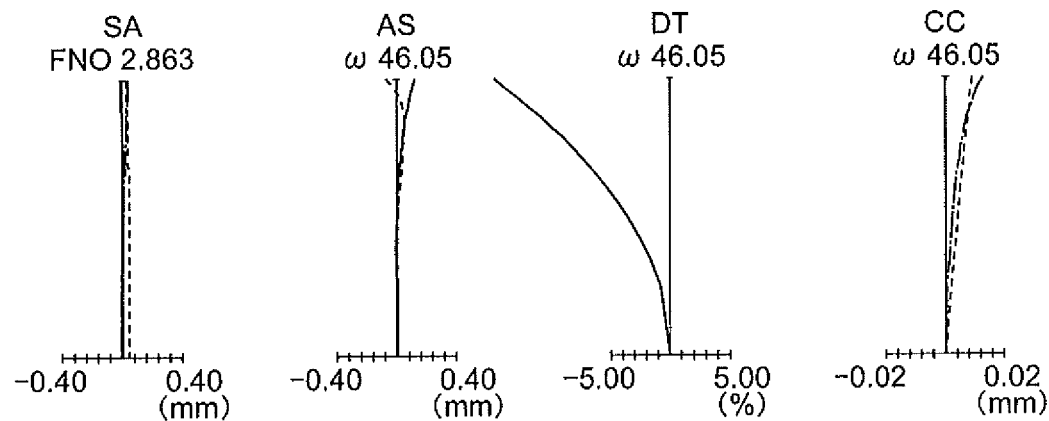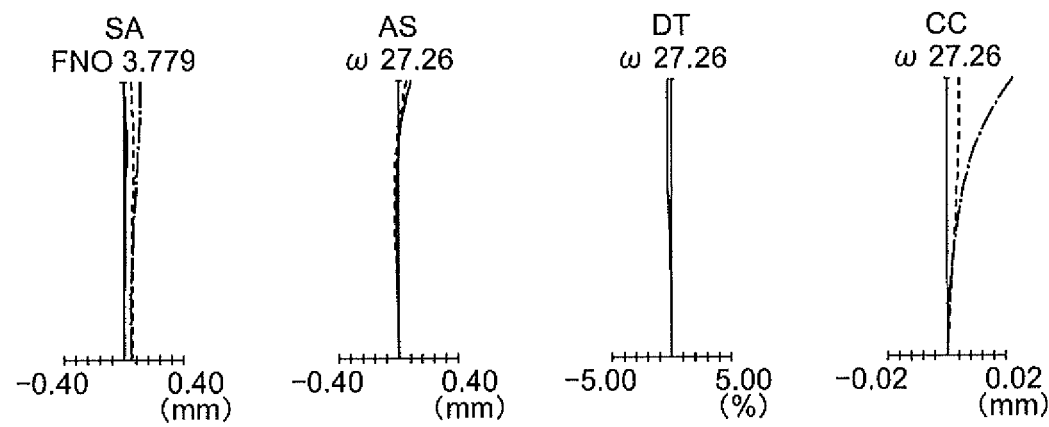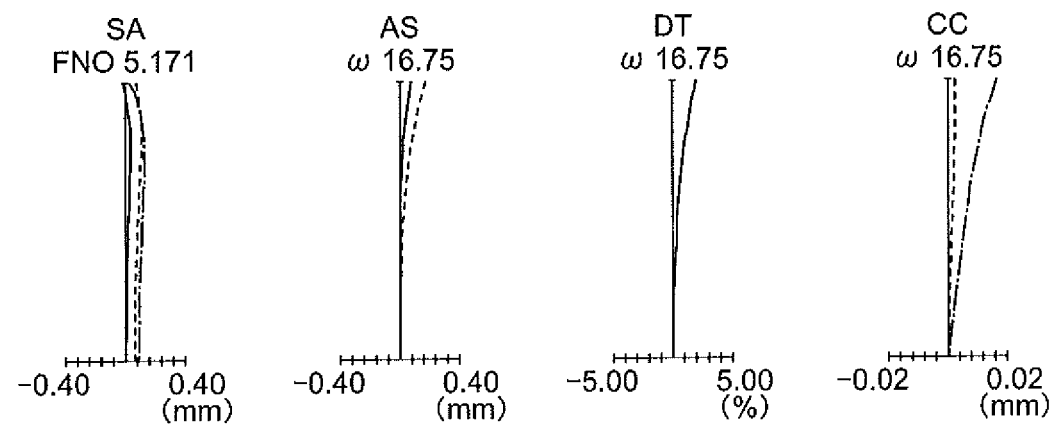

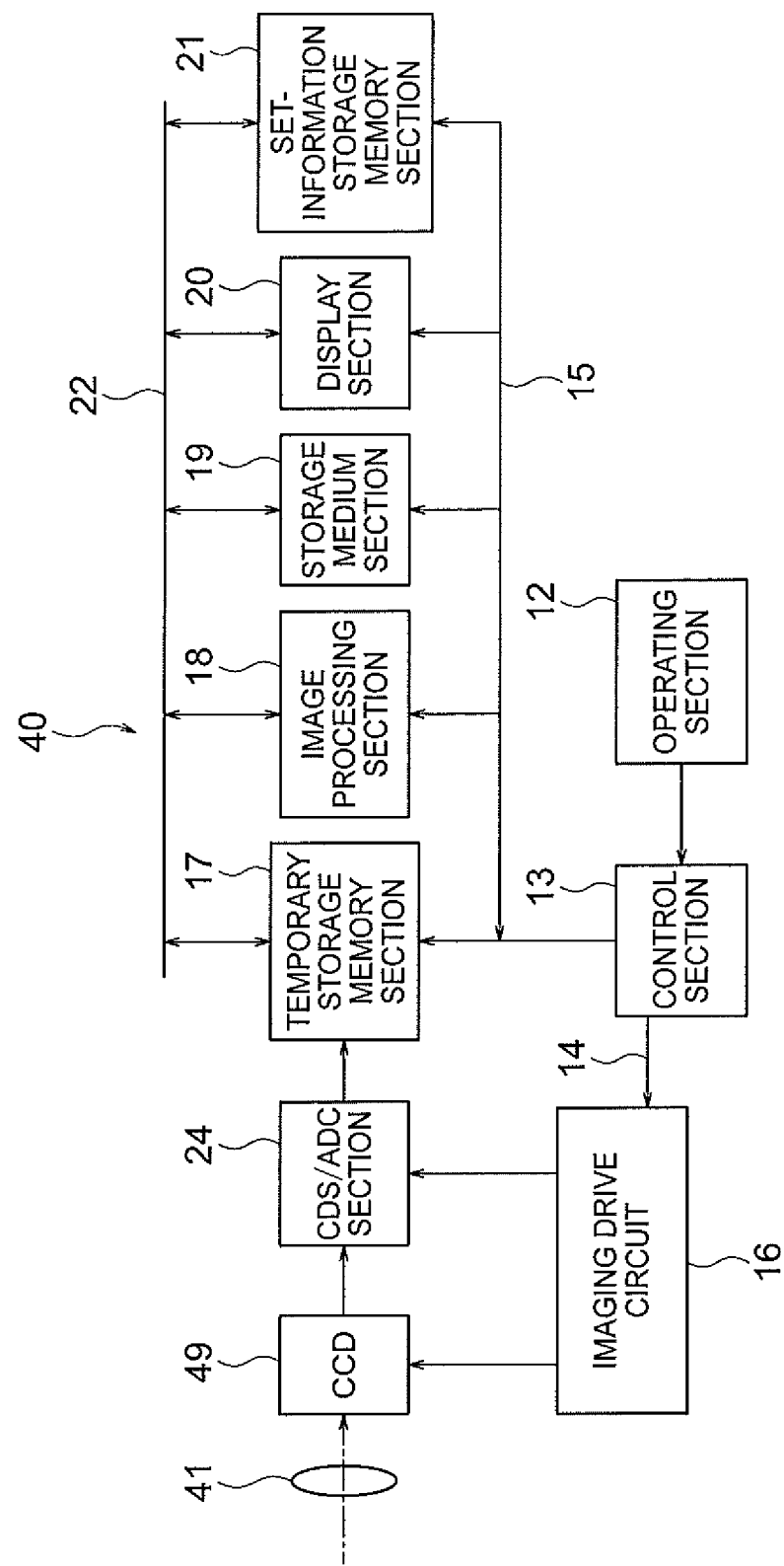

IMAGE FORMING OPTICAL SYSTEM AND ELECTRONIC IMAGE PICKUP APPARATUS USING THE SAME

CROSS-REFERENCE TO RELATED APPLICATION

The present application is a continuation of PCT/JP2013/081527, filed on Nov. 22, 2013 which is based upon and claims the benefit of priority from Japanese Patent Application No. 2012-264328 filed on Dec. 3, 2012; the entire contents of which are incorporated herein by reference.

BACKGROUND OF THE INVENTION

Field of the Invention

The present invention relates to an image forming optical system and an electronic image pickup apparatus using the same.

Description of the Related Art

In recent years, due to an increase in the number of pixels of an image pickup element and the progress in a digital image processing technology, silver-salt 35 mm film cameras have been replaced by digital cameras. Moreover, since the number of pixels of a small-sized liquid-crystal panel which is used as a finder has increased, even interchangeable lens cameras are undergoing transition from so-called single lens reflex cameras to cameras of a new concept (mirrorless single lens cameras) in which, a quick return mirror has been eliminated.

By elimination of the quick return mirror, designing of an image pickup optical system having a small size and an improved performance, with a short back focus to certain extent, has become possible. A constraint that a size of a finder image which is achieved depends on a size of an image formed by a lens, or in other words, an image circle diameter, is not there anymore. Therefore, a large finder image is achieved even if an image pickup format size is small, and moreover, designing of an image pickup optical system having a small size and an improved performance has become possible.

Incidentally, as a camera with a short back focus and small image forming format, fixed lens small cameras commonly called as compact cameras are in widespread use. A zoom lens appropriate for compact cameras has been described in Japanese Patent Application Laid-open Publication Nos. 2002-48975, 2002-365545, and 2003-140043. The zoom lens in each of Japanese Patent Application Laid-open Publication Nos. 2002-48975, 2002-365545, and 2003-140043 includes in order from an object side, a lens unit having a negative refractive power, a lens unit having a positive refractive power, and a lens unit having a positive refractive power.

Among zoom lenses of various types, an arrangement of a zoom lens of the most basic type is a two-unit arrangement which includes in order from an object side, a lens unit having a negative refractive power and a lens unit having a positive refractive power. The zoom lens in each of the Japanese Patent Application Laid-open Publication Nos. 2002-48975, 2002-365545, and 2003-140043 is a zoom lens in which, a third lens unit having a positive refractive power is added on an image side of the zoom lens having the two-unit arrangement. If the number of lens units is increased, a total length of the optical system is prone to become long at a wide angle end. However, by increasing the number of lens units, a high zooming ratio is achieved while suppressing the increase in the total length of the optical system.

Even if the number of lens units is increased to more than three, an effect of shortening the total length of the optical system is small. A zoom lens in which, the number of lens units is let to be four is described in Japanese Patent Application Laid-open Publication Nos. 2003-131130, 2008-233611, and 2012-22106. The zoom lens in each of Japanese Patent Application Laid-open Publication Nos. 2003-131130, 2008-233611, and 2012-22106 includes in order from an object side, a lens unit having a negative refractive power, a lens unit having a positive refractive power, a lens unit having a negative refractive power, and a lens unit having a positive refractive power. The zoom lens in each of Japanese Patent Application Laid-open Publication Nos. 2003-131130, 2008-233611, and 2012-22106 has been proposed as a zoom lens for a compact camera. However, eventually, the zoom lens of the three-unit arrangement has been popular.

As aforementioned, by eliminating the quick return mirror, in the optical system according to the camera of a new concept, the back focus could be made short. However, as long as the optical system of the camera of a new concept is an interchangeable lens optical system, the fact remains that it is important that a total thickness of lenses, rather than the total length of the optical system, is small. Moreover, there is a restriction also on an amount of the optical system protruding from a flange surface (lens installation surface). Given this situation, it is necessary to make the back focus of the optical system of the camera of a new concept longer than the back focus of the optical system for a compact camera.

As aforementioned, among zoom lenses of a compact camera, there are zoom lenses in which, an arrangement of refractive power of lens units is in order of a negative refractive power, a positive refractive power, and a positive refractive power, from an object side, and zoom lenses in which, an arrangement of refractive power of lens units is in order of a negative lens unit, a positive lens unit, a negative lens unit, and a positive lens unit. In the zoom lens with the refractive power arrangement in order of a negative refractive power, a positive refractive power, and a positive refractive power from an object side, if the back focus is made long, small-sizing and slimming of the optical system becomes difficult. Whereas, in the zoom lens with the refractive power arrangement in order of a negative refractive power, a positive refractive power, a negative refractive power, and a positive refractive power, even if the back focus is made long, small-sizing and slimming of the optical system is possible.

Zoom lenses with a refractive power arrangement in order of a negative refractive power, a positive refractive power, a negative refractive power, and a positive refractive power, in which, the back focus is made long to some extent, are disclosed in Japanese Patent Application Laid-open Publication Nos. 2012-58406 and 2012-133230.

SUMMARY OF THE INVENTION

An image forming optical system according to the present invention comprises in order from an object side,
a first lens unit having a negative refractive power,
a second lens unit having a positive refractive power,
a third lens unit having a negative refractive power, and
a fourth lens unit having a positive refractive power,
wherein at the time of zooming, distances between adjacent lens units change, and a lens component is one of a single lens and a cemented lens, and the first lens unit either includes in order from the object side, a negative lens and a positive lens, or includes in order from the object side, a first negative lens, a second negative lens, and a positive lens, and the second lens unit includes in order from the object side, a first lens component and a second lens component, and the first lens component either includes a positive single lens, or includes a cemented lens in which, a positive lens and a negative lens are cemented in order of the positive lens and the negative lens, and the second lens component includes a cemented lens, and the third lens unit includes either one lens or two lenses as a whole, and a lens having a curvature of a surface on an image side larger than a curvature of a surface on the object side is disposed nearest to an object, and the fourth lens unit includes one positive lens component.

Moreover, another image forming optical system according to the present invention comprises in order from an object side, a first lens unit having a negative refractive power, a second lens unit having a positive refractive power, a third lens unit having a negative refractive power, and a fourth lens unit having a positive refractive power, wherein at the time of zooming, distances between adjacent lens units change, and a lens component is one of a single lens and a cemented lens, and the first lens unit includes in order from the object side, a negative lens and a positive lens, and the second lens unit either includes in order from the object side, a first lens component and a second lens component, or includes further, in addition to the first lens component and the second lens component, a third lens component having a positive refractive power, on an image side of the second lens component, and the first lens component either includes a positive single lens, or includes a cemented lens in which, a positive lens and a negative lens are cemented in order of the positive lens and the negative lens, and the second lens component includes a cemented lens, and the third lens unit includes either one lens or two lenses as a whole, and a lens having a curvature of a surface on the image side larger than a curvature of a surface on the object side is disposed nearest to the object, and the fourth lens unit includes one positive lens component.

Furthermore, still another image forming optical system according to the present invention comprises in order from an object side, a first lens unit having a negative refractive power, a second lens unit having a positive refractive power, a third lens unit having a negative refractive power, and a fourth lens unit having a positive refractive power, wherein at the time of zooming, distances between adjacent lens units change, and a lens component is one of a single lens and a cemented lens, and the first lens unit either includes in order from the object side, a negative lens and a positive lens, or includes in order from the object side, a first negative lens, a second negative lens, and a positive lens, and the second lens unit either includes in order from the object side, a first lens component and a second lens component, or includes further, in addition to the first lens component and the second lens component, a third lens component on an image side of the second lens component, and the first lens component either includes a positive single lens, or includes a cemented lens in which, a positive lens and a negative lens are cemented in order of the positive lens and the negative lens, and the second lens component includes a cemented lens, and the third lens unit includes either one lens or two lenses as a whole, and a lens having a curvature of a surface on the image side larger than a curvature of a surface on the object side is disposed nearest to an object, and the fourth lens unit includes one positive lens component, and the following conditional expression (1) is satisfied:

$$-100<(R_{21F}+R_{21R})/(R_{21F}-R_{21R})<-0.2 \quad (1)$$

where, $R_{21F}$ denotes a paraxial radius of curvature of a surface nearest to an object of the first lens component, and $R_{21R}$ denotes a paraxial radius of curvature of a surface nearest to an image of the first lens component.

An electronic image pickup apparatus according to the present invention comprises the image forming optical system described above, and an image pickup element which has an image pickup surface.

BRIEF DESCRIPTION OF THE DRAWINGS

FIG. 1A is a cross-sectional view at a wide angle end, FIG. 1B is a cross-sectional view in an intermediate state, and FIG. 1C is a cross-sectional view at a telephoto end;

FIG. 2A, FIG. 2B, FIG. 2C, FIG. 2D, FIG. 2E, FIG. 2F, FIG. 2G, FIG. 2H, FIG. 2I, FIG. 2J, FIG. 2K, and FIG. 2L are diagrams showing a spherical aberration (SA), an astigmatism (AS), a distortion (DT), and a chromatic aberration of magnification (CC) at the time of infinite object point focusing of the image forming optical system according to the example 1, where, FIG. 2A, FIG. 2B, FIG. 2C, and FIG. 2D show a state at the wide angle end, FIG. 2E, FIG. 2F, FIG. 2G, and FIG. 2H show the intermediate state, and FIG. 2I, FIG. 2J, FIG. 2K, and FIG. 2L show a state at the telephoto end;

FIG. 3A is a cross-sectional view at a wide angle end, FIG. 3B is a cross-sectional view in an intermediate state, and FIG. 3C is a cross-sectional view at a telephoto end;

FIG. 4A, FIG. 4B, FIG. 4C, FIG. 4D, FIG. 4E, FIG. 4F, FIG. 4G, FIG. 4H, FIG. 4I, FIG. 4J, FIG. 4K, and FIG. 4L are diagrams showing a spherical aberration (SA), an astigmatism (AS), a distortion (DT), and a chromatic aberration of magnification (CC) at the time of infinite object point focusing of the image forming optical system according to the example 2, where, FIG. 4A, FIG. 4B, FIG. 4C, and FIG. 4D show a state at the wide angle end, FIG. 4E, FIG. 4F, FIG. 4G, and FIG. 4H show the intermediate state, and FIG. 4I, FIG. 4J, FIG. 4K, and FIG. 4L show a state at the telephoto end;

FIG. 5A is a cross-sectional view at a wide angle end, FIG. 5B is a cross-sectional view in an intermediate state, and FIG. 5C is a cross-sectional view at a telephoto end;

FIG. 6A, FIG. 6B, FIG. 6C, FIG. 6D, FIG. 6E, FIG. 6F, FIG. 6G, FIG. 6H, FIG. 6I, FIG. 6J, FIG. 6K, and FIG. 6L are diagrams showing a spherical aberration (SA), an astigmatism (AS), a distortion (DT), and a chromatic aberration of magnification (CC) at the time of infinite object point focusing of the image forming optical system according to the example 3, where, FIG. 6A, FIG. 6B, FIG. 6C, and FIG. 6D show a state at the wide angle end, FIG. 6E, FIG. 6F, FIG. 6G, and FIG. 6H show the intermediate state, and FIG. 6I, FIG. 6J, FIG. 6K, and FIG. 6L show a state at the telephoto end;

FIG. 7A is a cross-sectional view at a wide angle end, FIG. 7B is a cross-sectional view in an intermediate state, and FIG. 7C is a cross-sectional view at a telephoto end;

FIG. 8A, FIG. 8B, FIG. 8C, FIG. 8D, FIG. 8E, FIG. 8F, FIG. 8G, FIG. 8H, FIG. 8I, FIG. 8J, FIG. 8K, and FIG. 8L are diagrams showing a spherical aberration (SA), an astigmatism (AS), a distortion (DT), and a chromatic aberration of magnification (CC) at the time of infinite object point focusing of the image forming optical system according to the example 4, where, FIG. 8A, FIG. 8B, FIG. 8C, and FIG. 8D show a state at the wide angle end, FIG. 8E, FIG. 8F, FIG. 8G, and FIG. 8H show the intermediate state, and FIG. 8I, FIG. 8J, FIG. 8K, and FIG. 8L show a state at the telephoto end;

FIG. 9A is a cross-sectional view at a wide angle end, FIG. 9B is a cross-sectional view in an intermediate state, and FIG. 9C is a cross-sectional view at a telephoto end;

FIG. 10A, FIG. 10B, FIG. 10C, FIG. 10D, FIG. 10E, FIG. 10F, FIG. 10G, FIG. 10H, FIG. 10I, FIG. 10J, FIG. 10K, and FIG. 10L are diagrams showing a spherical aberration (SA), an astigmatism (AS), a distortion (DT), and a chromatic aberration of magnification (CC) at the time of infinite object point focusing of the image forming optical system according to the example 5, where, FIG. 10A, FIG. 10B, FIG. 10C, and FIG. 10D show a state at the wide angle end, FIG. 10E, FIG. 10F, FIG. 10G, and FIG. 10H show the intermediate state, and FIG. 10I, FIG. 10J, FIG. 10K, and FIG. 10L show a state at the telephoto end;

FIG. 11A is a cross-sectional view at a wide angle end, FIG. 11B is a cross-sectional view in an intermediate state, and FIG. 11C is a cross-sectional view at a telephoto end;

FIG. 12A, FIG. 12B, FIG. 12C, FIG. 12D, FIG. 12E, FIG. 12F, FIG. 12G, FIG. 12H, FIG. 12I, FIG. 12J, FIG. 12K, and FIG. 12L are diagrams showing a spherical aberration (SA), an astigmatism (AS), a distortion (DT), and a chromatic aberration of magnification (CC) at the time of infinite object point focusing of the image forming optical system according to the example 6, where, FIG. 12A, FIG. 12B, FIG. 12C, and FIG. 12D show a state at the wide angle end, FIG. 12E, FIG. 12F, FIG. 12G, and FIG. 12H show the intermediate state, and FIG. 12I, FIG. 12J, FIG. 12K, and FIG. 12L show a state at the telephoto end;

FIG. 13A is a cross-sectional view at a wide angle end, FIG. 13B is a cross-sectional view in an intermediate state, and FIG. 13C is a cross-sectional view at a telephoto end;

FIG. 14A, FIG. 14B, FIG. 14C, FIG. 14D, FIG. 14E, FIG. 14F, FIG. 14G, FIG. 14H, FIG. 14I, FIG. 14J, FIG. 14K, and FIG. 14L are diagrams showing a spherical aberration (SA), an astigmatism (AS), a distortion (DT), and a chromatic aberration of magnification (CC) at the time of infinite object point focusing of the image forming optical system according to the example 7, where, FIG. 14A, FIG. 14B, FIG. 14C, and FIG. 14D show a state at the wide angle end, FIG. 14E, FIG. 14F, FIG. 14G, and FIG. 14H show the intermediate state, and FIG. 14I, FIG. 14J, FIG. 14K, and FIG. 14L show a state at the telephoto end;

FIG. 15A is a cross-sectional view at a wide angle end, FIG. 15B is a cross-sectional view in an intermediate state, and FIG. 15C is a cross-sectional view at a telephoto end;

FIG. 16A, FIG. 16B, FIG. 16C, FIG. 16D, FIG. 16E, FIG. 16F, FIG. 16G, FIG. 16H, FIG. 16I, FIG. 16J, FIG. 16K, and FIG. 16L are diagrams showing a spherical aberration (SA), an astigmatism (AS), a distortion (DT), and a chromatic aberration of magnification (CC) at the time of infinite object point focusing of the image forming optical system according to the example 8, where, FIG. 16A, FIG. 16B, FIG. 16C, and FIG. 16D show a state at the wide angle end, FIG. 16E, FIG. 16F, FIG. 16G, and FIG. 16H show the intermediate state, and FIG. 16I, FIG. 16J, FIG. 16K, and FIG. 16L show a state at the telephoto end;

FIG. 17A is a cross-sectional view at a wide angle end, FIG. 17B is a cross-sectional view in an intermediate state, and FIG. 17C is a cross-sectional view at a telephoto end;

FIG. 18A, FIG. 18B, FIG. 18C, FIG. 18D, FIG. 18E, FIG. 18F, FIG. 18G, FIG. 18H, FIG. 18I, FIG. 18J, FIG. 18K, and FIG. 18L are diagrams showing a spherical aberration (SA), an astigmatism (AS), a distortion (DT), and a chromatic aberration of magnification (CC) at the time of infinite object point focusing of the image forming optical system according to the example 9, where, FIG. 18A, FIG. 18B, FIG. 18C, and FIG. 18D show a state at the wide angle end, FIG. 18E, FIG. 18F, FIG. 18G, and FIG. 18H show the intermediate state, and FIG. 18I, FIG. 18J, FIG. 18K, and FIG. 18L show a state at the telephoto end;

FIG. 19A is a cross-sectional view at a wide angle end, FIG.

19B is a cross-sectional view in an intermediate state, and FIG. 19C is a cross-sectional view at a telephoto end;

FIG. 20A, FIG. 20B, FIG. 20C, FIG. 20D, FIG. 20E, FIG. 20F, FIG. 20G, FIG. 20H, FIG. 20I, FIG. 20J, FIG. 20K, and FIG. 20L are diagrams showing a spherical aberration (SA), an astigmatism (AS), a distortion (DT), and a chromatic aberration of magnification (CC) at the time of infinite object point focusing of the image forming optical system according to the example 10, where, FIG. 20A, FIG. 20B, FIG. 20C, and FIG. 20D show a state at the wide angle end, FIG. 20E, FIG. 20F, FIG. 20G, and FIG. 20H show the intermediate state, and FIG. 20I, FIG. 20J, FIG. 20K, and FIG. 20L show a state at the telephoto end;

FIG. 21A is a cross-sectional view at a wide angle end, FIG. 21B is a cross-sectional view in an intermediate state, and FIG. 21C is a cross-sectional view at a telephoto end;

FIG. 22A, FIG. 22B, FIG. 22C, FIG. 22D, FIG. 22E, FIG. 22F, FIG. 22G, FIG. 22H, FIG. 22I, FIG. 22J, FIG. 22K, and FIG. 22L are diagrams showing a spherical aberration (SA), an astigmatism (AS), a distortion (DT), and a chromatic aberration of magnification (CC) at the time of infinite object point focusing of the image forming optical system according to the example 11, where, FIG. 22A, FIG. 22B, FIG. 22C, and FIG. 22D show a state at the wide angle end, FIG. 22E, FIG. 22F, FIG. 22G, and FIG. 22H show the intermediate state, and FIG. 22I, FIG. 22J, FIG. 22K, and FIG. 22L show a state at the telephoto end;

FIG. 23A is a cross-sectional view at a wide angle end, FIG. 23B is a cross-sectional view in an intermediate state, and FIG. 23C is a cross-sectional view at a telephoto end;

FIG. 24A, FIG. 24B, FIG. 24C, FIG. 24D, FIG. 24E, FIG. 24F, FIG. 24G, FIG. 24H, FIG. 24I, FIG. 24J, FIG. 24K, and FIG. 24L are diagrams showing a spherical aberration (SA), an astigmatism (AS), a distortion (DT), and a chromatic aberration of magnification (CC) at the time of infinite object point focusing of the image forming optical system according to the example 12, where, FIG. 24A, FIG. 24B, FIG. 24C, and FIG. 24D show a state at the wide angle end, FIG. 24E, FIG. 24F, FIG. 24G, and FIG. 24H show the intermediate state, and FIG. 24I, FIG. 24J, FIG. 24K, and FIG. 24L show a state at the telephoto end;

FIG. 25A is a cross-sectional view at a wide angle end, FIG. 25B is a cross-sectional view in an intermediate state, and FIG. 25C is a cross-sectional view at a telephoto end;

FIG. 26A, FIG. 26B, FIG. 26C, FIG. 26D, FIG. 26E, FIG. 26F, FIG. 26G, FIG. 26H, FIG. 26I, FIG. 26J, FIG. 26K, and FIG. 26L are diagrams showing a spherical aberration (SA), an astigmatism (AS), a distortion (DT), and a chromatic aberration of magnification (CC) at the time of infinite object point focusing of the image forming optical system according to the example 13, where, FIG. 26A, FIG. 26B, FIG. 26C, and FIG. 26D show a state at the wide angle end, FIG. 26E, FIG. 26F, FIG. 26G, and FIG. 26H show the intermediate state, and FIG. 26I, FIG. 26J, FIG. 26K, and FIG. 26L show a state at the telephoto end;

FIG. 27A is a cross-sectional view at a wide angle end, FIG. 27B is a cross-sectional view in an intermediate state, and FIG. 27C is a cross-sectional view at a telephoto end;

FIG. 28A, FIG. 28B, FIG. 28C, FIG. 28D, FIG. 28E, FIG. 28F, FIG. 28G, FIG. 28H, FIG. 28I, FIG. 28J, FIG. 28K, and FIG. 28L are diagrams showing a spherical aberration (SA), an astigmatism (AS), a distortion (DT), and a chromatic aberration of magnification (CC) at the time of infinite object point focusing of the image forming optical system according to the example 14, where, FIG. 28A, FIG. 28B, FIG. 28C, and FIG. 28D show a state at the wide angle end, FIG. 28E, FIG. 28F, FIG. 28G, and FIG. 28H show the intermediate state, and FIG. 28I, FIG. 28J, FIG. 28K, and FIG. 28L show a state at the telephoto end;

FIG. 32 is a block diagram of an internal circuit of main components of the interchangeable lens camera.

DETAILED DESCRIPTION OF THE INVENTION

Figure 1A:
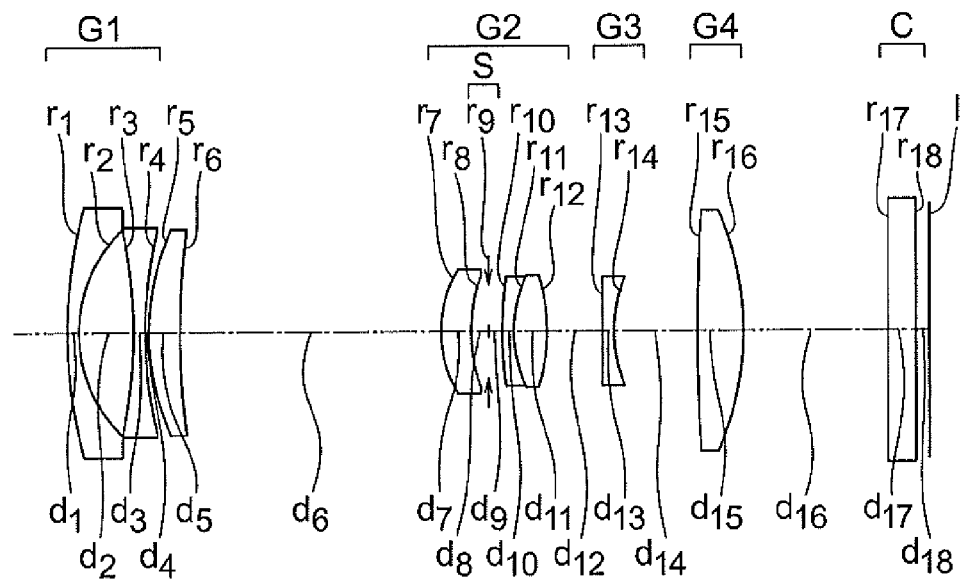
FIG. 1A, FIG. 1B, and FIG. 1C are cross-sectional views along an optical axis showing an optical arrangement at the time of infinite object point focusing of an image forming optical system according to an example 1, where.

Examples in which, an image forming optical system according to the present invention has been applied to a zoom lens will be described below in detail by referring to the accompanying diagrams. However, the present invention is not restricted to the examples described below. In other words, although specific contents in detail are included for exemplifying in the description of embodiments, various changes and variations made in the contents in detail fall within the scope of the present invention. Consequently, the exemplified embodiments of the present invention described below are mentioned without loss of generality with respect to the invention claimed, and do not restrict the invention claimed.

First of all, a basic arrangement in the image forming optical system according to the present embodiment will be described below. In the basic arrangement, the number of lens units is four, and the four lens units are disposed in order of a first lens unit having a negative refractive power, a second lens unit having a positive refractive power, a third lens unit having a negative refractive power, and a fourth lens unit having a positive refractive power, from an object side. Moreover, at the time of zooming, distances between the adjacent lens units change.

The image forming optical system according to the present embodiment is an optical system appropriate for a camera of a new concept. In the optical system of the camera of a new concept, although a length of a back focus of the optical system is not required to be as long as a back focus of an optical system for a single-lens reflex camera, a length to certain extent is necessary for the back focus. Therefore, a refractive power of the lens units is let to be in order of a negative refractive power, a positive refractive power, a negative refractive power, and a positive refractive power, and distances between the adjacent lens units are changed.

By making such arrangement, in the image forming optical system of the present embodiment, a back focus longer than a back focus of an optical system for a compact camera is realized. Besides, regarding an imaging performance of the image forming optical system, it is possible to achieve a level same as the imaging performance in the optical system of a single-lens reflex camera. Particularly, by letting a refractive power of the third lens unit to be a negative refractive power, it is possible to secure a desired back focus while shortening an overall length of the optical system.

Moreover, in the basic arrangement, the third lens unit includes either one lens or two lenses as a whole, and a lens having a curvature of a surface on an image side larger than a curvature of a surface on the object side is disposed nearest to the object. On the other hand, the fourth lens unit includes one positive lens component. The lens component is a single lens or a cemented lens.

In the third lens unit, by letting the number of lenses to be one, it is possible to make the optical system slim, and by letting the number of lenses to be two, the imaging performance is improved. Moreover, by letting the fourth lens unit have one positive lens component, it is possible to correct an aberration favorably, and besides it is possible to make the optical system slim.

Next, an image forming optical according to a first embodiment will be described below. The image forming optical system according to the first embodiment has the abovementioned basic arrangement. Moreover, in the image forming optical system according to the first embodiment, the first lens unit either includes in order from the object side, a negative lens and a positive lens, or includes in order from the object side, a first negative lens, a second negative lens, and a positive lens. Moreover, the second lens unit includes in order from the object side a first lens component and a second lens component, and the first lens component includes either a positive single lens or a cemented lens in which, a positive lens and a negative lens are cemented in order of the positive lens and the negative lens, and the second lens component includes a cemented lens.

By letting an arrangement of the first lens unit to be the abovementioned arrangement, it is possible to correct a distortion, an astigmatism, and a coma favorably.

On the other hand, when an attempt is made to make an F-number (F-value) of the optical system small, a height of a subordinate light ray becomes high for each image height. As the height of the subordinate light ray becomes high, correction of a spherical aberration, a coma, and a longitudinal chromatic aberration is susceptible to become difficult. Besides, for making the optical system slim, it is necessary to shorten the overall length of the optical system, and for shortening the overall length of the optical system, a refractive power of the second lens unit is to be made large. As the refractive power of the second lens unit is made large, correction of the coma and the longitudinal chromatic aberration becomes even more difficult. By making an arrangement of the second lens unit as aforementioned, it is possible to correct the spherical aberration, the coma, and the longitudinal chromatic aberration favorably.

An image forming optical system according a second embodiment will be described below. The image forming optical system according to the second embodiment has the abovementioned basic arrangement. Moreover, in the image forming optical system according to the second embodiment, a first lens unit includes in order from an object side, a negative lens and a positive lens. The second lens unit either includes in order from the object side a first lens component and a second lens component, or includes in addition to the first lens component and the second lens component, a third lens component having a positive refractive power on an image side of the second lens component. The first lens component either includes a positive single lens, or includes a cemented lens in which, a positive lens and a negative lens are cemented in order of the positive lens and the negative lens, and the second lens component includes a cemented lens.

By making an arrangement of the first lens unit and the second lens unit as mentioned above, an effect similar to an effect of the image forming optical system according to the first embodiment is achieved. Moreover, in a case in which, the second lens unit includes the third lens component, it is possible to correct the spherical aberration and the coma favorably.

An image forming optical system according to a third embodiment will be described below. The image forming optical system according to the third embodiment has the abovementioned basic arrangement. Moreover, in the image forming optical system according to the third embodiment, a first lens unit either includes in order from an object side, a negative lens and a positive lens, or includes in order from the object side, a first negative lens, a second negative lens, and a positive lens. A second lens unit either includes in order from the object side, a first lens component and a second lens component, or includes further, in addition to the first lens component and the second lens component, a third lens component on an image side of the second lens component. The first lens component either includes a positive single lens, or includes a cemented lens in which, a positive lens and a negative lens are cemented in order of the positive lens and the negative lens. The second lens component includes a cemented lens. Moreover, the following conditional expression (1) is satisfied:

$$-100<(R_{21F}+R_{21R})/(R_{21F}-R_{21R})<-0.2 \qquad (1)$$

where, $R_{21F}$ denotes a paraxial radius of curvature of a surface nearest to an object of the first lens component, and $R_{21R}$ denotes a paraxial radius of curvature of a surface nearest to an image of the first lens component.

By making an arrangement of the first lens unit and the second lens unit as mentioned above, an effect similar to the effect of the image forming optical system according to the first embodiment is achieved. Moreover, in a case in which, the second lens unit includes the third lens component, it is possible to correct the spherical aberration and the coma favorably. By satisfying conditional expression (1), it is possible to correct the spherical aberration, the astigmatism, and the coma favorably. The paraxial radius of curvature may be let to be a radius of curvature on an optical axis.

By making so as to exceed a lower limit value of conditional expression (1), correction of the spherical aberration can be carried out advantageously. Whereas, by making so as to fall below an upper limit value of conditional expression (1), correction of an off-axis aberration such as the astigmatism and the coma can be carried out advantageously. Correction can be carried out advantageously means that it is possible to correct the aberration favorably.

It is more preferable to satisfy the following conditional expression (1') instead of conditional expression (1).

$$-100<(R_{21F}+R_{21R})/(R_{21F}-R_{21R})<-0.75 \qquad (1')$$

Furthermore, it is even more preferable to satisfy the following conditional expression (1″) instead of conditional expression (1).

$$-100<(R_{21F}+R_{21R})/(R_{21F}-R_{21R})<-1.2395 \quad (1″)$$

Moreover, in a case in which, a lens surface is a spherical surface, a negative spherical aberration and an inner coma are susceptible to occur. Therefore, as an aspheric surface is introduced in the second lens component, it is possible to suppress occurrence of the negative spherical aberration and the inner coma. Even in a case of introducing the aspheric surface in the second lens component, it is preferable to satisfy conditional expression (1).

Moreover, in the image forming optical systems according to the first embodiment, the second embodiment, and the third embodiment (hereinafter referred to as the optical system according to the present embodiment), at the time of zooming, it is preferable to move each lens unit as described below.

At the time of zooming from a wide angle end to a telephoto end, the first lens unit, after moving toward an image side once, moves to the object side (undergoes reciprocating motion). The second lens unit moves only toward the object side. The third lens unit moves such that a position at the telephoto end is approximately on the object side (or, at least on the object side) than a position at the wide angle end. The third lens unit does not move in such manner in some cases. The fourth lens unit fixed (is stationary). By letting the fourth lens unit to be fixed, a structure of a lens barrel does not become complex, and the optical system does not become large. The fourth lens unit may be moved. Moving the fourth lens unit is advantageous from a point of making small a fluctuation in the astigmatism at the time of zooming.

Moreover, in the image forming optical system according to the present embodiment, it is preferable to dispose an aperture stop between the first lens component and the second lens component.

When such an arrangement is made, it is possible to secure sufficiently a space for the second lens unit to move at the time of zooming. Moreover, it is possible to make small a fluctuation in the off-axis aberration, particularly, the coma and the astigmatism, at the time of zooming.

Moreover, in the image forming optical system according to the present embodiment, it is preferable that the following conditional expression (2) is satisfied:

$$-10<(R_{22F}+R_{22R})/(R_{22F}-R_{22R})<10 \quad (2)$$

$R_{22F}$ denotes a paraxial radius of curvature of a surface nearest to an object of the second lens component, and $R_{22R}$ denotes a paraxial radius of curvature of a surface nearest to an image of the second lens component.

By making so as to exceed a lower limit value of conditional expression (2), correction of the astigmatism and the spherical aberration can be carried out advantageously. Whereas, by making so as to fall below an upper limit value of conditional expression (2), correction of the coma can be carried out advantageously.

It is more preferable to satisfy the following conditional expression (2′) instead of conditional expression (2).

$$-10<(R_{22F}+R_{22R})/(R_{22F}-R_{22R})<6 \quad (2′)$$

Furthermore, it is even more preferable to satisfy the following conditional expression (2″) instead of conditional expression (2).

$$-10<(R_{22F}+R_{22R})/(R_{22F}-R_{22R})<0.24 \quad (2″)$$

Moreover, in the image forming optical system according to the present embodiment, it is preferable that the following conditional expression (3) is satisfied:

$$0<f_w/|R_{22c}|<5.0 \quad (3)$$

where, $f_w$ denotes a focal length of the overall image forming optical system at a wide angle end, and $R_{22c}$ denotes a paraxial radius of curvature of a cemented surface positioned nearest to the image in the second lens component.

Here, in a case in which, a lens positioned nearest to the image in the cemented lens of the second lens component is a positive convex lens, a value of $R_{22c}$ becomes a positive value, and in a case in which, a lens positioned nearest to the image in the cemented lens of the second lens component is negative lens, the value of $R_{22c}$ becomes a negative value.

By making so as to exceed a lower limit value of conditional expression (3), it is possible to prevent insufficient correction of the longitudinal chromatic aberration and the spherical aberration. Regarding the longitudinal chromatic aberration, it is possible to make an arrangement such that an amount of aberration at a short wavelength does not become a negative value. Whereas, by making so as to fall below an upper limit value of conditional expression (3), a thickness of an edge of the positive lens is not insufficient (sufficient thickness is achieved). In this case, since the purpose is served even without increasing the thickness of the positive lens on an optical axis, it is possible to make the optical system slim. The positive lens is one of the lenses cemented to form the cemented lens.

It is more preferable to satisfy the following conditional expression (3′) instead of conditional expression (3).

$$0<f_w/|R_{22c}|<2.7 \quad (3′)$$

Furthermore, it is even more preferable to satisfy the following conditional expression (3″) instead of conditional expression (3).

$$0<f_w/|R_{22c}|<1.92 \quad (3″)$$

Moreover, in the image forming optical system according to the present embodiment, it is preferable that the following conditional expression (4) is satisfied:

$$0.1<f_2/f_{21}<2.0 \quad (4)$$

where, $f_2$ denotes a focal length of the second lens unit, and $f_{21}$ denotes a focal length of the first lens component.

By making so as to exceed a lower limit value of conditional expression (4), it is possible to suppress a rapid increase in an amount of aberration that occurs at the second lens component side. Whereas, by making so as to fall below an upper limit value of conditional expression (4), it is possible to suppress a rapid increase in an amount of aberration that occurs in the first lens component. By satisfying conditional expression (4), since it is possible to optimize the balance of a refractive power in the overall second lens unit and a refractive power of the first lens component, it is possible to make small the amount of aberration of both.

It is more preferable to satisfy the following conditional expression (4′) instead of conditional expression (4).

$$0.1<f_2/f_{21}<0.94 \quad (4′)$$

Furthermore, it is even more preferable to satisfy the following conditional expression (4") instead of conditional expression (4).

$$0.1 < f_2/f_{21} < 0.78 \quad (4'')$$

In the image forming optical system according to the present embodiment, it is preferable to introduce an aspheric surface to any surface in the second lens unit. By making such an arrangement, it is possible to make small both the amount of aberration that occurs at the second lens component side and the amount of aberration that occurs in the first lens component. It is preferable to introduce the aspheric surface in the first lens component. In this case, it is preferable that conditional expression (4) is satisfied.

Moreover, in the image forming optical system according to the present invention, it is preferable that the following conditional expression (5) is satisfied:

$$0.01 < d_{212}/f_w < 0.4 \quad (5)$$

where, $d_{212}$ denotes an air space on an optical axis between the first lens component and the second lens component, and $f_w$ denotes the focal length of the overall image forming optical system at the wide angle end.

By making so as to exceed a lower limit value of conditional expression (5), it is possible to correct favorably each of the spherical aberration, the coma, and the astigmatism comprehensively. Whereas, by making so as to fall below an upper limit value of conditional expression (5), it is possible to avoid an increase in thickness on the optical axis of the second lens unit. Therefore, it is possible to make the optical system slim.

It is more preferable to satisfy the following conditional expression (5') instead of conditional expression (5).

$$0.05 < d_{212}/f_w < 0.4 \quad (5')$$

Furthermore, it is even more preferable to satisfy the following conditional expression (5") instead of conditional expression (5).

$$0.05 < d_{212}/f_w < 0.3 \quad (5'')$$

Moreover, in the image forming optical system according to the present embodiment, it is preferable that the cemented lens in the second lens component includes a negative lens, and a positive lens which is cemented to the negative lens, and the following conditional expressions (6) and (7) are satisfied:

$$0 < v_{22p} - v_{22n} < 80 \quad (6)$$

$$-0.7 < N_{22p} - N_{22n} < 0.2 \quad (7)$$

where, $N_{22p}$ denotes a refractive index for d-line of the positive lens in the second lens component, $v_{22p}$ denotes Abbe's number with reference to d-line of the positive lens in the second lens component, $N_{22n}$ denotes a refractive index for d-line of the negative lens in the second lens component, and $v_{22n}$ denotes Abbe's number with reference to d-line of the negative lens in the second lens component.

By making so as to exceed a lower limit value of conditional expression (6), it is possible to prevent insufficient correction of the longitudinal chromatic aberration (regarding the longitudinal chromatic aberration, it is possible to make an arrangement such that the amount of aberration at the short wavelength does not become a negative value). Whereas, by making so as to fall below an upper limit value of conditional expression (6), it is possible to correct a chromatic aberration by using an optical material which is practicable. Although it is possible to correct the chromatic aberration even when the upper limit value of conditional expression (6) is exceeded, an optical material which can be used does not exist as of this moment.

By making so as to exceed a lower limit value of conditional expression (7), it is disadvantageous for the correction of the spherical aberration, but Petzval's sum is not susceptible to become a large positive value. Whereas, by making so as to fall below an upper limit value of conditional expression (7), it becomes difficult to make Petzval's sum an appropriate value, but it is possible to prevent the insufficient correction (toward a negative value) of the spherical aberration.

It is more preferable to satisfy the following conditional expression (6') instead of conditional expression (6).

$$0 < v_{22p} - v_{22n} < 57 \quad (6')$$

Furthermore, it is even more preferable to satisfy the following conditional express (6") instead of conditional expression (6).

$$0 < v_{22p} - v_{22n} < 44.9 \quad (6'')$$

It is more preferable to satisfy the following conditional expression (7') instead of conditional expression (7).

$$-0.35 < N_{22p} - N_{22n} < 0.2 \quad (7')$$

Furthermore, it is even more preferable to satisfy the following conditional expression (7") instead of conditional expression (7).

$$-0.3085 < N_{22p} - N_{22n} < 0.2 \quad (7'')$$

Moreover, in the image forming optical system according to the present embodiment, it is preferable that in the cemented lens of the second lens component, a negative lens and a positive lens are cemented in order of the negative lens and the positive lens.

Incidentally, by moving the first lens unit, the second lens unit, the third lens unit, and the fourth lens unit as aforementioned, it is possible to secure a desired back focus and to shorten the overall length of the optical system. However, it is preferable to move the third lens unit such that an air space between the third lens unit and the second lens unit becomes even larger.

Moreover, in the image forming optical system according to the present embodiment, it is preferable that the following conditional expression (8) is satisfied:

$$0.0 < M_3/M_2 < 0.85 \quad (8)$$

where, $$M_2 = |M_{2w} - M_{2t}|, M_3 = |M_{3w} - M_{3t}|$$

$M_{2w}$ denotes a position of the second lens unit at a wide angle end, $M_{2t}$ denotes a position of the second lens unit at a telephoto end, $M_{3w}$ denotes a position of the third lens unit at the wide angle end, and $M_{3t}$ denotes a position of the third lens unit at a telephoto end, and $M_{2w}$, $M_{2t}$, $M_{3w}$, and $M_{3t}$ are positions at the time of infinite object point focusing.

By making so as to exceed a lower limit value of conditional expression (8), it is possible to prevent a decrease in zooming ratio even when a predetermined lens unit is moved within the restricted range. Whereas, by making so as to fall below an upper limit value, it is possible either to suppress an increase in the overall length of the optical system at the telephoto end or to prevent a decrease in the back focus.

It is more preferable to satisfy the following conditional expression (8') instead of conditional expression (8).

$$0.35 < M_3/M_2 < 0.85 \quad (8')$$

Furthermore, it is even more preferable to satisfy the following conditional expression (8") instead of conditional expression (8).

$$0.35 < M_3/M_2 < 0.75 \quad (8'')$$

Moreover, in the image forming optical system according to the present embodiment, it is preferable that the following conditional expression (9) is satisfied:

$$0.5 < f_4/|f_3| < 5.0 \quad (9)$$

where, $f_3$ denotes a focal length of the third lens unit, and
$f_4$ denotes a focal length of the fourth lens unit.

Conditional expression (9) is a conditional expression related to the refractive power of the third lens unit and the refractive power of the fourth lens unit, and is a conditional expression for shortening the overall length of the optical system and securing a desired zooming ratio together when a desired back focus has been secured.

By making so as to exceed a lower limit value of conditional expression (9), it is possible to prevent a decrease in the zooming ratio even in a case in which, a predetermined lens unit has been moved within the restricted range and in a case in which, the overall length of the optical system has been restricted. Whereas, by making so as to fall below an upper limit value of conditional expression (9), the correction of the off-axis aberration can be carried out advantageously and it is possible to suppress a fluctuation in the astigmatism at the time of zooming, when the overall length of the optical system has been shortened.

It is more preferable to satisfy the following conditional expression (9') instead of conditional expression (9).

$$0.9 < f_4/|f_3| < 3.2 \quad (9')$$

Furthermore, it is even more preferable to satisfy the following conditional expression (9") instead of conditional expression (9).

$$1.29 < f_4/|f_3| < 1.89 \quad (9'')$$

Moreover, in the image forming optical system according to the present embodiment, it is preferable that the following conditional expression (10) is satisfied:

$$-2.20 < \beta_{234w} < -0.45 \quad (10)$$

where,

β234w is a combined magnification at a wide angle end from the second lens unit up the fourth lens unit, and is a combined magnification at the time of infinite object point focusing.

Conditional expression (10) is a conditional expression related to securing a desired back focus and suppressing an increase in the overall length of the optical system at the telephoto end.

When the overall length of the optical system is shortened while securing the desired back focus, combined magnification of all the lens units from the second lens unit onward becomes high. As the combined magnification becomes high, it becomes easy to increase the overall length of the optical system at the telephoto end. In such case, even for suppressing the increase in the overall length of the optical system by introducing the third lens unit having a negative refractive power, it is preferable to contain the increase in the overall length of the optical system within certain range. The combined magnification of all the lens units from the second lens unit onward refers to a combined magnification when lens units from the second lens unit up to the fourth lens units are considered as one optical system.

By making so as to exceed a lower limit value of conditional expression (10), it is possible to suppress the increase in the overall length of the optical system at the telephoto end. Whereas, by making so as to fall below an upper limit value of conditional expression (10), it is possible to secure the desired back focus easily.

When falling below the lower limit value of conditional expression (10), the overall length of the optical system increases, and when exceeding the upper limit value of conditional expression (10), it becomes difficult to secure the desired back focus. In such state, when an attempt is made to shorten the overall length of the optical system at the telephoto end presumably, and to achieve the desired back focus, particularly, a fluctuation in the coma and the astigmatism at the time of zooming is susceptible to become large.

It is more preferable to satisfy the following conditional expression (10') instead of conditional expression (10).

$$-1.50 < \beta_{234w} < -0.45 \quad (10')$$

Furthermore, it is even more preferable to satisfy the following conditional expression (10") instead of conditional expression (10).

$$-1.30 < \beta_{234w} < -0.55 \quad (10'')$$

Moreover, in the image forming optical system according to the present embodiment, it is preferable that the following conditional expression (11) is satisfied:

$$-0.70 < \beta_{2w} < -0.35 \quad (11)$$

where, $\beta_{2w}$ denotes a magnification of the second lens unit at the wide angle end, and is a magnification at the time of infinite object point focusing.

Conditional expression (11) is a conditional expression related to the magnification of the second lens unit, and is a conditional expression related to suppressing an amount of movement of the second lens unit. Smaller the absolute value of magnification of the second lens unit, lesser is the amount of movement of the second lens unit at the time of zooming.

By making so as to exceed a lower limit value of conditional expression (11), the amount of movement of the second lens unit does not become large. Therefore, even in a case in which, the overall length of the optical system is restricted, a desired zooming ratio is achieved. Whereas, by making so as to fall below an upper limit value of conditional expression (11), it is possible to secure the desired back focus.

When exceeding the upper limit value of conditional expression (11), it becomes difficult to secure the desired back focus. In such state, when an attempt is made to shorten the overall length of the optical system at the telephoto end, and to achieve the desired back focus, particularly, the fluctuation in the coma and the astigmatism at the time of zooming is susceptible to become large.

It is more preferable to satisfy the following conditional expression (11') instead of conditional expression (11).

$$-0.60 < \beta_{2w} < -0.40 \quad (11')$$

Furthermore, it is even more preferable to satisfy the following conditional expression (11″) instead of conditional expression (11).

$$-0.57<\beta_{2w}<-0.41 \quad (11'')$$

Moreover, in the image forming optical system according to the present embodiment, it is preferable that the fourth lens unit does not move at the time of zooming.

By the fourth lens unit not moving (being stationary) at the time of zooming, it is possible to make a mechanism of a lens frame simple. Therefore, it is possible to make the optical system small-size. Whereas, from a view point of aberration correction, since a distance between the third lens unit and the fourth lens unit changes, there is no problem for correction even if the fourth lens unit does not move.

Moreover, in the image forming optical system according to the present embodiment, it is preferable that the following conditional expression (12) is satisfied:

$$0.6<f_w/f_2<1.4 \quad (12)$$

where, $f_w$ denotes the focal length of the overall image forming optical system at the wide angle end, and $f_2$ denotes the focal length of the second lens unit.

Conditional expression (12) is a conditional expression related to the refractive power of the second lens unit, and is a conditional expression related to suppressing the amount of movement of the second lens unit. Larger the refractive power of the second lens unit, the overall length of the optical system can be made shorter, and moreover, the purpose is served with the lesser amount of movement of the second lens unit at the time of zooming.

By making so as to exceed a lower limit value of conditional expression (12), it is possible to lessen the amount of movement of the second lens unit at the time of zooming, and moreover, it is possible to shorten the overall length of the optical system. Whereas, by making so as to fall below an upper limit value of conditional expression (12), it is possible to secure the desired back focus, and at the same time, correction of each aberration, particularly, the coma and the astigmatism, can be carried out advantageously.

It is preferable to satisfy the following conditional expression (12′) instead of conditional expression (12).

$$0.7<f_w/f_2<1.3 \quad (12')$$

Furthermore, it is even more preferable to satisfy the following conditional expression (12″) instead of conditional expression (12).

$$0.75<f_w/f_2<1.25 \quad (12'')$$

Moreover, in the image forming optical system according to the present embodiment, it is preferable that the first lens unit includes in order from the object side, a first negative lens, a second negative lens, and a positive lens, and the following conditional expression (13) is satisfied:

$$1<SF_{11n}-SF_{12n}<4.0 \quad (13)$$

where, $$SF_{11n}=(R_{11nF}+R_{11nR})/(R_{11nF}-R_{11nR}) \quad (13a)$$

$$SF_{12n}=(R_{12nF}+R_{12nR})/(R_{12nF}-R_{12nR}) \quad (13b),$$

$R_{11nF}$ denotes a paraxial radius of curvature of an object-side surface of the first negative lens in the first lens unit, $R_{11nR}$ denotes a paraxial radius of curvature of an image-side surface of the first negative lens in the first lens unit, $R_{12nF}$ denotes a paraxial radius of curvature of an object-side surface of the second negative lens in the first lens unit, and $R_{12nR}$ denotes a paraxial radius of curvature of an image-side surface of the second negative lens in the first lens unit.

In the first lens unit, the distortion, the astigmatism, and the coma are susceptible to occur. By making so as to exceed a lower limit value of conditional expression (13), it is possible to correct favorably the aberrations occurred, throughout, in a balanced manner. Here, 'throughout' refers to a range from the wide angle end up to the telephoto end at the time of zooming, and a range from an infinite object point up to a nearby point at the time of focusing.

Moreover, at the time of designing an optical system, sometimes, an arrangement becomes such that two adjacent lenses interfere (an arrangement in which a part of lenses are overlapped mutually). By making so as to fall below an upper limit value of conditional expression (13), it is possible to make an air space between the first negative lens and the second negative lens small without the first negative lens and the second negative lens interfering mutually. Therefore, it is possible to make the optical system slim.

It is more preferable to satisfy the following conditional expression (13′) instead of conditional expression (13).

$$1<SF_{11n}-SF_{12n}<3.35 \quad (13')$$

Furthermore, it is even more preferable to satisfy the following conditional expression (13″) instead of conditional expression (13).

$$1<SF_{11n}-SF_{12n}<3.1 \quad (13'')$$

Moreover, in the image forming optical system according to the present embodiment, it is preferable that the first lens unit includes in order from the object side, a first negative lens, a second negative lens, and a positive lens, and the following conditional expression (14) is satisfied:

$$-0.1<R_{1pF}/R_{12nR}<1 \quad (14)$$

where, $R_{1pF}$ denotes a paraxial radius of curvature of an object-side surface of the positive lens in the first lens unit, and $R_{12nR}$ denotes the paraxial radius of curvature of the image-side surface of the second negative lens in the first lens unit.

In the first lens unit, the distortion, the astigmatism, and the coma are susceptible to occur. By making so as to exceed a lower limit value of conditional expression (14), it is possible to correct favorably the aberrations occurred, throughout, in a balanced manner. Whereas, by making so as to fall below an upper limit value of conditional expression (14), it is possible to make an air space between the second negative lens and the positive lens small without the second negative lens and the positive lens interfering mutually. Therefore, it is possible to make the optical system slim.

It is preferable to satisfy the following conditional expression (14′) instead of conditional expression (14).

$$-0.01<R_{1pF}/R_{12nR}<1.0 \quad (14')$$

Furthermore, it is even more preferable to satisfy the following conditional expression (14″) instead of conditional expression (14).

$$0.33<R_{1pF}/R_{12nR}<1.0 \quad (14'')$$

Moreover, in the image forming optical system according to the present embodiment, it is preferable that the first lens unit includes in order from the object side, a first negative lens, a second negative lens, and a positive lens, and the following conditional expression (15) is satisfied:

$$0.1 < d_{112}/f_w < 0.7 \tag{15}$$

where, $d_{112}$ denotes an air space on an optical axis between the first negative lens and the second negative lens in the first lens unit, and $f_w$ denotes the focal length of the overall image forming optical system at a wide angle end.

In the first lens unit, the distortion, the astigmatism, and the coma are susceptible to occur. By making so as to exceed a lower limit value of conditional expression (15), it is possible to correct favorably the aberrations occurred, throughout, in a balanced manner. Whereas, by making so as to fall below an upper limit value of conditional expression (15), it is possible to suppress an increase in thickness of the first lens unit. Therefore, it is possible to make the optical system slim.

It is more preferable to satisfy the following conditional expression (15') instead of conditional expression (15).

$$0.1 < d_{112}/f_w < 0.5 \tag{15'}$$

Furthermore, it is even more preferable to satisfy the following conditional expression (15") instead of conditional expression (15).

$$0.1 < d_{112}/f_w < 0.34 \tag{15"}$$

Moreover, in the image forming optical system according to the present embodiment, it is preferable that the first lens unit includes in order from the object side, a negative lens and a positive lens, and the following conditional expression (16) is satisfied:

$$0.4 < (R_{1nF} + R_{1nR})/(R_{1nF} - R_{1nR}) < 1.5 \tag{16}$$

where, $R_{1nF}$ denotes a paraxial radius of curvature of an object-side surface of the negative lens in the first lens unit, and $R_{1nR}$ denotes a paraxial radius of curvature of an image-side surface of the negative lens in the first lens unit.

In the first lens unit, the distortion, the astigmatism, and the coma are susceptible to occur. By making so as to exceed a lower limit value of conditional expression (16), it is possible to correct favorably the aberrations occurred, throughout, in a balanced manner. Whereas, by making so as to fall below an upper limit value of conditional expression (16), it is possible to shorten the overall length of the optical system.

It is more preferable to satisfy the following conditional expression (16') instead of conditional expression (16).

$$0.4 < (R_{1nF} + R_{1nR})/(R_{1nF} - R_{1nR}) < 1.1 \tag{16'}$$

Furthermore, it is even more preferable to satisfy the following conditional expression (16") instead of conditional expression (16).

$$0.4 < (R_{1nF} + R_{1nR})/(R_{1nF} - R_{1nR}) < 1.0 \tag{16"}$$

Moreover, in the image forming optical system according to the present embodiment, it is preferable that the first lens unit includes in order from the object side, a negative lens and a positive lens, and the following conditional expression (17) is satisfied:

$$-7.0 < (R_{1pF} + R_{1pR})/(R_{1pF} - R_{1pR}) < -1.2 \tag{17}$$

where, $R_{1pF}$ denotes a paraxial radius of curvature of an object-side surface of the positive lens in the first lens unit, and $R_{1pR}$ denotes a paraxial radius of curvature of an image-side surface of the positive lens in the first lens unit.

By making so as to exceed a lower limit value of conditional expression (17), it is possible to shorten the overall length of the optical system. Moreover, in the first lens unit, the distortion, the astigmatism, and the coma are susceptible to occur. By making so as to fall below an upper limit value of conditional expression (17), it is possible to correct favorably the aberrations occurred, throughout, in a balanced manner.

It is more preferable to satisfy the following conditional expression (17') instead of conditional expression (17).

$$-4.0 < (R_{1pF} + R_{1pR})/(R_{1pF} - R_{1pR}) < -1.2 \tag{17'}$$

Furthermore, it is even more preferable to satisfy the following conditional expression (17") instead of conditional expression (17).

$$-3.7 < (R_{1pF} + R_{1pR})/(R_{1pF} - R_{1pR}) < -1.2 \tag{17"}$$

Moreover, in the image forming optical system according to the present embodiment, it is preferable that the first lens unit includes in order from the object side, a negative lens and a positive lens, and the following conditional expression (18) is satisfied:

$$0.1 < d_{12}/f_w < 0.55 \tag{18}$$

where, $d_{12}$ denotes an air space on an optical axis between the negative lens and the positive lens in the first lens unit, and $f_w$ denotes a focal length of the overall image forming optical system at a wide angle end.

In the first lens unit, the distortion, the astigmatism, and the coma are susceptible to occur. By making so as to exceed a lower limit value of conditional expression (18), it is possible to correct favorably the aberrations occurred, throughout, in a balanced manner. Whereas, by making so as to fall below an upper limit value of conditional expression (18), it is possible to suppress an increase in the thickness in the first lens unit. Therefore, it is possible to make the optical system slim.

It is more preferable to satisfy the following conditional expression (18') instead of conditional expression (18).

$$0.13 < d_{12}/f_w < 0.50 \tag{18'}$$

Furthermore, it is even more preferable to satisfy the following conditional expression (18") instead of conditional expression (18).

$$0.21 < d_{12}/f_w < 0.47 \tag{18"}$$

Moreover, in the image forming optical system according to the present embodiment, it is preferable that at the time of focusing, the third lens unit moves, and the third lens unit includes a negative lens which is disposed nearest to the object, and the following conditional expression (19) is satisfied:

$$0.4 < (R_{3F} + R_{3R})/(R_{3F} - R_{3R}) < 3.5 \tag{19}$$

where, $R_{3F}$ denotes a paraxial radius of curvature of an object-side surface of the negative lens in the third lens unit, and $R_{3R}$ denotes a paraxial radius of curvature of an image-side surface of the negative lens in the third lens unit.

Even when the third lens unit is moved, an amount of fluctuation in aberration is small. Therefore, the third lens unit is most appropriate as a lens unit for focusing.

By making so as to exceed a lower limit value of conditional expression (19), it is possible to suppress an increase in the amount of fluctuation of the spherical aberration and the coma due to focusing. Whereas, by making so as to fall below an upper limit value of conditional expression (19), even when focused at an object at a close distance at the wide angle end, it is possible to prevent the third lens unit and the fourth lens unit interfering mutually.

It is more preferable to satisfy the following conditional expression (19') instead of conditional expression (19).

$$0.5<(R_{3F}+R_{3R})/(R_{3F}-R_{3R})<2.7 \quad (19')$$

Furthermore, it is even more preferable to satisfy the following conditional expression (19") instead of conditional expression (19).

$$0.55<(R_{3F}+R_{3R})/(R_{3F}-R_{3R})<2.5 \quad (19")$$

Moreover, in the image forming optical system according to the present embodiment, it is preferable that the third lens unit includes one lens.

By making such arrangement, it is possible to make the optical system slim.

Moreover, in the image forming optical system according to the present embodiment, it is preferable that, at the time of focusing, the third lens unit moves, and the third lens unit includes a first negative lens and a second negative lens, and the following conditional expression (20) is satisfied:

$$-0.35<(R_{21R}+R_{32F})/(R_{21R}-R_{32F})<0 \quad (20)$$

where, $R_{21R}$ denotes a paraxial radius of curvature of an image-side surface of the first negative lens in the third lens unit, and $R_{32F}$ denotes a paraxial radius of curvature of an object-side surface of the second negative lens in the third lens unit.

By providing the first negative lens and the second negative lens, an air lens having a convex shape is formed between the first negative lens and the second negative lens. Conditional expression (20) is a conditional expression related to the air lens formed.

By making so as to exceed a lower limit value of conditional expression (20), it is possible to suppress an increase in an amount of fluctuation of astigmatism due to focusing. Whereas, by making so as to fall below an upper limit value of conditional expression (20), it is possible to suppress an increase in the amount of fluctuation of the spherical aberration and the coma due to focusing.

It is more preferable to satisfy the following conditional expression (20') instead of conditional expression (20).

$$-0.3<(R_{31R}+R_{32F})/(R_{31R}-R_{32F})<-0.1 \quad (20')$$

Furthermore, it is even more preferable to satisfy the following conditional expression (20") instead of conditional expression (20).

$$-0.25<(R_{31R}+R_{32F})/(R_{31R}-R_{32F})<-0.15 \quad (20")$$

Moreover, in the image forming optical system according to the present embodiment, it is preferable that the third lens unit includes a negative lens which is disposed nearest to the object, and the following conditional expression (21) is satisfied:

$$-0.2<N_4-N_{3F}<0.6 \quad (21)$$

where, $N_{3F}$ denotes a refractive index for d-line of a medium which forms the negative lens in the third lens unit, and $N_4$ denotes a refractive index for d-line of a medium which forms the positive lens component in the fourth lens unit.

By making so as to exceed an upper limit value of conditional expression (21), Petzval's sum is not susceptible to become a large positive value. Whereas, by making so as to fall below an upper limit value of conditional expression (21), it is possible to correct the chromatic aberration by using an optical material which is practicable. Although it is possible to correct the chromatic aberration even when exceeding the upper limit value of conditional expression (21), an optical material which can be used does not exist as of this moment.

It is more preferable to satisfy the following conditional expression (21') instead of conditional expression (21).

$$-0.02<N_4-N_{3F}<0.6 \quad (21')$$

Furthermore, it is even more preferable to satisfy the following conditional expression (21") instead of conditional expression (21).

$$0.11<N_4-N_{3F}<0.6 \quad (21")$$

Moreover, in the image forming optical system according to the present embodiment, it is preferable that the following conditional expression (22) is satisfied:

$$0.12<f_w/f_4<0.6 \quad (22)$$

where, $f_4$ denotes a focal length of the fourth lens unit, and $f_w$ denotes the focal length of the overall image forming optical system at the wide angle end.

By making so as to exceed a lower limit value of conditional expression (22), the refractive power of the fourth lens unit does not become excessively small. In this case, since it is not necessary to make also the refractive power of the third lens unit small, it is possible to use the third lens unit as a lens unit for focusing. Whereas, by making so as to fall below an upper limit value of conditional expression (22), the refractive power of the fourth lens unit does not become excessively large. At the time of zooming, although an angle of emergence of a principal light ray emerged from the fourth lens unit fluctuates, by a value falling below the upper limit value of conditional expression (22), it is possible to suppress the fluctuation in the angle of emergence of the principal light ray.

When the upper limit value of conditional expression (22) is exceeded, the fluctuation in the angle of emergence of the principal ray increases. In such state, when an attempt is made to make large the refractive power of the third lens unit presumably, or to make the angle of emergence of the principal ray more appropriate, the fluctuation in the coma and the astigmatism at the time of zooming in particular is susceptible to become large.

It is more preferable to satisfy the following conditional expression (22') instead of conditional expression (22).

$$0.12<f_w/f_4<0.44 \quad (22')$$

Furthermore, it is even more preferable to satisfy the following conditional expression (22") instead of conditional expression (22).

$$0.12<f_w/f_4<0.42 \quad (22")$$

Moreover, in the image forming optical system according to the present embodiment, it is preferable that the following conditional expression (23) is satisfied:

$$0.0<(R_{4F}+R_{4R})/(R_{4F}-R_{4R})<8.0 \quad (23)$$

where, $R_{4F}$ denotes a paraxial radius of curvature of an object-side surface of the fourth lens unit, and $R_{4R}$ denotes a paraxial radius of curvature of an image-side surface of the fourth lens unit.

By making so as to exceed a lower limit value of conditional expression (23), it is possible to shorten the overall length of the optical system. Whereas, by making so as to fall below an upper limit value of conditional expression (23), at the wide angle end, it is possible to prevent the third lens unit and the fourth lens unit from interfering mutually.

When exceeding the upper limit value of conditional expression (23), the third lens unit and the fourth lens unit become susceptible to interfere mutually. In such state, when an attempt is made to further shorten the overall length of the optical system presumably, or to widen a distance between the third lens unit and the fourth lens unit, the fluctuation in the coma and the astigmatism at the time of zooming in particular is susceptible to become large.

It is more preferable to satisfy the following conditional expression (23') instead of conditional expression (23).

$$0.2 < (R_{4F} + R_{4R})/(R_{4F} - R_{4R}) < 8.0 \quad (23')$$

Furthermore, it is even more preferable to satisfy the following conditional expression (23") instead of conditional expression (23).

$$0.47 < (R_{4F} + R_{4R})/(R_{4F} - R_{4R}) < 8.0 \quad (23'')$$

Moreover, in the image forming optical system according to the present embodiment, it is preferable that the following conditional expression (24) is satisfied:

$$0.8 < f_b/f_w < 1.5 \quad (24)$$

where, $f_b$ denotes a distance on an optical axis from the last surface of the fourth lens unit up to a Gauss image point, and $f_w$ denotes the focal length of the overall image forming optical system at the wide angle end.

By making so as to exceed a lower limit value of conditional expression (24), it is possible to secure a desired back focus. Whereas, by making so as to fall below an upper limit value of conditional expression (24), it is possible to suppress an increase in the overall length of the optical system. Moreover, correction of the coma and the distortion in particular, can be carried out advantageously. Here, $f_b$ is a distance obtained by air conversion.

It is more preferable to satisfy the following conditional expression (24') instead of conditional expression (24).

$$0.9 < f_b/f_w < 1.5 \quad (24')$$

Furthermore, it is even more preferable to satisfy the following conditional expression (24") instead of conditional expression (24).

$$1.0 < f_b/f_w < 1.5 \quad (24'')$$

In the image forming optical system according to the present embodiment, it is preferable to let the fourth lens unit be fixed at the time of zooming and at the time of focusing.

By fixing the fourth lens unit (making the fourth lens unit stationary) at the time of zooming and at the time of focusing, the mechanism of the lens barrel does not become complex, and the optical system does not become large in size. In a case of fixing the fourth lens unit at the time of zooming and at the time of focusing, it is preferable to satisfy conditional expression (24).

Moreover, in the image forming optical system according to the present embodiment, it is preferable that, at the time of zooming, the aperture stop moves integrally with the second lens unit.

When such an arrangement is made, it is possible to secure sufficiently a space for the second lens unit to move at the time of zooming. Moreover, it is possible to make small a fluctuation in the off-axis aberration, particularly, the fluctuation in the coma and the astigmatism, at the time of zooming.

As aforementioned, it is possible to form the third lens unit by one lens. However, in a case of letting the third lens unit to be a lens unit for focusing, it is preferable that the third lens unit includes two lenses. By making such an arrangement, correction of aberration can be carried out advantageously, and it is possible to make small an amount of movement of the third lens unit at the time of focusing. However, it is difficult to make the optical system slim.

Moreover, in a case in which, the third lens unit is formed by two lenses, it is preferable to let both the lenses to be negative lenses. However, in a case of carrying out a more favorable correction of chromatic aberration, it is preferable that the two lenses are a positive lens and a negative lens. In a case of forming the third lens unit by a negative lens and a positive lens, the negative lens and the positive lens may be arranged in any order.

Moreover, from a view point of paraxial arrangement and aberration correction, it is sufficient to form the fourth lens unit by one lens component. Forming the fourth lens unit by two or more lens components will only cause the optical system to become a large size.

An electronic image pickup apparatus of the present embodiment includes one of the aforementioned image forming optical systems, and an image pickup element having an image pickup surface.

By making such an arrangement, it is possible to realize an image pickup apparatus which includes an image forming optical system which is small-sized and thin, and which has a desired back focus and an improved imaging performance (optical performance).

For each conditional expression, it is preferable to restrict either one or both of the upper limit value and the lower limit value, as restricting the values in such manner enables to make that function assured. Moreover, for each conditional expression, only an upper limit value or a lower limit value of a numerical range of a conditional expression further restricted, may be restricted. Furthermore, for restricting the numerical range of a conditional expression, the upper limit value and the lower limit value of each conditional expression described above may be let to an upper limit value and a lower limit value of a conditional expression other than the conditional expressions mentioned above.

Examples of an image forming optical system according to certain aspects of the present invention will be described below in detail by referring to the accompanying diagrams. However, the present invention is not restricted to the example described below. Moreover, as to whether the refractive power is positive or negative depends on a paraxial radius of curvature.

Figure 1B:
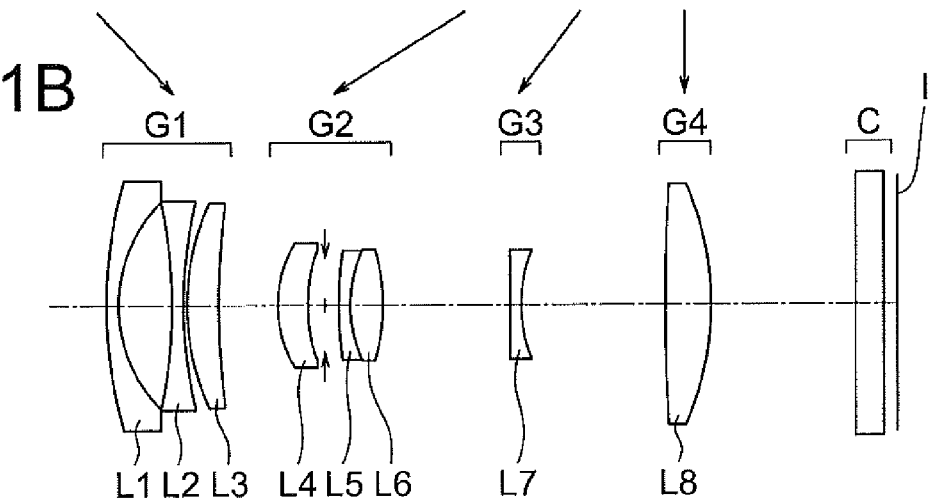
Figure 1C:
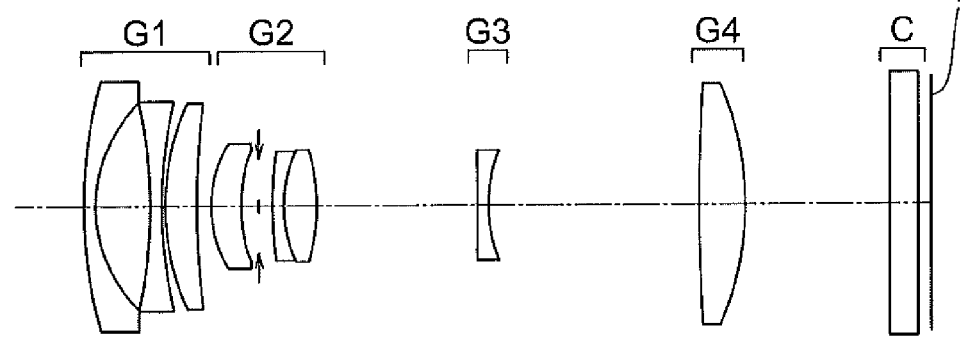

An image forming optical system according to an example 1 will be described below. FIG. 1A, FIG. 1B, and FIG. 1C are cross-sectional views (lens cross-sectional views) along an optical axis showing an optical arrangement at the time of infinite object point focusing of the image forming optical system according to the example 1, where, FIG. 1A is a cross-sectional view at a wide angle end, FIG. 1B is a cross-sectional view in an intermediate focal length state, and FIG. 1C is a cross-sectional view at a telephoto end. In all the examples that follow, in lens cross-sectional views, C denotes a cover glass, and I denotes an image pickup surface of an image pickup element.

FIG. 2A, FIG. 2B, FIG. 2C, FIG. 2D, FIG. 2E, FIG. 2F, FIG. 2G, FIG. 2H, FIG. 2I, FIG. 2J, FIG. 2K, and FIG. 2L are aberration diagrams at the time of infinite object point focusing of the image forming optical system according to the example 1, and ω denotes a half angle of view. Symbols in the aberration diagrams are common for the examples to be described below.

Moreover, in these aberration diagrams, FIG. 2A, FIG. 2B, FIG. 2C, and FIG. 2D show a spherical aberration (SA), an astigmatism (AS), a distortion (DT), and a chromatic aberration of magnification (CC) respectively, at a wide angle end.

FIG. 2E, FIG. 2F, FIG. 2G, and FIG. 2H show a spherical aberration (SA), an astigmatism (AS), a distortion (DT), and a chromatic aberration of magnification (CC) respectively, in an intermediate focal length state.

FIG. 2I, FIG. 2J, FIG. 2K, and FIG. 2L show a spherical aberration (SA), an astigmatism (AS), a distortion (DT), and a chromatic aberration of magnification (CC) respectively, at a telephoto end.

The image forming optical system according to the example 1, as shown in FIG. 1A, FIG. 1B, and FIG. 1C, includes in order from an object side, a first lens unit G1 having a negative refractive power, a second lens unit G2 having a positive refractive power, a third lens unit G3 having a negative refractive power, and a fourth lens unit G4 having a positive refractive power. Moreover, an aperture stop S is disposed in the second lens unit G2.

The first lens unit G1 includes a negative meniscus lens L1 having a convex surface directed toward the object side, a biconcave negative lens L2, and a positive meniscus lens L3 having a convex surface directed toward the object side.

The second lens unit G2 includes a positive meniscus lens L4 (first lens component) having a convex surface directed toward the object side, a negative meniscus lens L5 having a convex surface directed toward the object side, and a biconvex positive lens L6. Here, the negative meniscus lens L5 and the biconvex positive lens L6 are cemented (second lens component). The aperture stop S is disposed between the positive meniscus lens L4 and the cemented lens (negative meniscus lens L5).

The third lens unit G3 includes a biconcave negative lens L7.

The fourth lens unit G4 includes a biconvex positive lens L8.

At the time of zooming from a wide angle end to a telephoto end, the first lens unit G1, after moving toward an image side, moves toward the object side. The second lens unit G2 moves toward the object side. The third lens unit G3 moves toward the object side. The fourth lens unit G4 is fixed (stationary).

An aspheric surface is provided to a total of four surfaces namely, both surfaces of the positive meniscus lens L4, an image-side surface of the biconcave negative lens L7, and an image-side surface of the biconvex positive lens L8.

Figure 3A:
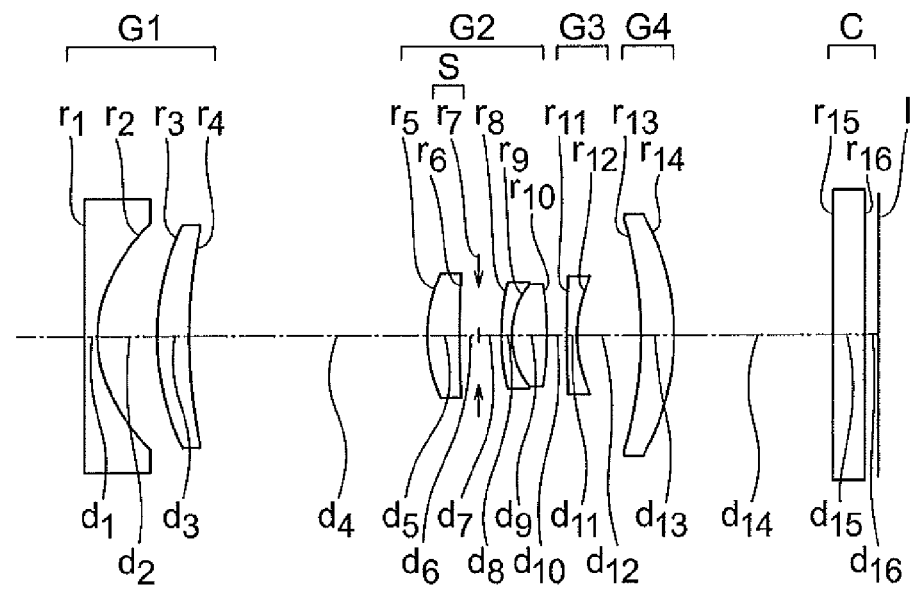
FIG. 3A, FIG. 3B, and FIG. 3C are cross-sectional views along an optical axis showing an optical arrangement at the time of infinite object point focusing of an image forming optical system according to an example 2, where.
Figure 3B:
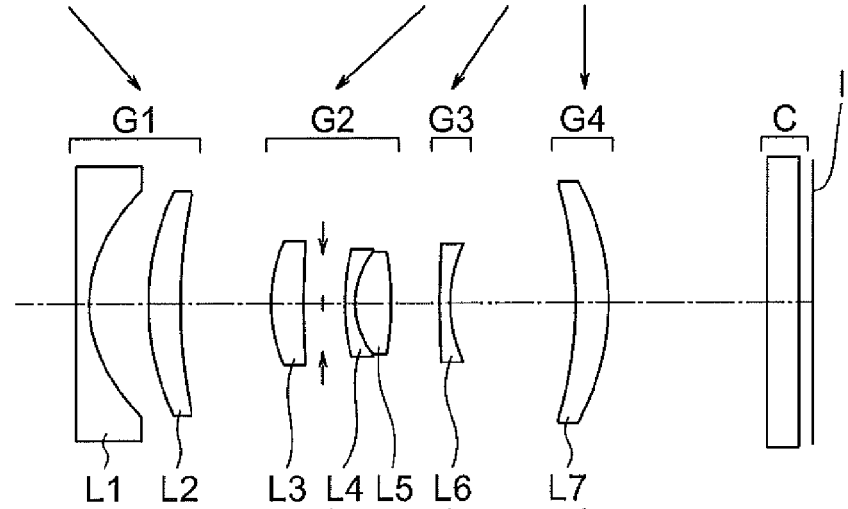
Figure 3C:
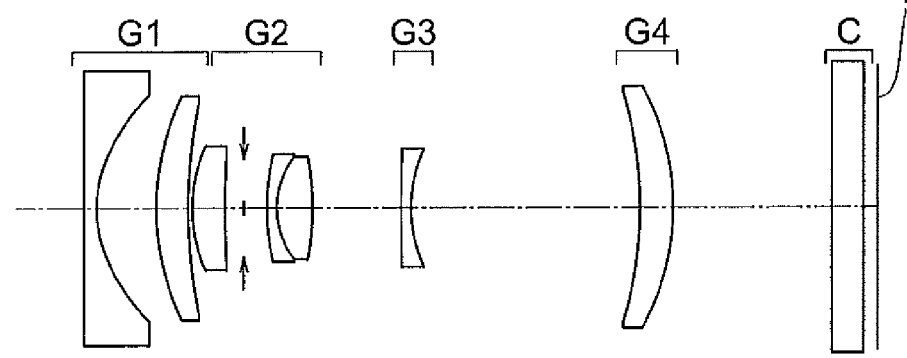

Next, an image forming optical system according to an example 2 will be described below. FIG. 3A, FIG. 3B, and FIG. 3C are cross-sectional views along an optical axis showing an optical arrangement at the time of infinite object point focusing of the image forming optical system according to the example 2. FIG. 4A, FIG. 4B, FIG. 4C, FIG. 4D, FIG. 4E, FIG. 4F, FIG. 4G, FIG. 4H, FIG. 4I, FIG. 4J, FIG. 4K, and FIG. 4L are aberration diagrams at the time of infinite object point focusing of the image forming optical system according to the example 2.

The image forming optical system according to the example 2, as shown in FIG. 3A, FIG. 3B, and FIG. 3C, includes in order from an object side, a first lens unit G1 having a negative refractive power, a second lens unit G2 having a positive refractive power, a third lens unit G3 having a negative refractive power, and a fourth lens unit G4 having a positive refractive power. Moreover, an aperture stop S is disposed in the second lens unit G2.

The first lens unit G1 includes a biconcave negative lens L1, and a positive meniscus lens L2 having a convex surface directed toward the object side.

The second lens unit G2 includes a positive meniscus lens L3 (first lens component) having a convex surface directed toward the object side, a negative meniscus lens L4 having a convex surface directed toward the object side, and a biconvex positive lens L5. Here, the negative meniscus lens L4 and the biconvex positive lens L5 are cemented (second lens component). The aperture stop S is disposed between the positive meniscus lens L3 and the cemented lens (negative meniscus lens L4).

The third lens unit G3 includes a negative meniscus lens L6 having a convex surface directed toward the object side.

The fourth lens unit G4 includes a positive meniscus lens L7 having a convex surface directed toward an image side.

At the time of zooming from a wide angle end to a telephoto end, the first lens unit G1, after moving toward the image side, moves toward the object side. The second lens unit G2 moves toward the object side. The third lens unit G3 moves toward the object side. The fourth lens unit G4 is fixed (stationary).

An aspheric surface is provided to a total of five surfaces namely, an image-side surface of the biconcave negative lens L1, both surfaces of the positive meniscus lens L3, and both surfaces of the negative meniscus lens L6.

Figure 5A:
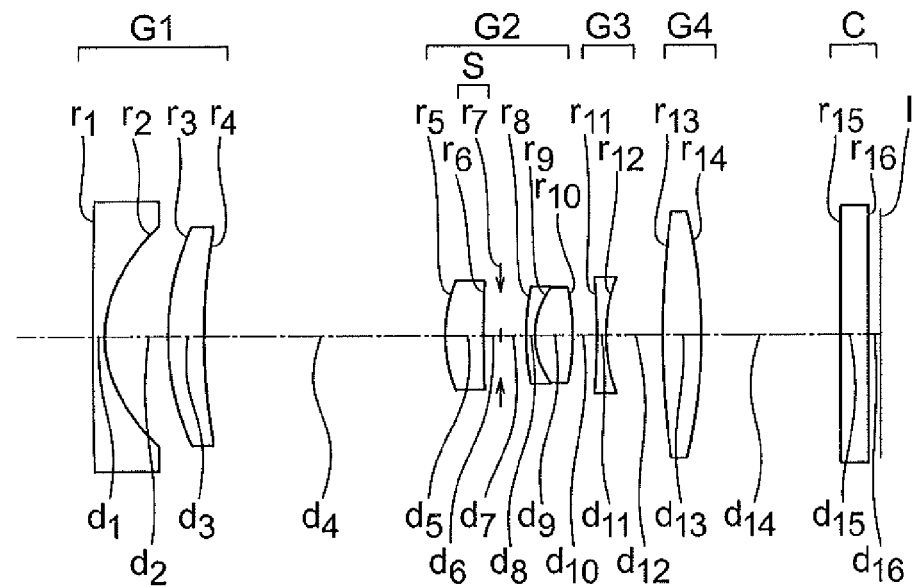
FIG. 5A, FIG. 5B, and FIG. 5C are cross-sectional views along an optical axis showing an optical arrangement at the time of infinite object point focusing of an image forming optical system according to an example 3, where.
Figure 5B:
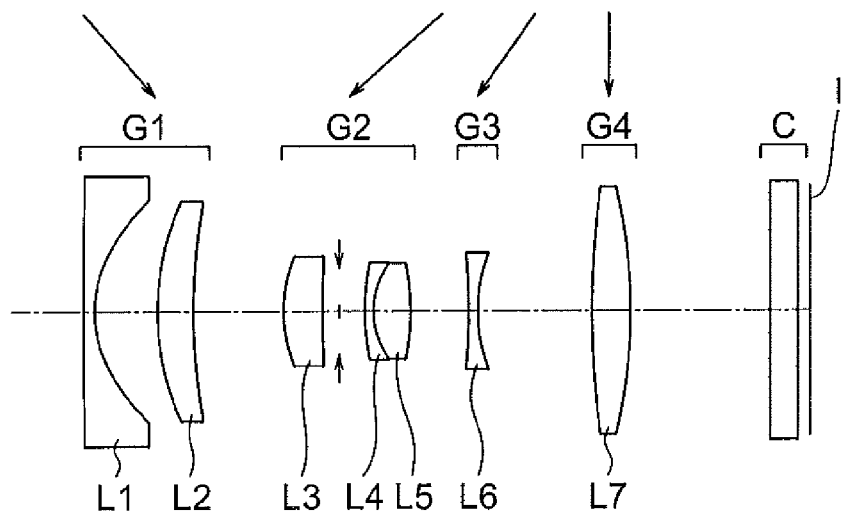
Figure 5C:
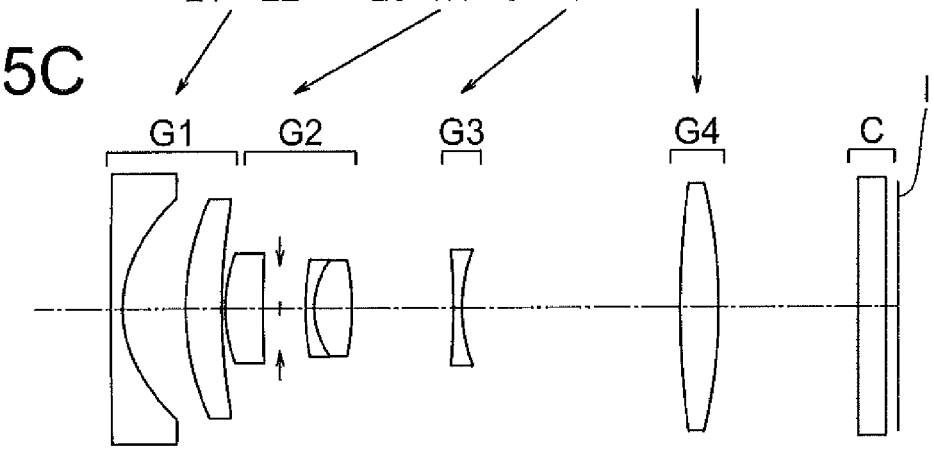

Next, an image forming optical system according to an example 3 will be described below. FIG. 5A, FIG. 5B, and FIG. 5C are cross-sectional views along an optical axis showing an optical arrangement at the time of infinite object point focusing of the image forming optical system according to the example 3. FIG. 6A, FIG. 6B, FIG. 6C, FIG. 6D, FIG. 6E, FIG. 6F, FIG. 6G, FIG. 6H, FIG. 6I, FIG. 6J, FIG. 6K, and FIG. 6L are aberration diagrams at the time of infinite object point focusing of the image forming optical system according to the example 3.

The image forming optical system according to the example 3, as shown in FIG. 5A, FIG. 5B, and FIG. 5C, includes in order from an object side, a first lens unit G1 having a negative refractive power, a second lens unit G2 having a positive refractive power, a third lens unit G3 having a negative refractive power, and a fourth lens unit G4 having a positive refractive power. Moreover, an aperture stop S is disposed in the second lens unit G2.

The first lens unit G1 includes a negative meniscus lens L1 having a convex surface directed toward the object side, and a positive meniscus lens L2 having a convex surface directed toward the object side.

The second lens unit G2 includes a positive meniscus lens L3 (first lens component) having a convex surface directed toward the object side, a negative meniscus lens L4 having a convex surface directed toward the object side, and a biconvex positive lens L5. Here, the negative meniscus lens L4 and the biconvex positive lens L5 are cemented (second lens component). The aperture stop S is disposed between the positive meniscus lens L3 and the cemented lens (negative meniscus lens L4).

The third lens unit G3 includes a biconcave negative lens L6.

The fourth lens unit G4 includes a biconvex positive lens L7.

At the time of zooming from a wide angle end to a telephoto end, the first lens unit G1, after moving toward an image side, moves toward the object side. The second lens unit G2 moves toward the object side. The third lens unit G3 moves toward the object side. The fourth lens unit G4 is fixed (stationary).

An aspheric surface is provided to a total of four surfaces namely, an image-side surface of the negative meniscus lens L1, both surfaces of the positive meniscus lens L3, and an image-side surface of the biconcave negative lens L6.

Figure 7A:
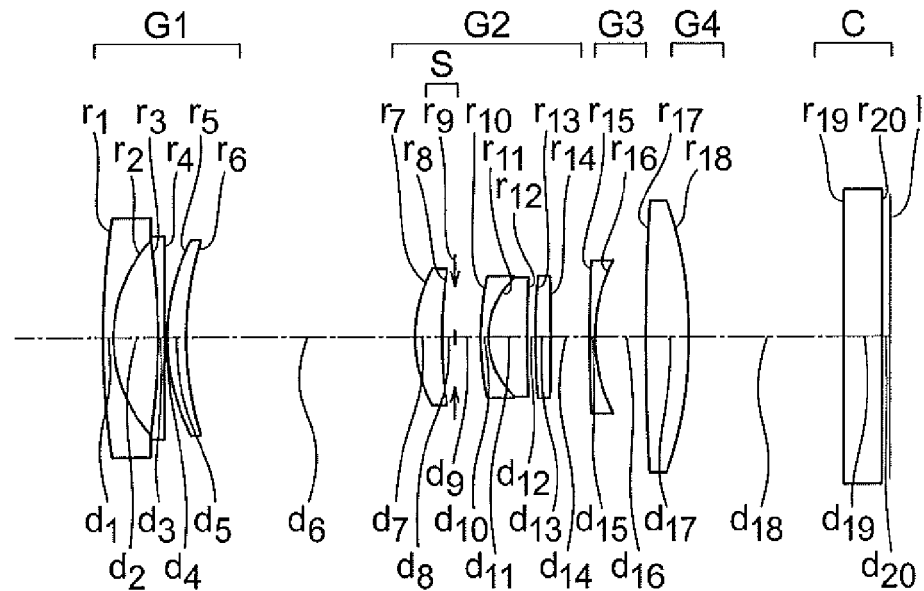
FIG. 7A, FIG. 7B, and FIG. 7C are cross-sectional views along an optical axis showing an optical arrangement at the time of infinite object point focusing of an image forming optical system according to an example 4, where.
Figure 7B:
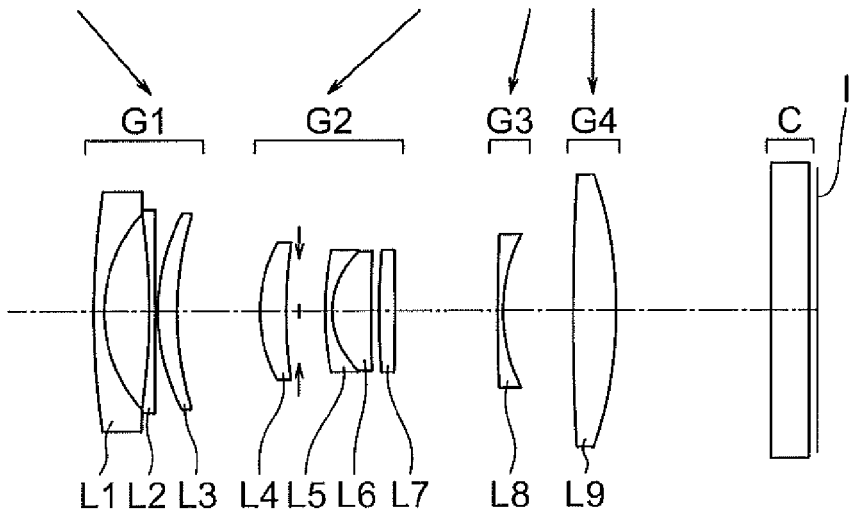
Figure 7C:
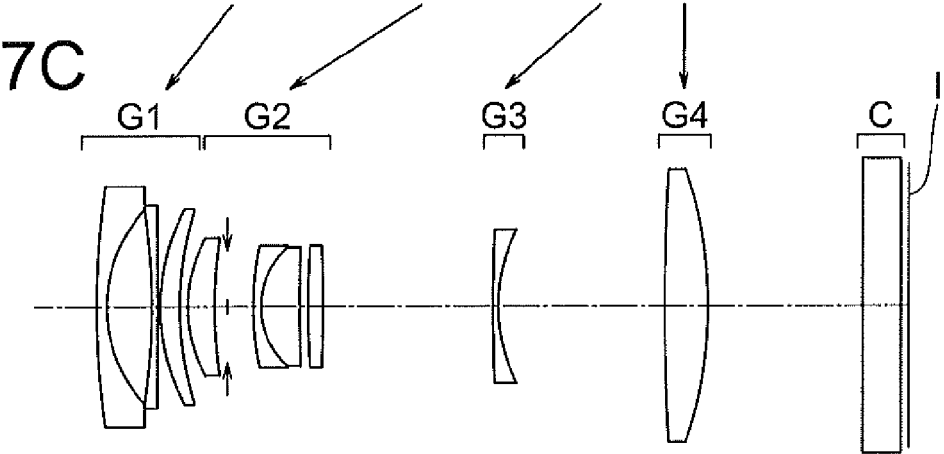

Next, an image forming optical system according to an example 4 will be described below. FIG. 7A, FIG. 7B, and FIG. 7C are cross-sectional views along an optical axis showing an optical arrangement at the time of infinite object point focusing of the image forming optical system according to the example 4. FIG. 8A, FIG. 8B, FIG. 8C, FIG. 8D, FIG. 8E, FIG. 8F, FIG. 8G, FIG. 8H, FIG. 8I, FIG. 8J, FIG. 8K, and FIG. 8L are aberration diagrams at the time of infinite object point focusing of the image forming optical system according to the example 4.

The image forming optical system according to the example 4, as shown in FIG. 7A, FIG. 7B, and FIG. 7C, includes in order from an object side, a first lens unit G1 having a negative refractive power, a second lens unit G2 having a positive refractive power, a third lens unit G3 having a negative refractive power, and a fourth lens unit G4 having a positive refractive power. Moreover, an aperture stop S is disposed in the second lens unit G2.

The first lens unit G1 includes a negative meniscus lens L1 having a convex surface directed toward the object side, a negative meniscus lens L2 having a convex surface directed toward an image side, and a positive meniscus lens L3 having a convex surface directed toward the object side.

The second lens unit G2 includes a positive meniscus lens L4 (first lens component) having a convex surface directed toward the object side, a negative meniscus lens L5 having a convex surface directed toward the object side, a biconvex positive lens L6, and a biconvex positive lens L7 (third lens component). Here, the negative meniscus lens L5 and the biconvex positive lens L6 are cemented (second lens component). The aperture stop S is disposed between the positive meniscus lens L4 and the cemented lens (negative meniscus lens L5).

The third lens unit G3 includes a negative meniscus lens L8 having a convex surface directed toward the object side.

The fourth lens unit G4 includes a biconvex positive lens L9.

At the time of zooming from a wide angle end to a telephoto end, the first lens unit G1, after moving toward the image side, moves toward the object side. The second lens unit G2 moves toward the object side. The third lens unit G3 moves toward the object side. The fourth lens unit G4 is fixed (stationary).

An aspheric surface is provided to a total of six surfaces namely, an object-side surface of the negative meniscus lens L1, an object-side surface of the negative meniscus lens L2, an object-side surface of the positive meniscus lens L4, an image-side surface of the biconvex positive lens 6, an image-side surface of the negative meniscus lens L8, and an image-side surface of the biconvex positive lens L9.

Figure 9A:
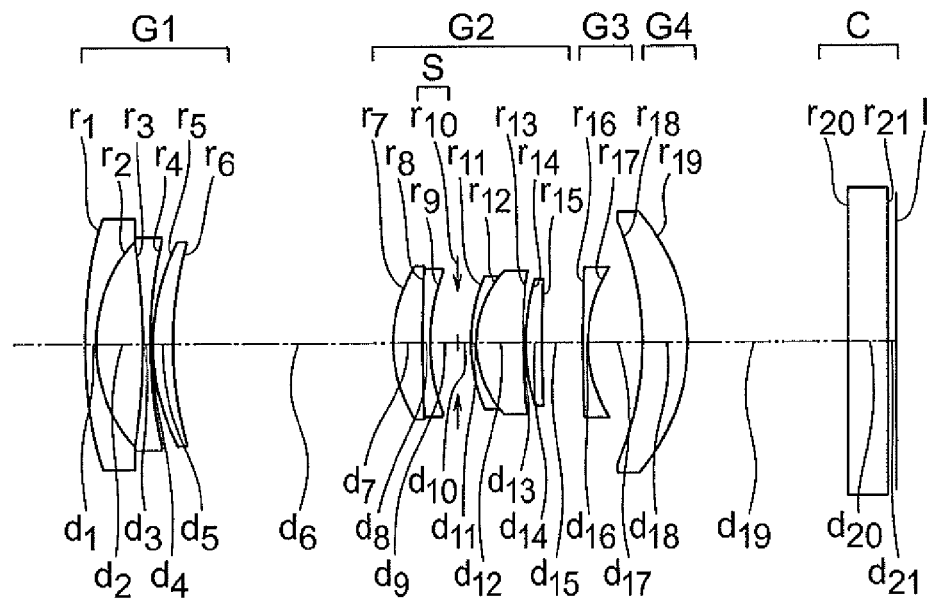
FIG. 9A, FIG. 9B, and FIG. 9C are cross-sectional views along an optical axis showing an optical arrangement at the time of infinite object point focusing of an image forming optical system according to an example 5, where.
Figure 9B:
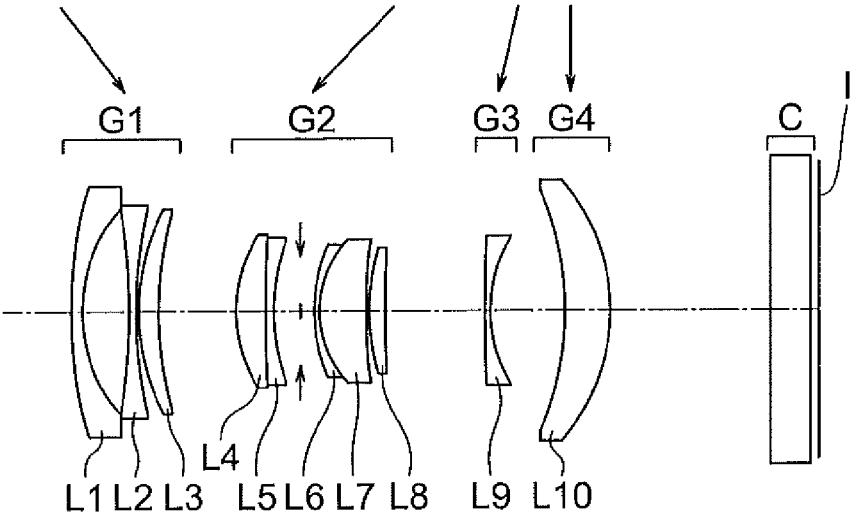
Figure 9C:
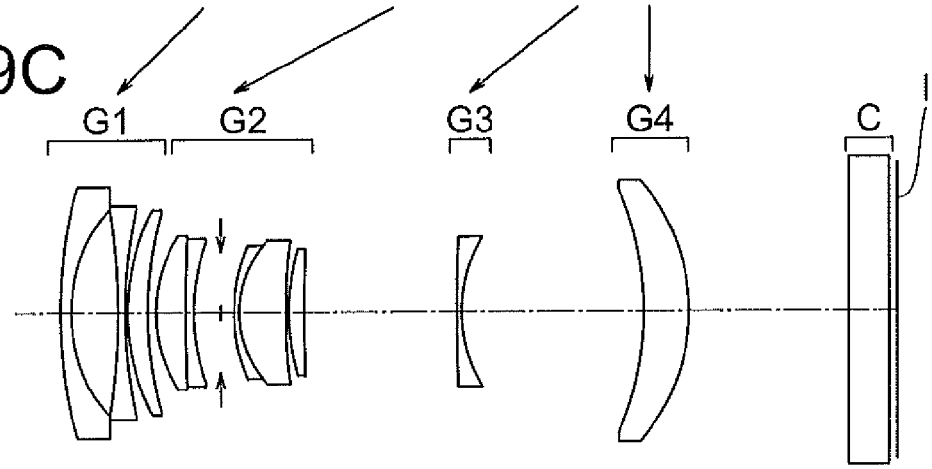

Next, an image forming optical system according to an example 5 will be described below. FIG. 9A, FIG. 9B, and FIG. 9C are cross-sectional views along an optical axis showing an optical arrangement at the time of infinite object point focusing of the image forming optical system according to the example 5. FIG. 10A, FIG. 10B, FIG. 10C, FIG. 10D, FIG. 10E, FIG. 10F, FIG. 10G, FIG. 10H, FIG. 10I, FIG. 10J, FIG. 10K, and FIG. 10L are aberration diagrams at the time of infinite object point focusing of the image forming optical system according to the example 5.

The image forming optical system according to the example 5, as shown in FIG. 9A, FIG. 9B, and FIG. 9C, includes in order from an object side, a first lens unit G1 having a negative refractive power, a second lens unit G2 having a positive refractive power, a third lens unit G3 having a negative refractive power, and a fourth lens unit G4 having a positive refractive power. Moreover, an aperture stop S is disposed in the second lens unit G2.

The first lens unit G1 includes a negative meniscus lens L1 having a convex surface directed toward an object side, a biconcave negative lens L2, and a positive meniscus lens L3 having a convex surface directed toward the object side.

The second lens unit G2 includes a positive meniscus lens L4 having a convex surface directed toward the object side, a negative meniscus lens L5 having a convex surface directed toward the object side, a negative meniscus lens L6 having a convex surface directed toward the object side, a positive meniscus lens L7 having a convex surface directed toward the object side, and a positive meniscus lens L8 (third lens component) having a convex surface directed toward the object side. Here, the positive meniscus lens L4 and the negative meniscus lens L5 are cemented (first lens component). Moreover, the negative meniscus lens L6 and the positive meniscus lens L7 are cemented (second lens component). The aperture stop S is disposed between the two cemented lenses (between the negative meniscus lens L5 and the negative meniscus lens L6).

The third lens unit G3 includes a negative meniscus lens L9 having a convex surface directed toward the object side.

The fourth lens unit G4 includes a positive meniscus lens L10 having a convex surface directed toward an image side.

At the time of zooming from a wide angle end to a telephoto end, the first lens unit G1, after moving toward the image side, moves toward the object side. The second lens unit G2 moves toward the object side. The third lens unit G3 moves toward the object side. The fourth lens unit G4 is fixed (stationary).

An aspheric surface is provided to a total of six surfaces namely, both surfaces of the negative meniscus lens L1, an object-side surface of the positive meniscus lens L4, an image-side surface of the positive meniscus lens L7, an image-side surface of the negative meniscus lens L9, and an image-side surface of the positive meniscus lens L10.

Figure 11A:
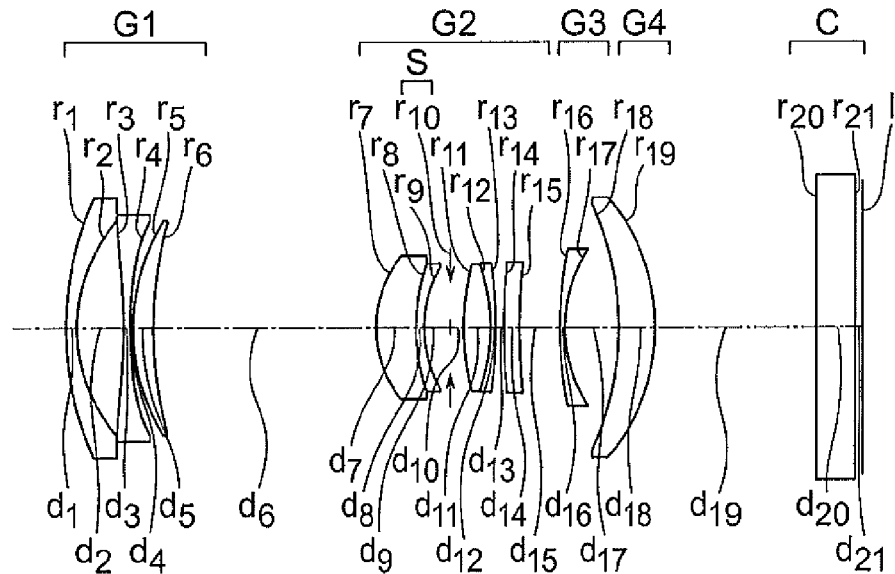
FIG. 11A, FIG. 11B, and FIG. 11C are cross-sectional views along an optical axis showing an optical arrangement at the time of infinite object point focusing of an image forming optical system according to an example 6, where.
Figure 11B:
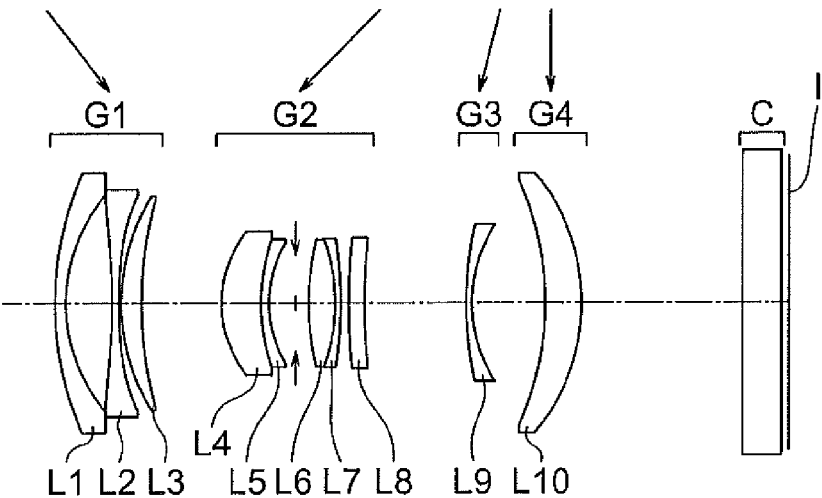
Figure 11C:
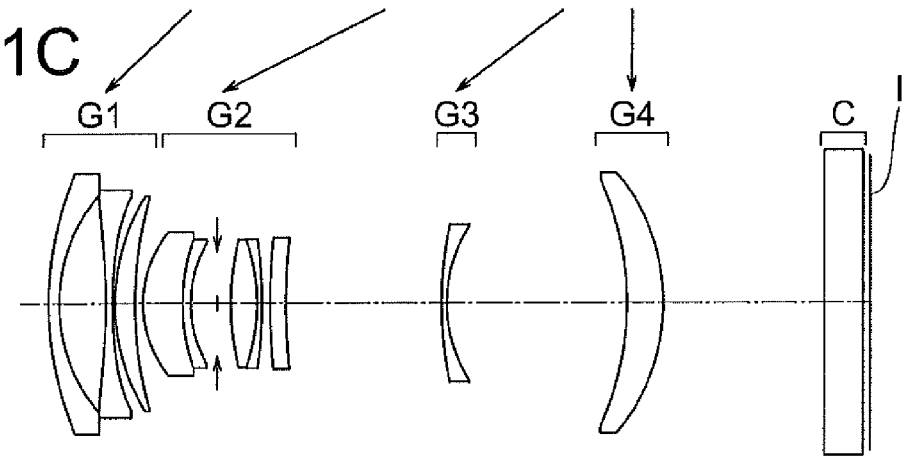

Next, an image forming optical system according to an example 6 will be described below. FIG. 11A, FIG. 11B, and FIG. 11C are cross-sectional views along an optical axis showing an optical arrangement at the time of infinite object point focusing of the image forming optical system according to the example 6. FIG. 12A, FIG. 12B, FIG. 12C, FIG. 12D, FIG. 12E, FIG. 12F, FIG. 12G, FIG. 12H, FIG. 12I, FIG. 12J, FIG. 12K, and FIG. 12L are aberration diagrams at the time of infinite object point focusing of the image forming optical system according to the example 6.

The image forming optical system according to the example 6, as shown in FIG. 11A, FIG. 11B, and FIG. 11C, includes in order from an object side, a first lens unit G1 having a negative refractive power, a second lens unit G2 having a positive refractive power, a third lens unit G3 having a negative refractive power, and a fourth lens unit G4 having a positive refractive power. Moreover, an aperture stop S is disposed in the second lens unit G2.

The first lens unit G1 includes a negative meniscus lens L1 having a convex surface directed toward the object side, a biconcave negative lens L2, and a positive meniscus lens L3 having a convex surface directed toward the object side.

The second lens unit G2 includes a positive meniscus lens L4 having a convex surface directed toward the object side, a negative meniscus lens L5 having a convex surface directed toward the object side, a biconvex positive lens L6, a negative meniscus lens L7 having a convex surface directed toward an image side, an a negative meniscus lens L8 (third lens component) having a convex surface directed toward the object side. Here, the positive meniscus lens L4 and the negative meniscus lens L5 are cemented (first lens component). Moreover, the biconvex positive lens L6 and the negative meniscus lens L7 are cemented (second lens component). The aperture stop S is disposed between the two cemented lenses (between the negative meniscus lens L5 and the biconvex positive lens L6).

The third lens unit G3 includes a negative meniscus lens L9 having a convex surface directed toward the object side.

The fourth lens unit G4 includes a positive meniscus lens L10 having a convex surface directed toward the image side.

At the time of zooming from a wide angle end to a telephoto end, the first lens unit G1, after moving toward the image side, moves toward the object side. The second lens unit G2 moves toward the object side. The third lens unit G3 moves toward the object side. The fourth lens unit G4 is fixed (stationary).

An aspheric surface is provided to a total of six surfaces namely, both surfaces of the biconcave negative lens L2, an object-side surface of the positive meniscus lens L4, an object-side surface of the biconvex positive lens L6, an image-side surface of the negative meniscus lens L9, and an image-side surface of the positive meniscus lens L10.

Figure 13A:
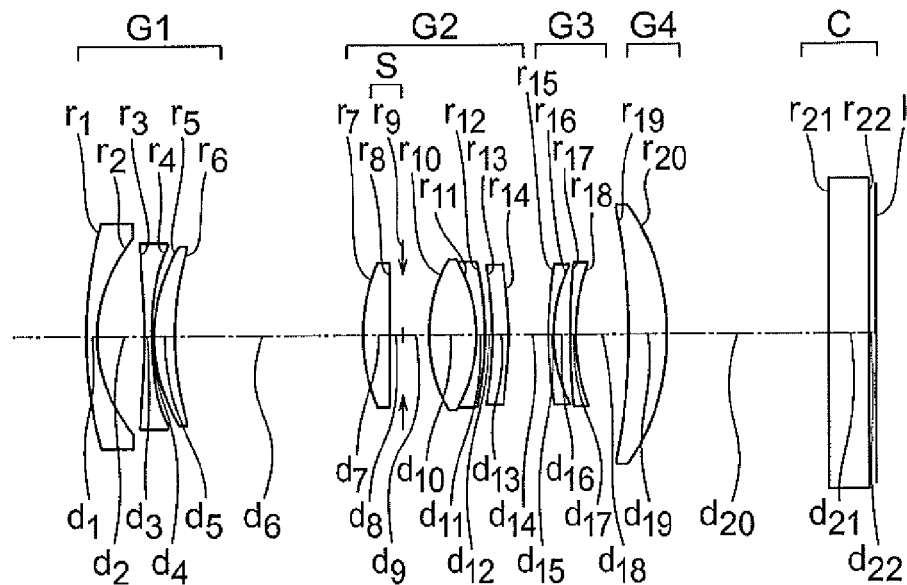
FIG. 13A, FIG. 13B, and FIG. 13C are cross-sectional views along an optical axis showing an optical arrangement at the time of infinite object point focusing of an image forming optical system according to an example 7, where.
Figure 13B:
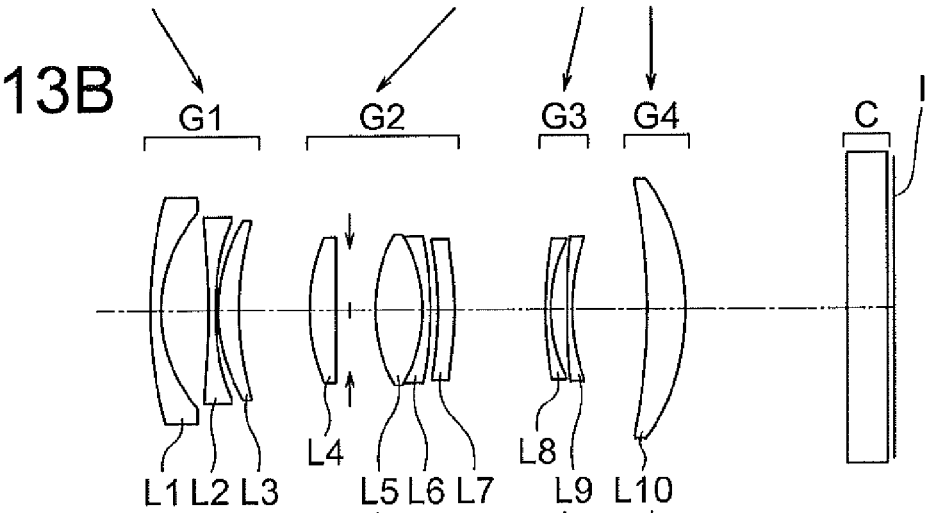
Figure 13C:
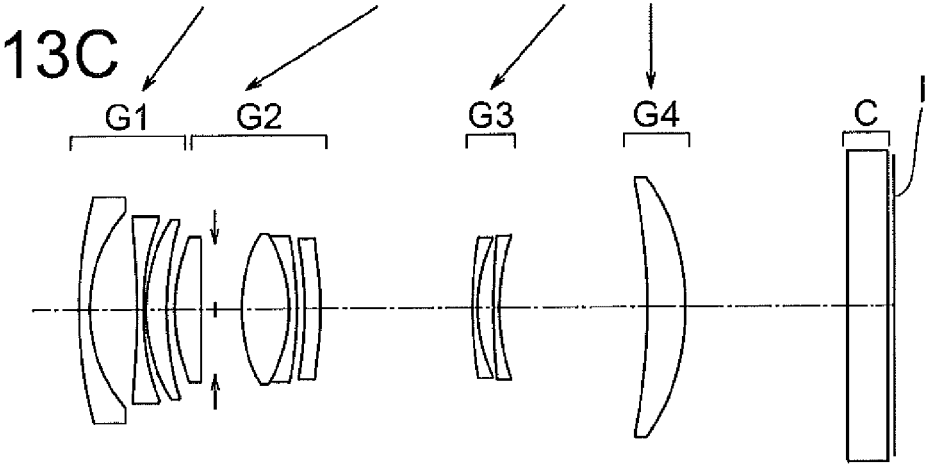

Next, an image forming optical system according to an example 7 will be described below. FIG. 13A, FIG. 13B, and FIG. 13C are cross-sectional views along an optical axis showing an optical arrangement at the time of infinite object point focusing of the image forming optical system according to the example 7. FIG. 14A, FIG. 14B, FIG. 14C, FIG. 14D, FIG. 14E, FIG. 14F, FIG. 14G, FIG. 14H, FIG. 14I, FIG. 14J, FIG. 14K, and FIG. 14L are aberration diagrams at the time of infinite object point focusing of the image forming optical system according to the example 7.

The image forming optical system according to the example 7, as shown in FIG. 13A, FIG. 13B, and FIG. 13c, includes in order from an object side, a first lens unit G1 having a negative refractive power, a second lens unit G2 having a positive refractive power, a third lens unit G3 having a negative refractive power, and a fourth lens unit G4 having a positive refractive power. Moreover, an aperture stop S is disposed in the second lens unit G2.

The first lens unit G1 includes a negative meniscus lens L1 having a convex surface directed toward the object side, a biconcave negative lens L2, and a positive meniscus lens L3 having a convex surface directed toward the object side.

The second lens unit G2 includes a biconvex positive lens L4 (first lens component), a biconvex positive lens L5, a negative meniscus lens L6 having a convex surface directed toward an image side, and a positive meniscus lens L7 (third lens component) having a convex surface directed toward the image side. Here, the biconvex positive lens L5 and the negative meniscus lens L6 are cemented (second lens component). The aperture stop S is disposed between the biconvex positive lens L4 and the cemented lens (biconvex positive lens L5).

The third lens unit G3 includes a negative meniscus lens L8 having a convex surface directed toward the object side, and a negative meniscus lens L9 having a convex surface directed toward the object side.

The fourth lens unit G4 includes a positive meniscus lens L10 having a convex surface directed toward the image side.

At the time of zooming from a wide angle end to a telephoto end, the first lens unit G1, after moving toward the image side, moves toward the object side. The second lens unit G2 moves toward the object side. The third lens unit G3 moves toward the object side. The fourth lens unit G4 is fixed (stationary).

An aspheric surface is provided to a total of seven surfaces namely, both surfaces of the biconcave negative lens L2, an object side surface of the biconvex positive lens L4, an object-side surface of the biconvex positive lens L5, an image-side surface of the positive meniscus lens L7, an image-side surface of the negative meniscus lens L8, and an image side surface of the positive meniscus lens L10.

Figure 15A:
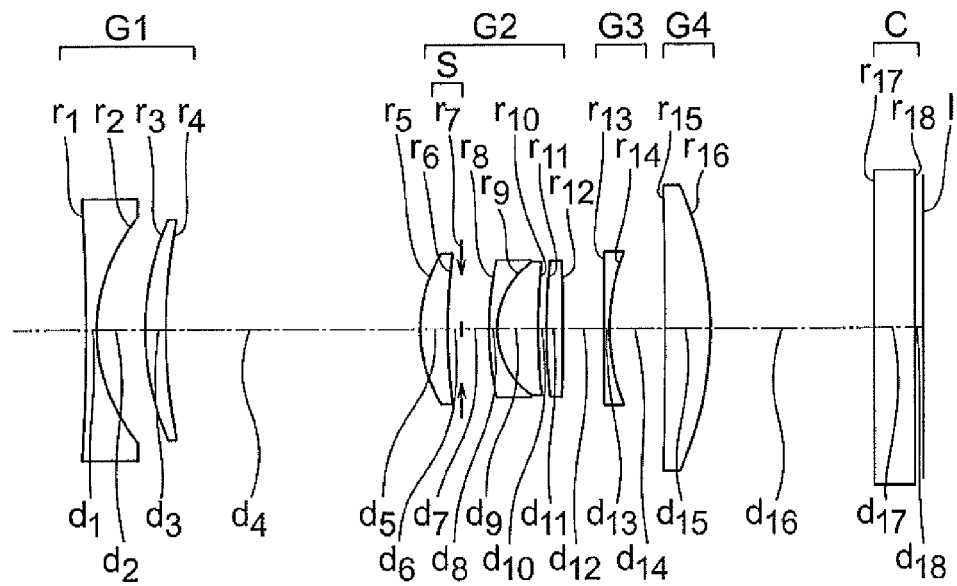
FIG. 15A, FIG. 15B, and FIG. 15C are cross-sectional views along an optical axis showing an optical arrangement at the time of infinite object point focusing of an image forming optical system according to an example 8, where.
Figure 15B:
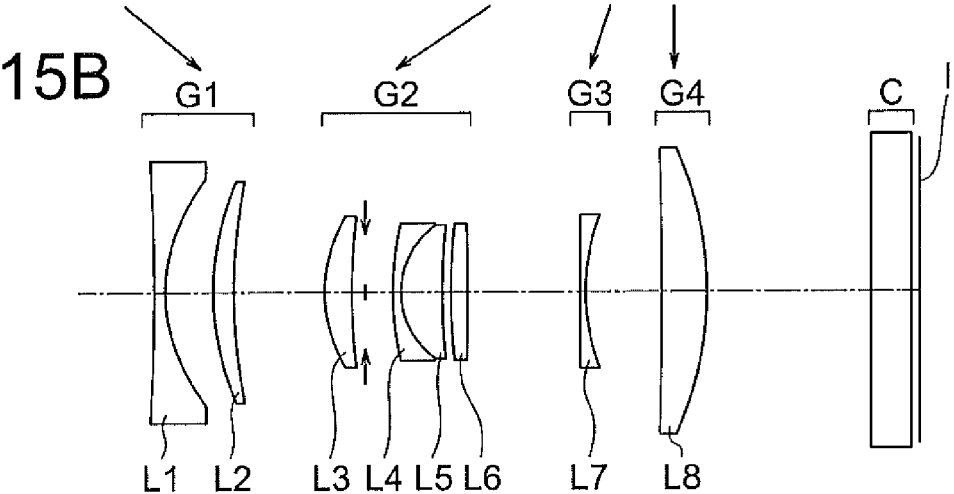
Figure 15C:
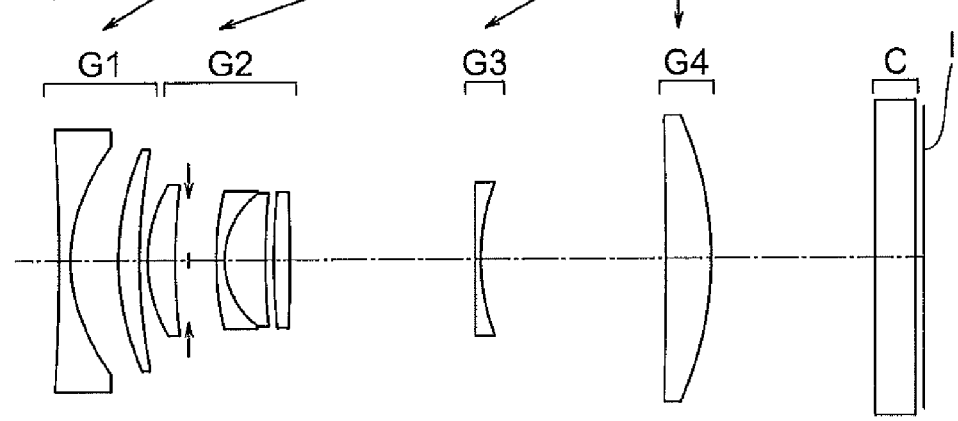

Next, an image forming optical system according to an example 8 will be described below. FIG. 15A, FIG. 15B, and FIG. 15C are cross-sectional views along an optical axis showing an optical arrangement at the time of infinite object point focusing of the image forming optical system according to the example 8. FIG. 16A, FIG. 16B, FIG. 16C, FIG. 16D, FIG. 16E, FIG. 16F, FIG. 16G, FIG. 16H, FIG. 16I, FIG. 16J, FIG. 16K, and FIG. 16L are aberration diagrams at the time of infinite object point focusing of the image forming optical system according to the example 8.

The image forming optical system according to the example 8, as shown in FIG. 15A, FIG. 15B, and FIG. 15C, includes in order from an object side, a first lens unit G1 having a negative refractive power, a second lens unit G2 having a positive refractive power, a third lens unit G3 having a negative refractive power, and a fourth lens unit G4 having a positive refractive power. Moreover, an aperture stop S is disposed in the second lens unit G2.

The first lens unit G1 includes a biconcave negative lens L1, and a positive meniscus lens L2 having a convex surface directed toward the object side.

The second lens unit G2 includes a positive meniscus lens L3 (first lens component) having a convex surface directed toward the object side, a negative meniscus lens L4 having a convex surface directed toward the object side, a positive meniscus lens L5 having a convex surface directed toward the object side, and a biconvex positive lens L6 (third lens component). Here, the negative meniscus lens L4 and the positive meniscus lens L5 are cemented (second lens component). The aperture stop S is disposed between the positive meniscus lens L3 and the cemented lens (negative meniscus lens L4).

The third lens unit G3 includes a negative meniscus lens L7 having a convex surface directed toward the object side.

The fourth lens unit G4 includes a positive meniscus lens L8 having a convex surface directed toward an image side.

At the time of zooming from a wide angle end to a telephoto end, the first lens unit G1, after moving toward the image side, moves toward the object side. The second lens unit G2 moves toward the object side. The third lens unit G3 moves toward the object side. The fourth lens unit G4 is fixed (stationary).

An aspheric surface is provided to a total of six surfaces namely, both surfaces of the biconcave negative lens L1, an object-side surface of the positive meniscus lens L3, an image side surface of the positive meniscus lens L5, an image-side surface of the negative meniscus lens L7, and an image-side surface of the positive meniscus lens L8.

Figure 17A:
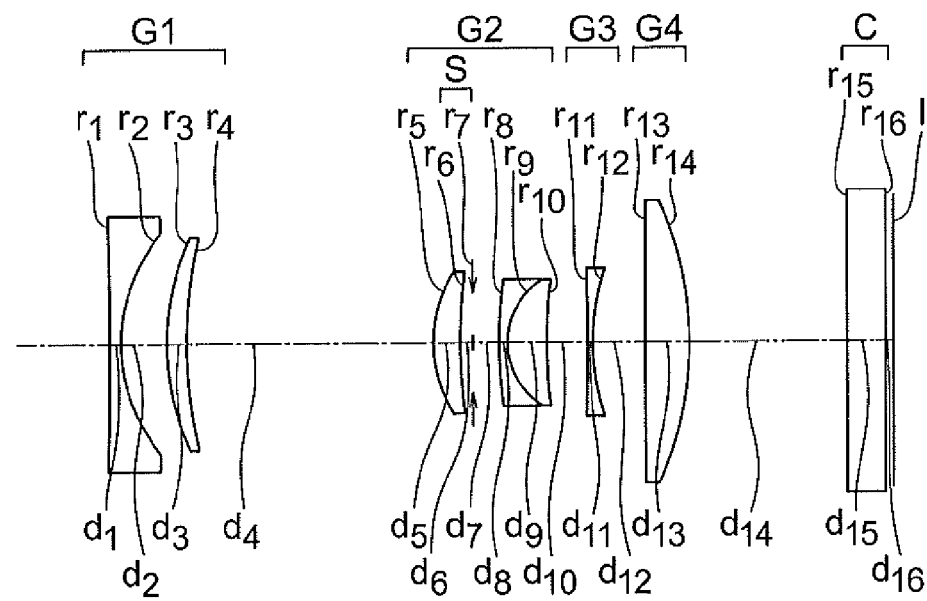
FIG. 17A, FIG. 17B, and FIG. 17C are cross-sectional views along an optical axis showing an optical arrangement at the time of infinite object point focusing of an image forming optical system according to an example 9, where.
Figure 17B:
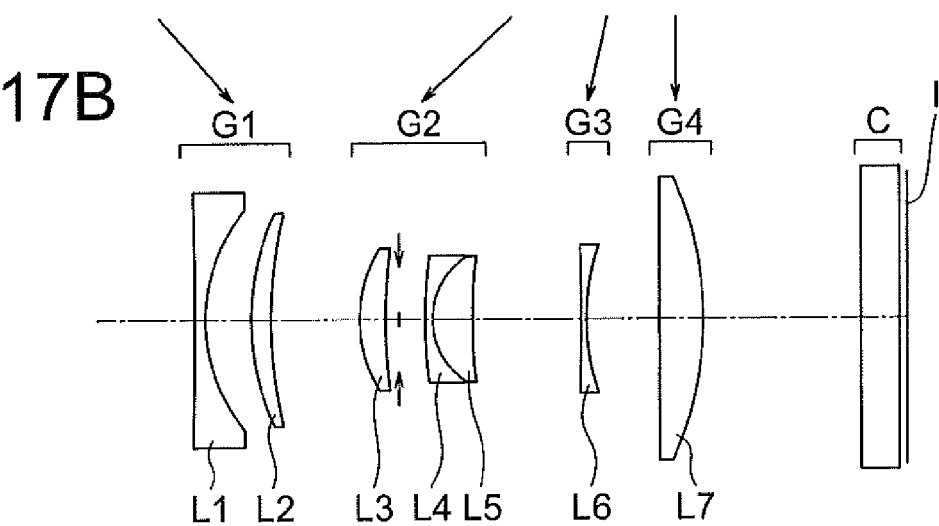
Figure 17C:
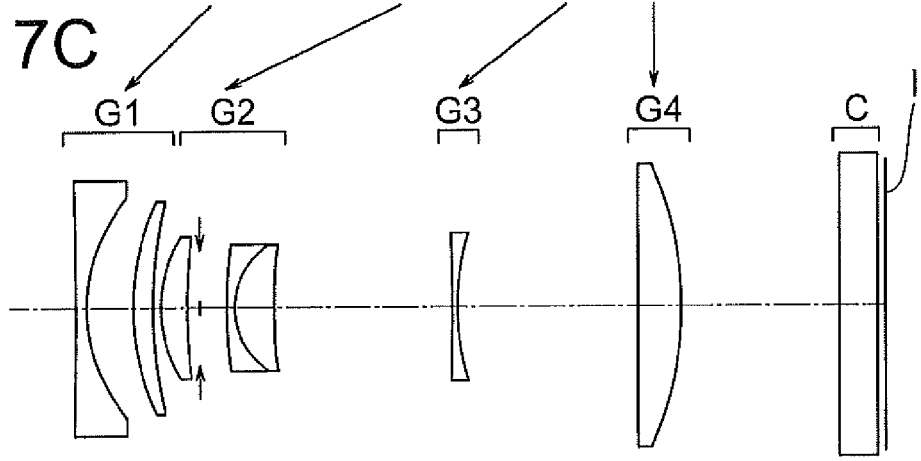

Next, an image forming optical system according to an example 9 will be described below. FIG. 17A, FIG. 17B, and FIG. 17C are cross-sectional views along an optical axis showing an optical arrangement at the time of infinite object point focusing of the image forming optical system according to the example 9. FIG. 18A, FIG. 18B, FIG. 18C, FIG. 18D, FIG. 18E, FIG. 18F, FIG. 18G, FIG. 18H, FIG. 18I, FIG. 18J, FIG. 18K, and FIG. 18L are aberration diagrams at the time of infinite object point focusing of the image forming optical system according to the example 9.

The image forming optical system according to the example 9, as shown in FIG. 17A, FIG. 17B, and FIG. 17C, includes in order from an object side, a first lens unit G1 having a negative refractive power, a second lens unit G2 having a positive refractive power, a third lens unit G2 having a negative refractive power, and a fourth lens unit G4 having a positive refractive power. Moreover, an aperture stop S is disposed in the second lens unit G2.

The first lens unit G1 includes a biconcave negative lens L1, and a positive meniscus lens L2 having a convex surface directed toward the object side.

The second lens unit G2 includes a positive meniscus lens L3 (first lens component) having a convex surface directed toward the object side, a negative meniscus lens L4 having a convex surface directed toward the object side, and a positive meniscus lens L5 having a convex surface directed toward the object side. Here, the negative meniscus lens L4 and the positive meniscus lens L5 are cemented (second lens component). The aperture stop S is disposed between the positive meniscus lens L3 and the cemented lens (negative meniscus lens L4).

The third lens unit G3 includes a biconcave negative lens L6.

The fourth lens unit G4 includes a biconvex positive lens L7.

At the time of zooming from a wide angle end to a telephoto end, the first lens unit G1, after moving toward an image side, moves toward the object side. The second lens unit G2 moves toward the object side. The third lens unit G3 moves toward the object side. The fourth lens unit G4 is fixed (stationary).

An aspheric surface is provided to a total of six surfaces namely, both surfaces of the biconcave negative lens L1, an object-side surface of the positive meniscus lens L3, an image-side surface of the positive meniscus lens L5, an image-side surface of the biconcave negative lens L6, and an image-side surface of the biconvex positive lens L7.

Figure 19A:
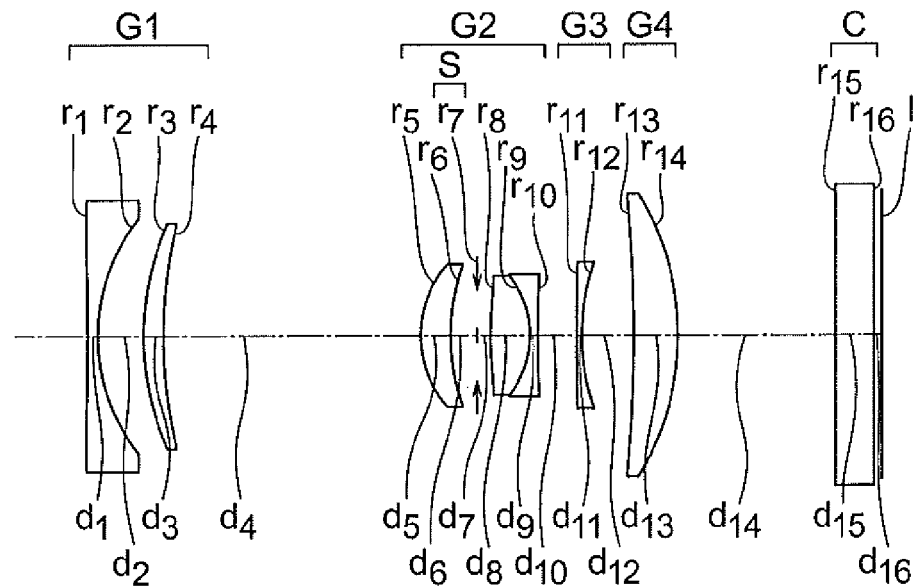
FIG. 19A, FIG. 19B, and FIG. 19C are cross-sectional views along an optical axis showing an optical arrangement at the time of infinite object point focusing of an image forming optical system according to an example 10, where.
Figure 19B:
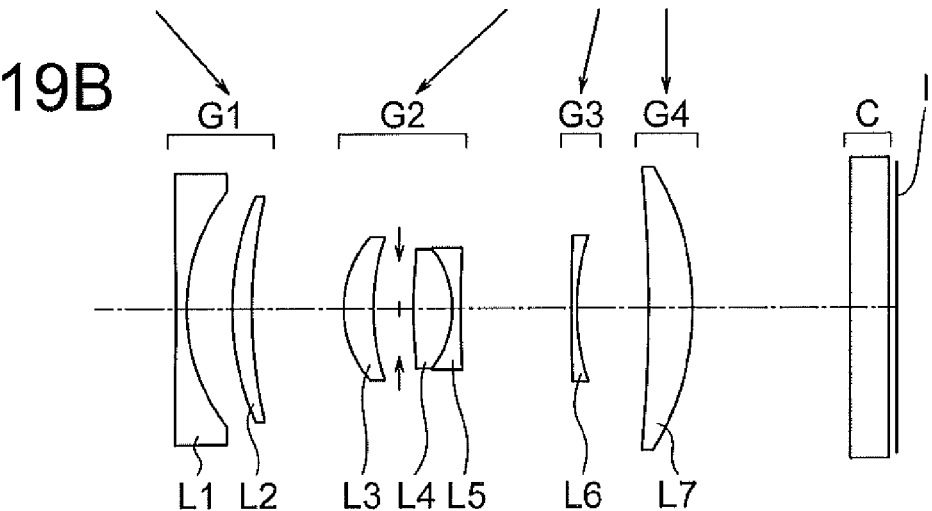
Figure 19C:
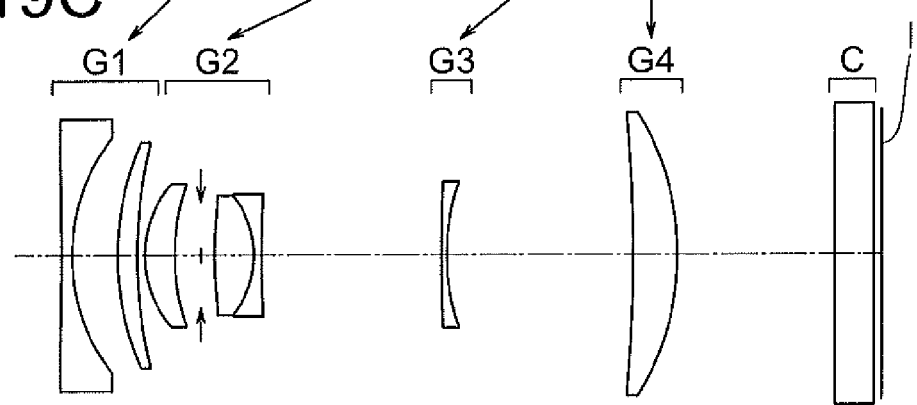

Next, an image forming optical system according to an example 10 will be described below. FIG. 19A, FIG. 19B, and FIG. 19C are cross-sectional views along an optical axis showing an optical arrangement at the time of infinite object point focusing of the image forming optical system according to the example 10. FIG. 20A, FIG. 20B, FIG. 20C, FIG. 20D, FIG. 20E, FIG. 20F, FIG. 20G, FIG. 20H, FIG. 20I, FIG. 20J, FIG. 20K, and FIG. 20L are aberration diagrams at the time of infinite object point focusing of the image forming optical system according to the example 10.

The image forming optical system according to the example 10, as shown in FIG. 19A, FIG. 19B, and FIG. 19C, includes in order from an object side, a first lens unit G1 having a negative refractive power, a second lens unit G2 having a positive refractive power, a third lens unit G3 having a negative refractive power, and a fourth lens unit G4 having a positive refractive power. Moreover, an aperture stop S is disposed in the second lens unit G2.

The first lens unit G1 includes a biconcave negative lens L1, and a positive meniscus lens L2 having a convex surface directed toward the object side.

The second lens unit G2 includes a positive meniscus lens L3 (first lens component) having a convex surface directed toward the object side, a biconvex positive lens L4, and a biconcave negative lens L5. Here, the biconvex positive lens L4 and the biconcave negative lens L5 are cemented (second lens component). The aperture stop S is disposed between the positive meniscus lens L3 and the cemented lens (biconvex positive lens L4).

The third lens unit G3 includes a negative meniscus lens L6 having a convex surface directed toward the object side.

The fourth lens unit G4 includes a positive meniscus lens L7 having a convex surface directed toward an image side.

At the time of zooming from a wide angle end to a telephoto end, the first lens unit G1, after moving toward the image side, moves toward the object side. The second lens unit G2 moves toward the object side. The third lens unit G3 moves toward the object side. The fourth lens unit G4 is fixed (stationary).

An aspheric surface is provided to a total of six surfaces namely, both surfaces of the biconcave negative lens L1, an object-side surface of the positive meniscus lens L3, an object-side surface of the biconvex positive lens L4, an image-side surface of the negative meniscus lens L6, and an image-side surface of the positive meniscus lens L7.

Figure 21A:
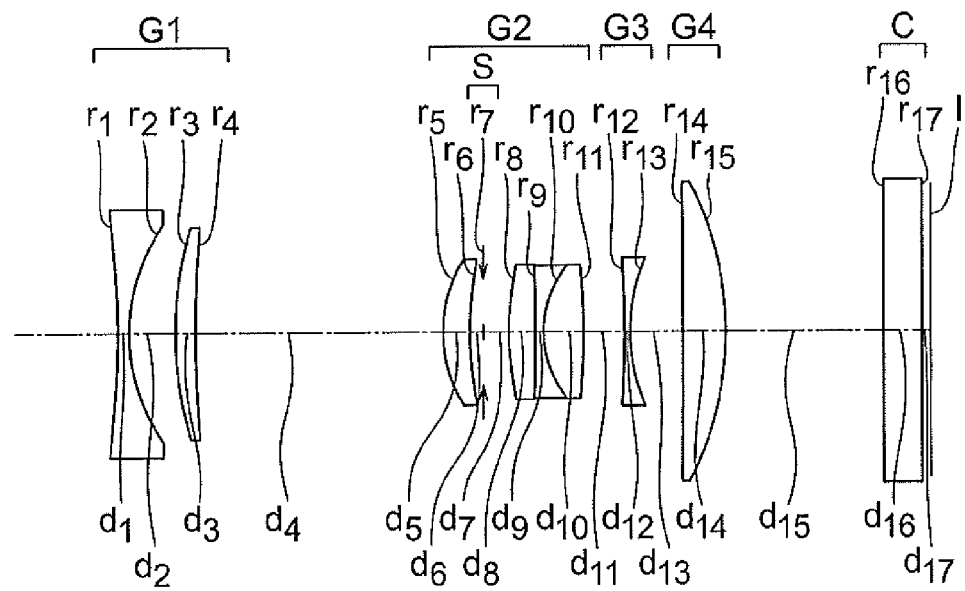
FIG. 21A, FIG. 21B, and FIG. 21C are cross-sectional views along an optical axis showing an optical arrangement at the time of infinite object point focusing of an image forming optical system according to an example 11, where.
Figure 21B:
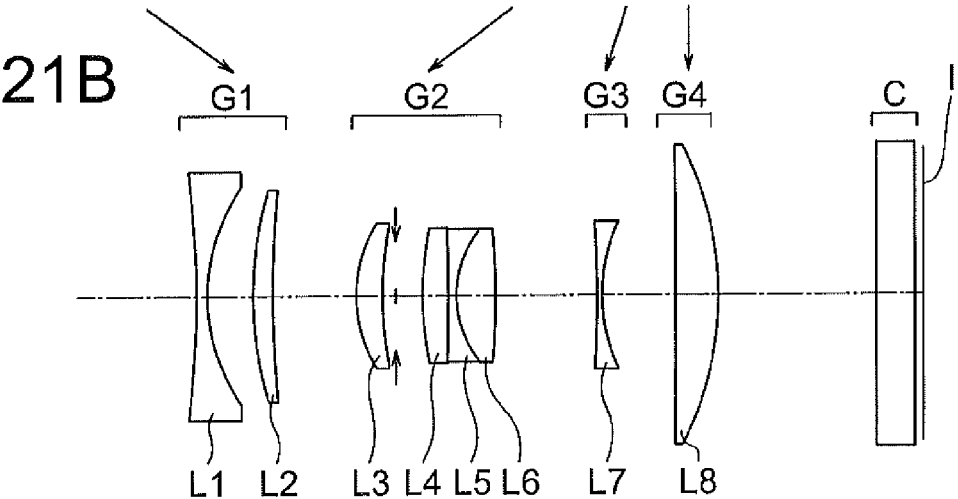
Figure 21C:
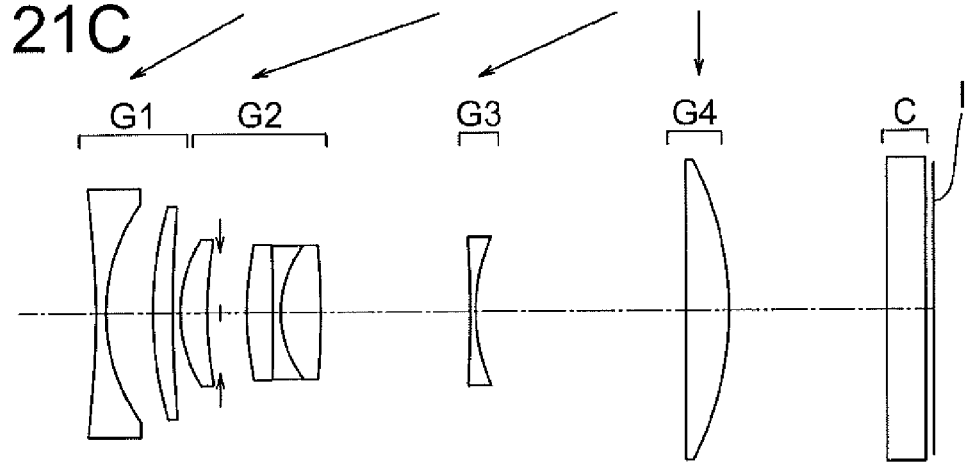

Next, an image forming optical system according to an example 11 will be described below. FIG. 21A, FIG. 21B, and FIG. 21C are cross-sectional views along an optical axis showing an optical arrangement at the time of infinite object point focusing of the image forming optical system according to the example 11. FIG. 22A, FIG. 22B, FIG. 22C, FIG. 22D, FIG. 22E, FIG. 22F, FIG. 22G, FIG. 22H, FIG. 22I, FIG. 22J, FIG. 22K, and FIG. 22L are aberration diagrams at the time of infinite object point focusing of the image forming optical system according to the example 11.

The image forming optical system according to the example 11, as shown in FIG. 21A, FIG. 21B, and FIG. 21C, includes in order from an object side, a first lens unit G1 having a negative refractive power, a second lens unit G2 having a positive refractive power, a third lens unit G3 having a negative refractive power, and a fourth lens unit G4 having a positive refractive power. Moreover, an aperture stop S is disposed in the second lens unit G2.

The first lens unit G1 includes a biconcave negative lens L1, and a positive meniscus lens L2 having a convex surface directed toward the object side.

The second lens unit G2 includes a positive meniscus lens L3 (first lens component) having a convex surface directed toward the object side, a biconvex positive lens L4, a biconcave negative lens L5, and a biconvex positive lens L6. Here, the biconvex positive lens L4, the biconcave negative lens L5, and the biconvex positive lens L6 are cemented (second lens component). The aperture stop S is disposed between the positive meniscus lens L3 and the cemented lens (biconvex positive lens L4).

The third lens unit G3 includes a biconcave negative lens L7.

The fourth lens unit G4 includes a positive meniscus lens L8 having a convex surface directed toward an image side.

At the time of zooming from a wide angle end to a telephoto end, the first lens unit G1, after moving toward the image side, moves toward the object side. The second lens unit G2 moves toward the object side. The third lens unit G3 moves toward the object side. The fourth lens unit G4 is fixed (stationary).

An aspheric surface is provided to a total of six surfaces namely, both surfaces of the biconcave negative lens L1, an object-side surface of the positive meniscus lens L3, an object-side surface of the biconvex positive lens L4, an image-side surface of the biconcave negative lens L7, and an image-side surface of the positive meniscus lens L8.

Figure 23A:
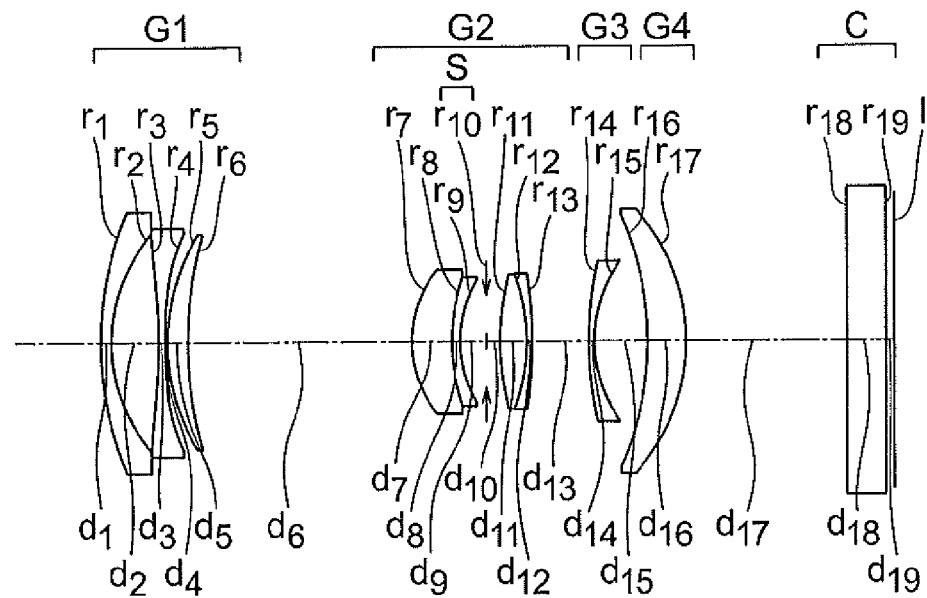
FIG. 23A, FIG. 23B, and FIG. 23C are cross-sectional views along an optical axis showing an optical arrangement at the time of infinite object point focusing of an image forming optical system according to an example 12, where.
Figure 23B:
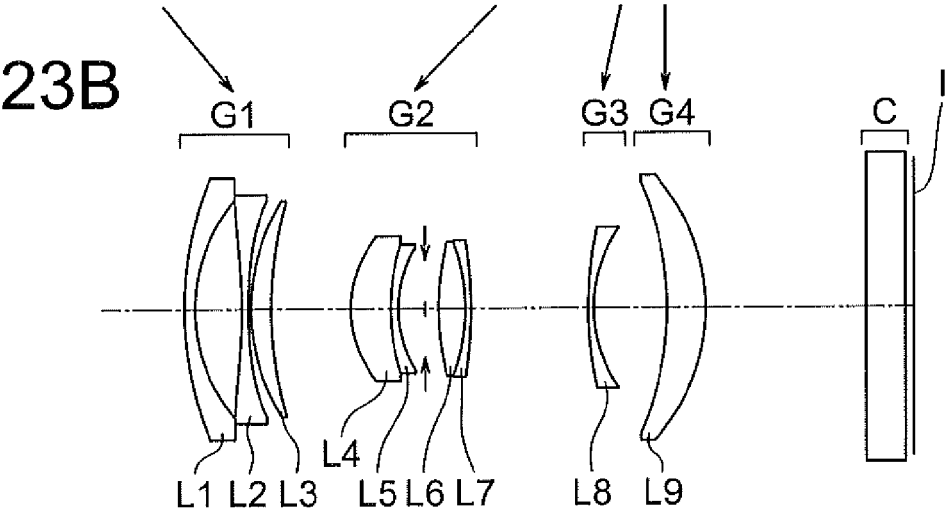
Figure 23C:
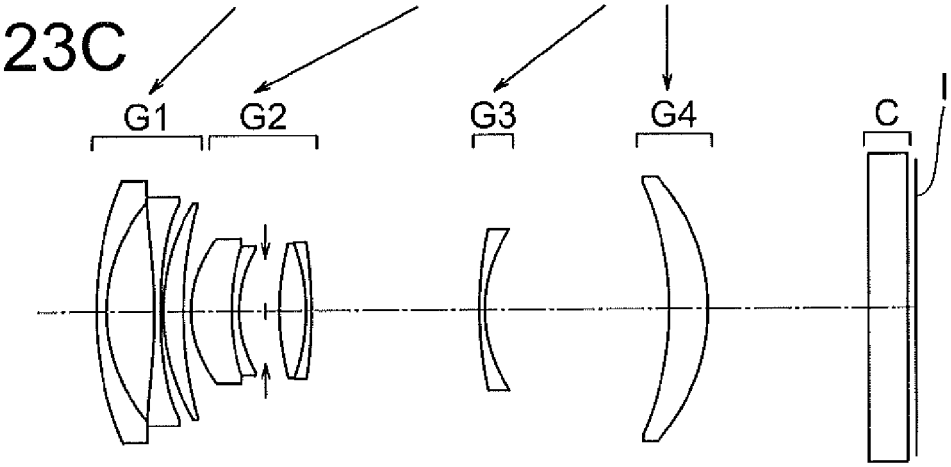

Next, an image forming optical system according to an example 12 will be described below. FIG. 23A, FIG. 23B, and FIG. 23C are cross-sectional views along an optical axis showing an optical arrangement at the time of infinite object point focusing of the image forming optical system according to the example 12. FIG. 24A, FIG. 24B, FIG. 24C, FIG. 24D, FIG. 24E, FIG. 24F, FIG. 24G, FIG. 24H, FIG. 24I, FIG. 24J, FIG. 24K, and FIG. 24L are aberration diagrams at the time of infinite object point focusing of the image forming optical system according to the example 12.

The image forming optical system according to the example 12, as shown in FIG. 23A, FIG. 23B, and FIG. 23C, includes in order from an object side, a first lens unit G1 having a negative refractive power, a second lens unit G2 having a positive refractive power, a third lens unit G3 having a negative refractive power, and a fourth lens unit G4 having a positive refractive power. Moreover, an aperture stop S is disposed in the second lens unit G2.

The first lens unit G1 includes a negative meniscus lens L1 having a convex surface directed toward the object side, a biconcave negative lens L2, and a positive meniscus lens L3 having a convex surface directed toward the object side.

The second lens unit G2 includes a positive meniscus lens L4 having a convex surface directed toward the object side, a negative meniscus lens L5 having a convex surface directed toward the object side, a biconvex positive lens L6, and a negative meniscus lens L7 having a convex surface directed toward an image side. Here, the positive meniscus lens L4 and the negative meniscus lens L5 are cemented (first lens component). Moreover, the biconvex positive lens L6 and the negative meniscus lens L7 are cemented (second lens component). The aperture stop S is disposed between the two cemented lenses (between the negative meniscus lens L5 and the biconvex positive lens L6).

The third lens unit G3 includes a negative meniscus lens L8 having a convex surface directed toward the object side.

The fourth lens unit G4 includes a positive meniscus lens L9 having a convex surface directed toward the image side.

At the time of zooming from a wide angle end to a telephoto end, the first lens unit G1, after moving toward the image side, moves toward the object side. The second lens unit G2 moves toward the object side. The third lens unit G3 moves toward the object side. The fourth lens unit G4 is fixed (stationary).

An aspheric surface is provided to a total of six surfaces namely, both surfaces of the biconcave negative lens L2, an object-side surface of the positive meniscus lens L4, an object-side surface of the biconvex positive lens L6, an image-side surface of the negative meniscus lens L8, and an image-side surface of the positive meniscus lens L9.

Figure 25A:
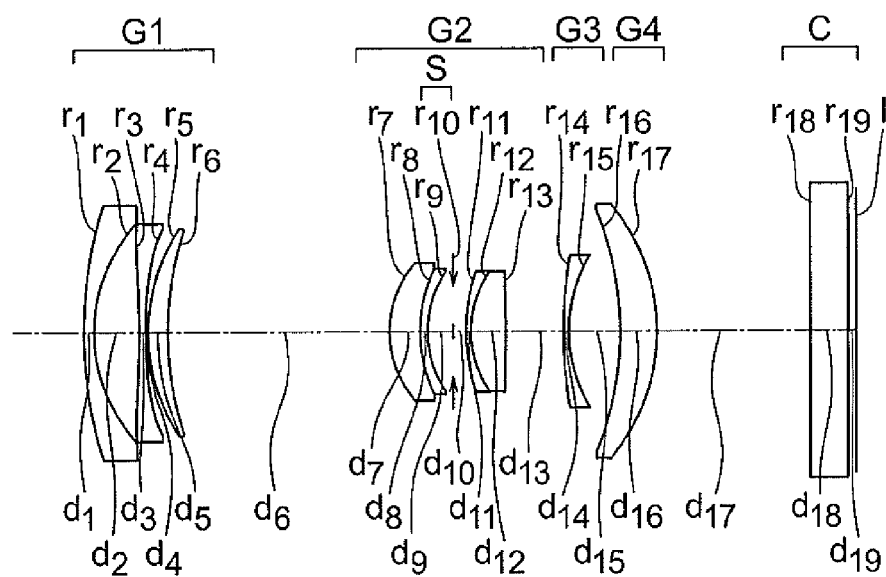
FIG. 25A, FIG. 25B, and FIG. 25C are cross-sectional views along an optical axis showing an optical arrangement at the time of infinite object point focusing of an image forming optical system according to an example 13, where.
Figure 25B:
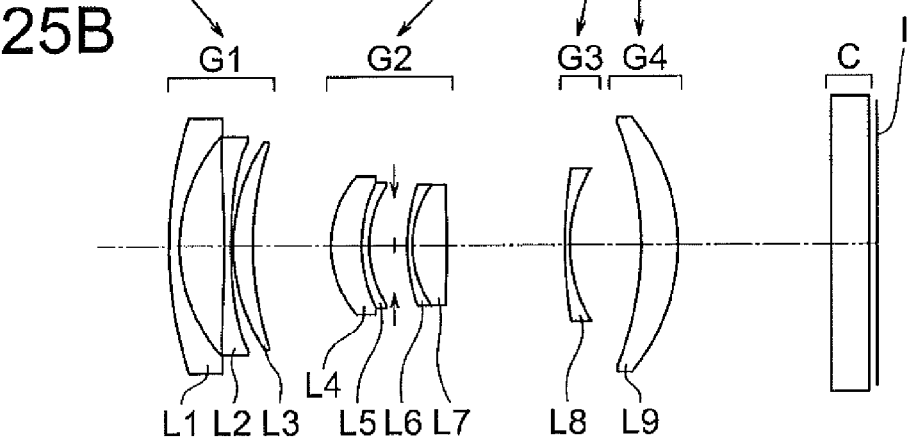
Figure 25C:
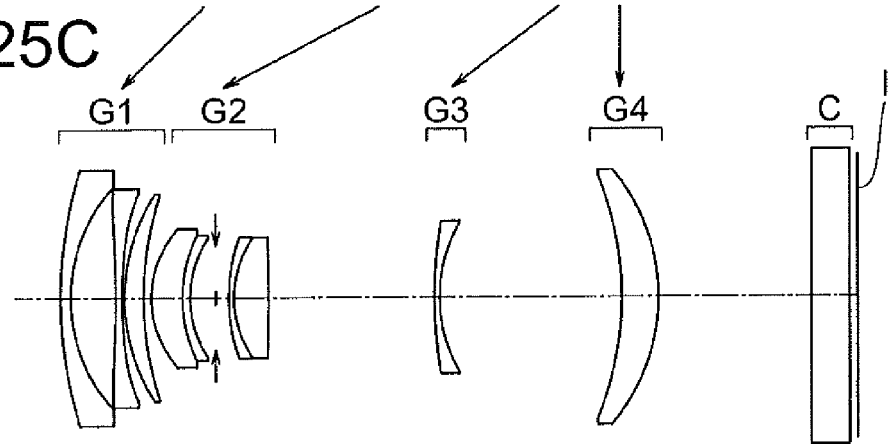

Next, an image forming optical system according to an example 13 ill be described below. FIG. 25A, FIG. 25B, and FIG. 25C are cross-sectional views along an optical axis showing an optical arrangement at the time of infinite object point focusing of the image forming optical system according to the example 13. FIG. 26A, FIG. 26B, FIG. 26C, FIG. 26D, FIG. 26E, FIG. 26F, FIG. 26G, FIG. 26H, FIG. 26I, FIG. 26J, FIG. 26K, and FIG. 26L are aberration diagrams at the time of infinite object point focusing of the image forming optical system according to the example 13.

The image forming optical system according to the example 13, as shown in FIG. 25A, FIG. 25B, and FIG. 25C, includes in order from an object side, a first lens unit G1 having a negative refractive power, a second lens unit G2 having a positive refractive power, a third lens unit G3 having a negative refractive power, and a fourth lens unit G4 having a positive refractive power. Moreover, an aperture stop S is disposed in the second lens unit G2.

The first lens unit G1 includes a negative meniscus lens L1 having a convex surface directed toward the object side, a biconcave negative lens L2, and a positive meniscus lens L3 having a convex surface directed toward the object side.

The second lens unit G2 includes a positive meniscus lens L4 having a convex surface directed toward the object side, a negative meniscus lens L5 having a convex surface directed toward the object side, a negative meniscus lens L6 having a convex surface directed toward the object side, and a biconvex positive lens L7. Here, the positive meniscus lens L4 and the negative meniscus lens L5 are cemented (first lens component). Moreover, the negative meniscus lens L6 and the biconvex positive lens L7 are cemented (second lens component). The aperture stop S is disposed between the two cemented lenses (between the negative meniscus lens L5 and the negative meniscus lens L6).

The third lens unit G3 includes a negative meniscus lens L8 having a convex surface directed toward the object side.

The fourth lens unit G4 includes a positive meniscus lens L9 having a convex surface directed toward an image side.

At the time of zooming from a wide angle end to a telephoto end, the first lens unit G1, after moving toward the image side, moves toward the object side. The second lens unit G2 moves toward the object side. The third lens unit G3 moves toward the object side. The fourth lens unit G4 is fixed (stationary).

An aspheric surface is provided to a total of six surfaces namely, both surfaces of the biconcave negative lens L2, an object-side surface of the positive meniscus lens L4, an image-side surface of the biconvex positive lens L7, an image-side surface of the negative meniscus lens L8, and an image-side surface of the positive meniscus lens L9.

Figure 27A:
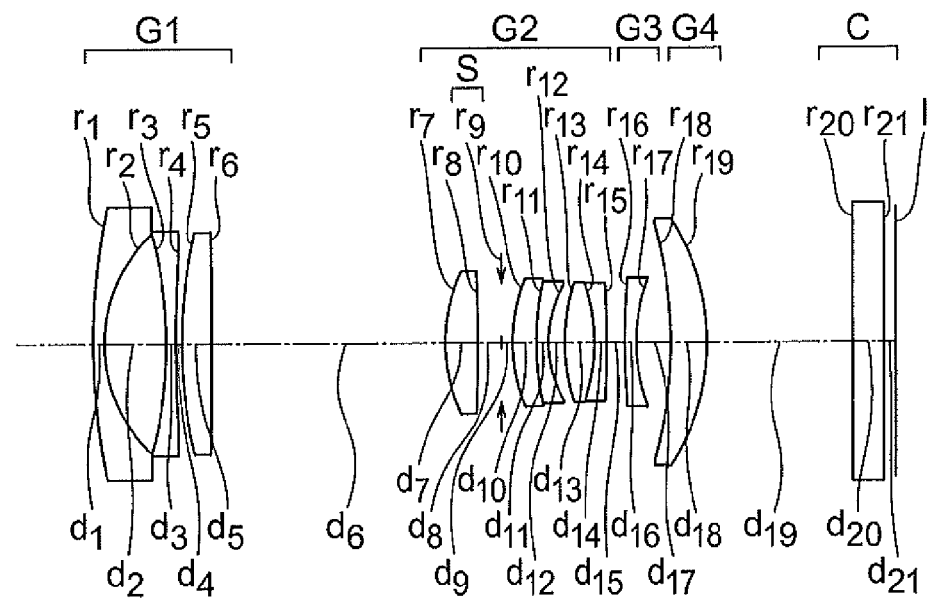
FIG. 27A, FIG. 27B, and FIG. 27C are cross-sectional views along an optical axis showing an optical arrangement at the time of infinite object point focusing of an image forming optical system according to an example 14, where.
Figure 27B:
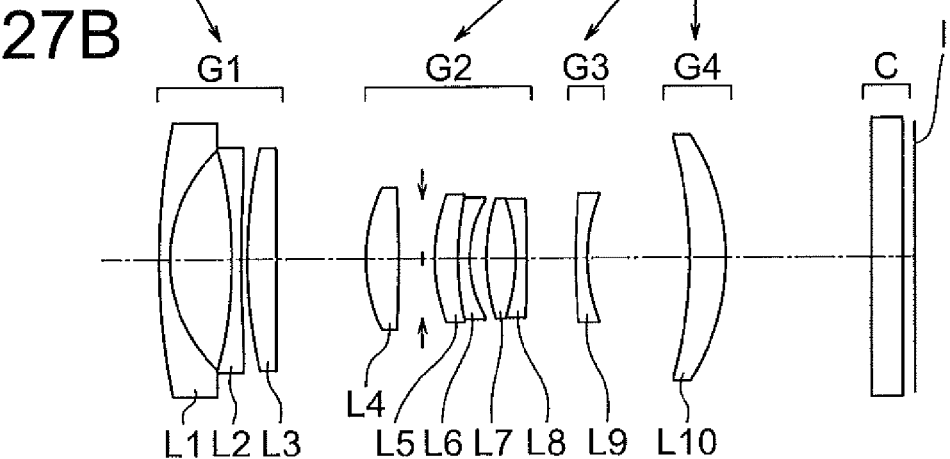
Figure 27C:
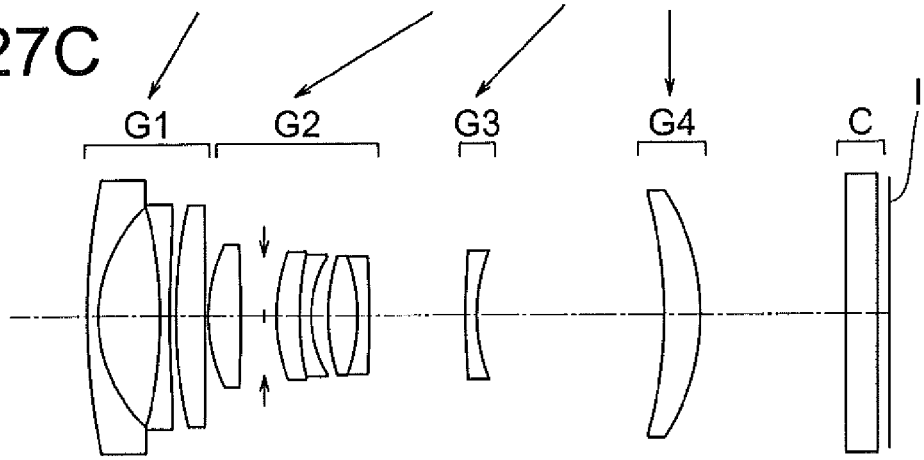

Next, an image forming optical system according to an example 14 will be described below. FIG. 27A, FIG. 27B, and FIG. 27C are cross-sectional views along an optical axis showing an optical arrangement at the time of infinite object point focusing of the image forming optical system according to the example 14. FIG. 28A, FIG. 28B, FIG. 28C, FIG. 28D, FIG. 28E, FIG. 28F, FIG. 28G, FIG. 28H, FIG. 28I, FIG. 28J, FIG. 28K, and FIG. 28L are aberration diagrams at the time of infinite object point focusing of the image forming optical system according to the example 14.

The image forming optical system according to the example 14, as shown in FIG. 27A, FIG. 27B, and FIG. 27C, includes in order from an object side, a first lens unit G1 having a negative refractive power, a second lens unit G2 having a positive refractive power, a third lens unit G3 having a negative refractive power, and a fourth lens unit G4 having a positive refractive power. Moreover, the aperture stop S is disposed in the second lens unit G2.

The first lens unit G1 includes a negative meniscus lens L1 having a convex surface directed toward the object side, a biconcave negative lens L2, and a biconvex positive lens L3.

The second lens unit G2 includes a biconvex positive lens L4 (first lens component), a positive meniscus lens L5 having a convex surface directed toward the object side, a negative meniscus lens L6 having a convex surface directed toward the object side, a biconvex positive lens L7, and a negative meniscus lens L8 having a convex surface directed toward an image side. Here, the positive meniscus lens L5 and the negative meniscus lens L6 are cemented (second lens component). Moreover, the biconvex positive lens L7 and the negative meniscus lens L8 are cemented (third lens component). The aperture stop S is disposed between the biconvex positive lens L4 and the cemented lens (positive meniscus lens L5).

The third lens unit G3 includes a negative meniscus lens L9 having a convex surface directed toward the object side.

The fourth lens unit G4 includes a positive meniscus lens L10 having a convex surface directed toward the image side.

At the time of zooming from a wide angle end to a telephoto end, the first lens unit G1, after moving toward the image side, moves toward the object side. The second lens unit G2 moves toward the object side. The third lens unit G3 moves toward the object side. The fourth lens unit G4 is fixed (stationary).

An aspheric surface is provided to a total of six surfaces namely, both surfaces of the biconcave negative lens L2, both surfaces of the biconvex positive lens L4, and both surfaces of the negative meniscus lens L9.

Next, numerical data of optical components comprising the imaging optical system of each above example are shown. In numerical data of each example, r1, r2, ... stands for a curvature radius of each lens surface, d1, d2, ... stands for a thickness of each lens or an air distance between adjacent lens surfaces, nd1, nd2, ... stands for a refractive index of each lens for d-line, v1, vd2, ... stands for an Abbe number of each lens, * stands for an aspheric surface. Further, in zoom data, WE denotes a wide angle end, ST denotes a intermediate focal length state, TE denotes a telephoto end, focal length denotes a focal length of the overall image forming optical system, FNO. denotes an F number, ω denotes a half angle of view, Fb denotes a back focus, each of f1, f2 ... is a focal length of each lens unit. Further, Lens total length is a distance from the frontmost lens surface to the rearmost lens surface plus back focus. Further, back focus is a unit which is expressed upon air conversion of a distance from the lens backmost surface to a paraxial image surface.

A shape of an aspheric surface is defined by the following expression where the direction of the optical axis is represented by z, the direction orthogonal to the optical axis is represented by y, a conical coefficient is represented by K, aspheric surface coefficients are represented by A4, A6, A8, A10, $$Z=(y^2/r)/[1+\{1-(1+k)(y/r)^2\}^{1/2}]+A4y^4+A6y^6+A8y^8+A10y^{10}$$

Further, in the aspherical surface coefficients, 'e-n' (where, n is an integral number) indicates '$10^{-n}$'. Moreover, these symbols are commonly used in the following numerical data for each example.

EXAMPLE 1

| Unit mm | | | | |
|---|---|---|---|---|
| Surface data | | | | |
| Surface no. | r | d | nd | vd |
| Object plane | ∞ | ∞ | | |
| 1 | 42.568 | 1.00 | 1.88300 | 40.76 |
| 2 | 13.000 | 4.70 | | |
| 3 | −43.642 | 1.00 | 1.58313 | 59.38 |
| 4 | 39.571 | 0.30 | | |
| 5 | 22.024 | 2.74 | 1.84666 | 23.78 |
| 6 | 70.155 | (Variable) | | |
| 7* | 11.480 | 2.62 | 1.80610 | 40.92 |
| 8* | 17.915 | 1.50 | | |
| 9 (Stop) | ∞ | 1.20 | | |
| 10 | 35.545 | 1.00 | 1.80518 | 25.42 |
| 11 | 11.913 | 2.88 | 1.59201 | 67.02 |
| 12 | −16.863 | (Variable) | | |
| 13 | −754.403 | 1.00 | 1.52542 | 55.78 |
| 14* | 13.413 | (Variable) | | |
| 15 | 169.036 | 3.98 | 1.52542 | 55.78 |
| 16* | −27.440 | 12.64 | | |
| 17 | ∞ | 2.50 | 1.51633 | 64.14 |
| 18 | ∞ | 1.00 | | |
| Image plane (Image pickup surface) | ∞ | | | |

| Aspherical surface data |
|---|

7th surface k = 0.000
A4 = 1.04519e−04, A6 = 9.46949e−07

8th surface k = 0.000
A4 = 2.70732e−04, A6 = 2.19929e−06

14th surface k = 0.000
A4 = −1.22363e−05, A6 = 4.07279e−06, A8 = −2.39287e−07, A10 = 4.55669e−09

16th surface k = 0.000
A4 = 8.25660e−06, A6 = −1.07341e−07, A8 = 3.37348e−10

| Zoom data Zoom ratio 2.88 | | | |
|---|---|---|---|
| | WE | ST | TE |
| Focal length | 14.54 | 30.53 | 41.84 |
| Fno. | 3.96 | 5.59 | 6.84 |
| Angle of view 2ω | 82.73 | 39.50 | 29.27 |
| Image height | 11.15 | 11.15 | 11.15 |
| fb (in air) | 15.43 | 15.43 | 15.43 |
| Lens total length (in air) | 74.14 | 68.01 | 72.88 |
| d6 | 22.78 | 5.17 | 1.30 |
| d12 | 4.82 | 11.03 | 14.00 |
| d14 | 7.18 | 12.44 | 18.25 |

| Unit focal length | | | |
|---|---|---|---|
| f1 = −20.84 | f2 = 16.73 | f3 = −25.07 | f4 = 45.25 |

EXAMPLE 2

| Unit mm | | | | |
|---|---|---|---|---|
| Surface data | | | | |
| Surface no. | r | d | nd | vd |
| Object plane | ∞ | ∞ | | |
| 1 | −4899.806 | 1.00 | 1.88300 | 40.76 |
| 2* | 10.310 | 4.63 | | |
| 3 | 20.824 | 2.51 | 1.92286 | 18.90 |
| 4 | 43.256 | (Variable) | | |
| 5* | 12.180 | 2.54 | 1.74320 | 49.34 |
| 6* | 101.992 | 1.50 | | |
| 7 (Stop) | ∞ | 1.75 | | |
| 8 | 17.847 | 0.80 | 1.80518 | 25.42 |

-continued

Unit mm

| | | | | |
|---|---|---|---|---|
| 9 | 6.608 | 2.80 | 1.51823 | 58.90 |
| 10 | −24.116 | (Variable) | | |
| 11* | 67.284 | 0.80 | 1.49700 | 81.61 |
| 12* | 10.693 | (Variable) | | |
| 13 | −33.128 | 2.60 | 1.72916 | 54.68 |
| 14 | −20.000 | 12.34 | | |
| 15 | ∞ | 2.50 | 1.51633 | 64.14 |
| 16 | ∞ | 1.00 | | |
| Image plane (Image pickup surface) | ∞ | | | |

Aspherical surface data

2nd surface k = −0.997
A4 = 3.21631e−05

5th surface k = 0.000
A4 = 4.30614e−08, A6 = −5.15774e−08

6th surface k = 0.000
A4 = 8.01720e−05, A6 = −1.23753e−07

11th surface k = 0.000
A4 = −2.68957e−05, A6 = −5.90843e−06

12th surface k = 0.000
A4 = 4.70207e−05, A6 = −7.57755e−06

Zoom data
Zoom ratio 2.88

| | WE | ST | TE |
|---|---|---|---|
| Focal length | 12.62 | 21.42 | 36.34 |
| Fno. | 3.69 | 4.77 | 6.62 |
| Angle of view 2ω | 90.76 | 54.97 | 33.49 |
| Image height | 11.15 | 11.15 | 11.15 |
| fb (in air) | 15.10 | 15.10 | 15.10 |
| Lens total length (in air) | 61.08 | 56.66 | 61.10 |
| d4 | 18.62 | 7.10 | 0.30 |
| d10 | 1.50 | 3.81 | 6.94 |
| d12 | 4.95 | 9.73 | 17.83 |

Unit focal length

| f1 = −18.39 | f2 = 14.29 | 3 = −25.70 | f4 = 63.87 |
|---|---|---|---|

EXAMPLE 3

Unit mm

Surface data

| Surface no. | r | d | nd | vd |
|---|---|---|---|---|
| Object plane | ∞ | ∞ | | |
| 1 | 552.578 | 1.00 | 1.88300 | 40.76 |
| 2* | 10.779 | 5.61 | | |
| 3 | 24.113 | 3.20 | 1.92286 | 18.90 |
| 4 | 55.210 | (Variable) | | |
| 5* | 13.515 | 3.42 | 1.74320 | 49.34 |
| 6* | 126.166 | 1.50 | | |
| 7 (Stop) | ∞ | 2.27 | | |
| 8 | 22.477 | 0.80 | 1.80518 | 25.42 |
| 9 | 7.324 | 3.33 | 1.51823 | 58.90 |

-continued

Unit mm

| | | | | |
|---|---|---|---|---|
| 10 | −22.640 | (Variable) | | |
| 11 | −60.815 | 0.80 | 1.49700 | 81.61 |
| 12* | 14.816 | (Variable) | | |
| 13 | 80.719 | 3.50 | 1.72916 | 54.68 |
| 14 | −49.232 | 12.34 | | |
| 15 | ∞ | 2.50 | 1.51633 | 64.14 |
| 16 | ∞ | 1.00 | | |
| Image plane (Image pickup surface) | ∞ | | | |

Aspherical surface data

2nd surface k = −0.996
A4 = 2.27255e−05

5th surface k = 0.000
A4 = −3.99721e−06

6th surface k = 0.000
A4 = 5.69340e−05

12th surface k = 0.000
A4 = 3.98988e−05, A6 = −9.37734e−07, A8 = −7.70573e−09

Zoom data
Zoom ratio 2.88

| | WE | ST | TE |
|---|---|---|---|
| Focal length | 12.62 | 21.41 | 36.34 |
| Fno. | 3.79 | 4.89 | 6.79 |
| Angle of view 2ω | 90.39 | 55.46 | 33.48 |
| Image height | 11.15 | 11.15 | 11.15 |
| fb (in air) | 15.09 | 15.09 | 15.09 |
| Lens total length (in air) | 69.09 | 63.73 | 69.09 |
| d4 | 21.53 | 8.08 | 0.30 |
| d10 | 2.12 | 5.14 | 9.04 |
| d12 | 4.94 | 10.00 | 19.24 |

Unit focal length

| f1 = −20.12 | f2 = 16.24 | f3 = −23.89 | f4 = 42.42 |
|---|---|---|---|

EXAMPLE 4

Unit mm

Surface data

| Surface no. | r | d | nd | vd |
|---|---|---|---|---|
| Object plane | ∞ | ∞ | | |
| 1* | 70.337 | 0.80 | 1.85400 | 40.39 |
| 2 | 11.503 | 3.50 | | |
| 3* | −50.991 | 0.50 | 1.60875 | 59.65 |
| 4 | −3754.010 | 0.20 | | |
| 5 | 16.781 | 1.50 | 1.94595 | 17.98 |
| 6 | 26.490 | (Variable) | | |
| 7* | 11.217 | 2.10 | 1.76802 | 49.24 |
| 8 | 36.463 | 1.00 | | |
| 9 (Stop) | ∞ | 2.01 | | |
| 10 | 23.706 | 0.60 | 1.62477 | 30.77 |
| 11 | 6.394 | 3.02 | 1.49700 | 81.54 |
| 12* | −1641.600 | 0.62 | | |
| 13 | 59.100 | 1.20 | 1.75436 | 47.95 |
| 14 | −198.035 | (Variable) | | |

-continued

Unit mm

| | | | | |
|---|---|---|---|---|
| 15 | 151.484 | 0.40 | 1.58313 | 59.38 |
| 16* | 13.524 | (Variable) | | |
| 17 | 187.064 | 3.30 | 1.76802 | 49.24 |
| 18* | −37.355 | 12.00 | | |
| 19 | ∞ | 3.00 | 1.51633 | 64.14 |
| 20 | ∞ | 0.65 | | |
| Image plane (Image pickup surface) | ∞ | | | |

Aspherical surface data

1st surface k = 0.000
A4 = 2.26103e−05, A6 = −3.51161e−07, A8 = 1.69708e−09
3rd surface k = 0.000
A4 = −2.07382e−05, A6 = 6.55180e−07, A8 = −2.86770e−09
7th surface k = 0.000
A4 = −2.19373e−05, A6 = −1.73068e−07, A8 = −8.86085e−10
12th surface k = 0.000
A4 = 1.45493e−04, A6 = 1.68176e−06, A8 = 7.77713e−09
16th surface k = 0.000
A4 = 3.86039e−05, A6 = −1.06197e−06
18th surface k = 0.000
A4 = −1.28490e−05, A6 = −1.43475e−08, A8 = 1.77178e−10

Zoom data
Zoom ratio 2.85

| | WE | ST | TE |
|---|---|---|---|
| Focal length | 14.35 | 24.24 | 40.95 |
| Fno. | 3.71 | 4.54 | 5.95 |
| Angle of view 2ω | 83.31 | 48.94 | 29.92 |
| Image height | 11.15 | 11.15 | 11.15 |
| fb (in air) | 14.62 | 14.62 | 14.62 |
| Lens total length (in air) | 60.25 | 55.32 | 62.23 |
| d6 | 17.85 | 6.44 | 0.60 |
| d14 | 3.03 | 8.01 | 13.31 |
| d16 | 4.01 | 5.50 | 12.98 |

Unit focal length

| | | | |
|---|---|---|---|
| f1 = −19.88 | f2 = 15.49 | f3 = −25.49 | f4 = 40.80 |

EXAMPLE 5

Unit mm

Surface data

| Surface no. | r | d | nd | vd |
|---|---|---|---|---|
| Object plane | ∞ | ∞ | | |
| 1* | 39.128 | 0.80 | 1.85400 | 40.39 |
| 2* | 12.616 | 3.50 | | |
| 3 | −48.386 | 0.50 | 1.61800 | 63.33 |
| 4 | 35.568 | 0.20 | | |
| 5 | 17.045 | 1.50 | 1.94595 | 17.98 |
| 6 | 28.487 | (Variable) | | |
| 7* | 10.831 | 2.21 | 1.76802 | 49.24 |
| 8 | 125.656 | 0.60 | 1.59270 | 35.31 |
| 9 | 15.477 | 2.00 | | |

-continued

Unit mm

| | | | | |
|---|---|---|---|---|
| 10 (Stop) | ∞ | 1.00 | | |
| 11 | 12.815 | 0.40 | 1.80518 | 25.42 |
| 12 | 8.000 | 3.51 | 1.49700 | 81.54 |
| 13* | 93.885 | 0.20 | | |
| 14 | 17.429 | 1.20 | 1.58313 | 59.38 |
| 15 | 108.788 | (Variable) | | |
| 16 | 141.313 | 0.40 | 1.48749 | 70.23 |
| 17* | 11.620 | (Variable) | | |
| 18 | −23.253 | 3.30 | 1.76802 | 49.24 |
| 19* | −15.496 | 12.00 | | |
| 20 | ∞ | 3.00 | 1.51633 | 64.14 |
| 21 | ∞ | 0.65 | | |
| Image plane (Image pickup surface) | ∞ | | | |

Aspherical surface data

1st surface k = 0.000
A4 = −2.58338e−05, A6 = 7.43926e−07, A8 = −3.17228e−09
2nd surface k = 0.000
A4 = −9.02659e−06, A6 = 7.91562e−07, A8 = 6.63653e−09
7th surface k = 0.000
A4 = −2.16487e−05, A6 = −2.76441e−07, A8 = 3.52567e−09
13th surface k = 0.000
A4 = 1.63113e−04, A6 = 1.77285e−06, A8 = 1.79008e−08
17th surface k = 0.000
A4 = 1.47209e−04, A6 = −2.16619e−06
19th surface k = 0.000
A4 = −7.08922e−07, A6 = −2.93531e−08, A8 = 1.09182e−10

Zoom data
Zoom ratio 2.85

| | WE | ST | TE |
|---|---|---|---|
| Focal length | 14.35 | 24.24 | 40.95 |
| Fno. | 3.54 | 4.29 | 5.64 |
| Angle of view 2ω | 83.31 | 48.11 | 29.79 |
| Image height | 11.15 | 11.15 | 11.15 |
| fb (in air) | 14.59 | 14.59 | 14.59 |
| Lens total length (in air) | 59.38 | 54.70 | 61.37 |
| d6 | 16.45 | 5.83 | 0.60 |
| d15 | 3.02 | 7.45 | 11.34 |
| d17 | 4.00 | 5.50 | 13.52 |

Unit focal length

| | | | |
|---|---|---|---|
| f1 = −18.46 | f2 = 14.34 | f3 = −26.00 | f4 = 51.05 |

EXAMPLE 6

Unit mm

Surface data

| Surface no. | r | d | nd | vd |
|---|---|---|---|---|
| Object plane | ∞ | ∞ | | |
| 1 | 25.160 | 0.80 | 1.88300 | 40.76 |
| 2 | 12.826 | 3.50 | | |

-continued

Unit mm

| | | | | |
|---|---|---|---|---|
| 3* | −41.836 | 0.50 | 1.85400 | 40.39 |
| 4* | 35.413 | 0.20 | | |
| 5 | 15.850 | 1.50 | 1.94595 | 17.98 |
| 6 | 30.145 | (Variable) | | |
| 7* | 8.576 | 3.00 | 1.76802 | 49.24 |
| 8 | 15.269 | 0.60 | 1.80810 | 22.76 |
| 9 | 9.258 | 2.00 | | |
| 10 (Stop) | ∞ | 1.00 | | |
| 11* | 18.095 | 2.00 | 1.76802 | 49.24 |
| 12 | −14.664 | 0.40 | 1.80810 | 22.76 |
| 13 | −34.251 | 0.60 | | |
| 14 | 48.560 | 1.20 | 1.77250 | 49.60 |
| 15 | 47.809 | (Variable) | | |
| 16 | 29.318 | 0.40 | 1.58313 | 59.38 |
| 17* | 11.178 | (Variable) | | |
| 18 | −23.490 | 2.80 | 1.76802 | 49.24 |
| 19* | −15.539 | 12.00 | | |
| 20 | ∞ | 3.00 | 1.51633 | 64.14 |
| 21 | ∞ | 0.65 | | |
| Image plane (Image pickup surface) | ∞ | | | |

Aspherical surface data

3rd surface k = 0.000
A4 = 5.23377e−05, A6 = 3.59100e−07, A8 = −1.91143e−09

4th surface k = 0.000
A4 = 7.77190e−05, A6 = 5.43566e−07, A8 = −7.39929e−10

7th surface k = 0.000
A4 = −6.35797e−05, A6 = −5.04553e−07, A8 = −7.00706e−09

11th surface k = 0.000
A4 = −1.13191e−04, A6 = −8.65089e−07, A8 = −1.61655e−08

17th surface k = 0.000
A4 = 7.55801e−05, A6 = −1.73442e−06

19th surface k = 0.000
A4 = −3.39094e−06, A6 = −1.80999e−08, A8 = 9.58656e−11

Zoom data
Zoom ratio 2.85

| | WE | ST | TE |
|---|---|---|---|
| Focal length | 14.35 | 24.23 | 40.93 |
| Fno. | 3.64 | 4.45 | 5.83 |
| Angle of view 2ω | 83.34 | 48.31 | 29.87 |
| Image height | 11.15 | 11.15 | 11.15 |
| fb (in air) | 14.55 | 14.55 | 14.55 |
| Lens total length (in air) | 58.89 | 54.23 | 60.86 |
| d6 | 16.83 | 6.03 | 0.60 |
| d15 | 2.99 | 7.64 | 11.74 |
| d17 | 4.00 | 5.50 | 13.48 |

Unit focal length

| f1 = −19.84 | f2 = 14.82 | f3 = −31.24 | f4 = 51.84 |
|---|---|---|---|

EXAMPLE 7

Unit mm

Surface data

| Surface no. | r | d | nd | vd |
|---|---|---|---|---|
| Object plane | ∞ | ∞ | | |
| 1 | 32.968 | 0.80 | 1.88300 | 40.76 |
| 2 | 11.379 | 3.50 | | |
| 3* | −46.903 | 0.50 | 1.85400 | 40.39 |
| 4* | 26.303 | 0.20 | | |
| 5 | 13.197 | 1.50 | 1.94595 | 17.98 |
| 6 | 23.113 | (Variable) | | |
| 7* | 13.670 | 1.96 | 1.49700 | 81.54 |
| 8 | −861.231 | 1.00 | | |
| 9 (Stop) | ∞ | 1.96 | | |
| 10* | 13.091 | 3.46 | 1.58313 | 59.38 |
| 11 | −11.195 | 0.60 | 1.80518 | 25.42 |
| 12 | −26.893 | 0.56 | | |
| 13 | −29.575 | 1.20 | 1.77250 | 49.60 |
| 14* | −23.150 | (Variable) | | |
| 15 | 30.615 | 0.40 | 1.76802 | 49.24 |
| 16* | 12.667 | 1.20 | | |
| 17 | 60.983 | 0.40 | 1.77250 | 49.60 |
| 18 | 16.301 | (Variable) | | |
| 19 | −46.698 | 2.70 | 1.76802 | 49.24 |
| 20* | −19.831 | 12.00 | | |
| 21 | ∞ | 3.00 | 1.51633 | 64.14 |
| 22 | ∞ | 0.65 | | |
| Image plane (Image pickup surface) | ∞ | | | |

Aspherical surface data

3rd surface k = 0.000
A4 = 9.17035e−05, A6 = −7.69848e−07, A8 = 9.74662e−09

4th surface k = 0.000
A4 = 1.51523e−04, A6 = −2.62626e−07, A8 = 1.18230e−08

7th surface k = 0.000
A4 = −2.26957e−05, A6 = −1.45234e−06, A8 = 1.25258e−08

10th surface k = 0.000
A4 = 2.52188e−05, A6 = 1.51156e−06, A8 = 6.89294e−08

14th surface k = 0.000
A4 = 1.68569e−04, A6 = 6.35388e−07, A8 = 1.13058e−07

16th surface k = 0.000
A4 = 1.43321e−04, A6 = 7.31759e−07, A8 = −3.70416e−08

20th surface k = 0.000
A4 = −1.64132e−05, A6 = −1.80022e−07, A8 = 2.29197e−10

Zoom data
Zoom ratio 2.85

| | WE | ST | TE |
|---|---|---|---|
| Focal length | 14.35 | 24.24 | 40.94 |
| Fno. | 3.64 | 4.45 | 5.83 |
| Angle of view 2ω | 83.38 | 48.06 | 29.82 |
| Image height | 11.15 | 11.15 | 11.15 |
| fb (in air) | 14.46 | 14.46 | 14.46 |
| Lens total length (in air) | 57.20 | 53.83 | 59.15 |
| d6 | 13.94 | 5.23 | 0.60 |

-continued

| Unit mm | | | |
|---|---|---|---|
| d14 | 2.92 | 6.68 | 11.24 |
| d18 | 3.92 | 5.51 | 10.92 |

| Unit focal length | | | |
|---|---|---|---|
| f1 = −13.66 | f2 = 11.94 | f3 = −14.00 | f4 = 43.00 |

EXAMPLE 8

| Unit mm | | | |
|---|---|---|---|
| Surface data | | | |

| Surface no. | r | d | nd | vd |
|---|---|---|---|---|
| Object plane | ∞ | ∞ | | |
| 1* | −151.957 | 0.80 | 1.85400 | 40.39 |
| 2* | 12.201 | 3.50 | | |
| 3 | 20.576 | 1.50 | 1.94595 | 17.98 |
| 4 | 41.055 | (Variable) | | |
| 5* | 10.726 | 2.00 | 1.76802 | 49.24 |
| 6 | 43.535 | 1.00 | | |
| 7 (Stop) | ∞ | 2.01 | | |
| 8 | 23.264 | 0.60 | 1.80000 | 29.84 |
| 9 | 6.088 | 3.01 | 1.58313 | 59.38 |
| 10* | 61.543 | 0.60 | | |
| 11 | 45.294 | 1.20 | 1.77250 | 49.60 |
| 12 | −216.005 | (Variable) | | |
| 13 | 1674.858 | 0.40 | 1.58313 | 59.38 |
| 14* | 16.209 | (Variable) | | |
| 15 | −401.569 | 3.30 | 1.76802 | 49.24 |
| 16* | −27.388 | 12.00 | | |
| 17 | ∞ | 3.00 | 1.51633 | 64.14 |
| 18 | ∞ | 0.65 | | |
| Image plane (Image pickup surface) | ∞ | | | |

Aspherical surface data

1st surface k = 0.000
A4 = −8.79338e−06, A6 = 1.12267e−07, A8 = −2.28492e−10
2nd surface k = 0.000
A4 = −5.83277e−05, A6 = −1.21262e−07, A8 = −1.06113e−09
5th surface k = 0.000
A4 = −3.81693e−05, A6 = 3.12995e−07, A8 = −1.11374e−08
10th surface k = 0.000
A4 = 7.12148e−05, A6 = 2.74101e−06, A8 = −6.47450e−08
14th surface k = 0.000
A4 = 5.78771e−05, A6 = −9.50629e−07
16th surface k = 0.000
A4 = −5.55119e−06, A6 = −1.97140e−08, A8 = 2.17516e−10

| Zoom data Zoom ratio 2.85 | | | |
|---|---|---|---|
| | WE | ST | TE |
| Focal length | 14.35 | 24.24 | 40.95 |
| Fno. | 3.64 | 4.45 | 5.82 |
| Angle of view 2ω | 83.47 | 48.71 | 29.67 |
| Image height | 11.15 | 11.15 | 11.15 |

-continued

| Unit mm | | | |
|---|---|---|---|
| fb (in air) | 14.57 | 14.57 | 14.57 |
| Lens total length (in air) | 60.12 | 54.89 | 62.11 |
| d4 | 18.64 | 6.68 | 0.60 |
| d12 | 3.00 | 8.22 | 13.56 |
| d14 | 3.98 | 5.50 | 13.46 |

| Unit focal length | | | |
|---|---|---|---|
| f1 = −21.27 | f2 = 16.24 | f3 = −28.07 | f4 = 38.12 |

EXAMPLE 9

| Unit mm | | | |
|---|---|---|---|
| Surface data | | | |

| Surface no. | r | d | nd | vd |
|---|---|---|---|---|
| Object plane | ∞ | ∞ | | |
| 1* | −394.439 | 0.80 | 1.85400 | 40.39 |
| 2* | 12.656 | 3.50 | | |
| 3 | 19.832 | 1.50 | 1.94595 | 17.98 |
| 4 | 35.488 | (Variable) | | |
| 5* | 10.428 | 2.01 | 1.76802 | 49.24 |
| 6 | 43.871 | 1.00 | | |
| 7 (Stop) | ∞ | 2.01 | | |
| 8 | 36.922 | 0.60 | 1.80000 | 29.84 |
| 9 | 5.793 | 3.02 | 1.74320 | 49.34 |
| 10* | 84.526 | (Variable) | | |
| 11 | −174.212 | 0.40 | 1.58313 | 59.38 |
| 12* | 19.303 | (Variable) | | |
| 13 | 5043.898 | 3.30 | 1.76802 | 49.24 |
| 14* | −26.880 | 12.00 | | |
| 15 | ∞ | 3.00 | 1.51633 | 64.14 |
| 16 | ∞ | 0.65 | | |
| Image plane (Image pickup surface) | ∞ | | | |

Aspherical surface data

1st surface k = 0.000
A4 = −5.85175e−06, A6 = 7.70228e−08, A8 = −1.82684e−10
2nd surface k = 0.000
A4 = −4.28920e−05, A6 = 5.88567e−09, A8 = −1.59461e−09
5th surface k = 0.000
A4 = −1.85849e−05, A6 = 6.90713e−07, A8 = −1.09294e−08
10th surface k = 0.000
A4 = 1.99127e−04, A6 = 4.83842e−06, A8 = −4.47976e−09
12th surface k = 0.000
A4 = 6.04462e−05, A6 = −7.96093e−07
14th surface k = 0.000
A4 = −1.13720e−06, A6 = −3.43724e−08, A8 = 2.37205e−10

| Zoom data Zoom ratio 2.85 | | | |
|---|---|---|---|
| | WE | ST | TE |
| Focal length | 14.35 | 24.24 | 40.95 |
| Fno. | 3.64 | 4.45 | 5.82 |
| Angle of view 2ω | 83.54 | 48.66 | 29.65 |

-continued

Unit mm

| | | | |
|---|---|---|---|
| Image height | 11.15 | 11.15 | 11.15 |
| fb (in air) | 14.59 | 14.59 | 14.59 |
| Lens total length (in air) | 58.64 | 53.26 | 60.63 |
| d4 | 18.88 | 6.77 | 0.60 |
| d10 | 3.02 | 8.27 | 13.62 |
| d12 | 4.00 | 5.50 | 13.67 |

Unit focal length

| | | | |
|---|---|---|---|
| f1 = −22.87 | f2 = 16.30 | f3 = −29.78 | f4 = 34.82 |

EXAMPLE 10

Unit mm

Surface data

| Surface no. | r | d | nd | vd |
|---|---|---|---|---|
| Object plane | ∞ | ∞ | | |
| 1* | −168.268 | 0.80 | 1.85400 | 40.39 |
| 2* | 15.084 | 3.50 | | |
| 3 | 21.978 | 1.50 | 1.94595 | 17.98 |
| 4 | 37.039 | (Variable) | | |
| 5* | 8.851 | 2.27 | 1.76802 | 49.24 |
| 6 | 16.925 | 2.00 | | |
| 7 (Stop) | ∞ | 1.06 | | |
| 8* | 25.356 | 3.00 | 1.74320 | 49.34 |
| 9 | −7.627 | 0.60 | 1.80000 | 29.84 |
| 10 | 89.056 | (Variable) | | |
| 11 | 199.095 | 0.40 | 1.58313 | 59.38 |
| 12* | 18.947 | (Variable) | | |
| 13 | −115.357 | 3.30 | 1.76802 | 49.24 |
| 14* | −22.102 | 12.00 | | |
| 15 | ∞ | 3.00 | 1.51633 | 64.14 |
| 16 | ∞ | 0.65 | | |
| Image plane (Image pickup surface) | ∞ | | | |

Aspherical surface data

1st surface k = 0.000
A4 = 2.72241e−05, A6 = −5.99429e−08, A8 = 1.91612e−11

2nd surface k = 0.000
A4 = 2.14057e−06, A6 = 1.97234e−07, A8 = −1.42016e−09

5th surface k = 0.000
A4 = 4.22435e−05, A6 = 5.32305e−08, A8 = 6.25519e−08

8th surface k = 0.000
A4 = −2.99726e−04, A6 = −2.22853e−06, A8 = −2.47487e−07

12th surface k = 0.000
A4 = 8.99368e−05, A6 = −6.95079e−07

14th surface k = 0.000
A4 = −1.81614e−07, A6 = −3.28774e−08, A8 = 1.79232e−10

Zoom data
Zoom ratio 2.85

| | WE | ST | TE |
|---|---|---|---|
| Focal length | 14.35 | 24.24 | 40.95 |
| Fno. | 3.64 | 4.45 | 5.82 |

-continued

Unit mm

| | | | |
|---|---|---|---|
| Angle of view 2ω | 83.26 | 48.27 | 29.73 |
| Image height | 11.15 | 11.15 | 11.15 |
| fb (in air) | 14.59 | 14.59 | 14.59 |
| Lens total length (in air) | 59.73 | 54.11 | 61.73 |
| d4 | 19.73 | 7.05 | 0.60 |
| d10 | 3.01 | 8.53 | 13.80 |
| d12 | 3.97 | 5.51 | 14.31 |

Unit focal length

| | | | |
|---|---|---|---|
| f1 = −24.59 | f2 = 17.19 | f3 = −35.94 | f4 = 35.06 |

EXAMPLE 11

Unit mm

Surface data

| Surface no. | r | d | nd | vd |
|---|---|---|---|---|
| Object plane | ∞ | ∞ | | |
| 1* | −54.872 | 0.80 | 1.85400 | 40.39 |
| 2* | 14.575 | 3.50 | | |
| 3 | 28.865 | 1.50 | 1.94595 | 17.98 |
| 4 | 88.726 | (Variable) | | |
| 5* | 10.928 | 2.02 | 1.76802 | 49.24 |
| 6 | 28.839 | 1.00 | | |
| 7 (Stop) | ∞ | 2.01 | | |
| 8* | 19.878 | 2.01 | 1.76802 | 49.24 |
| 9 | −166.884 | 0.60 | 1.80000 | 29.84 |
| 10 | 8.353 | 3.01 | 1.58913 | 61.14 |
| 11 | −59.731 | (Variable) | | |
| 12 | −97.435 | 0.40 | 1.58313 | 59.38 |
| 13* | 14.552 | (Variable) | | |
| 14 | −1686.356 | 3.30 | 1.76802 | 49.24 |
| 15* | −25.233 | 12.00 | | |
| 16 | ∞ | 3.00 | 1.51633 | 64.14 |
| 17 | ∞ | 0.65 | | |
| Image plane (Image pickup surface) | ∞ | | | |

Aspherical surface data

1st surface k = 0.000
A4 = 3.64590e−05, A6 = −9.65472e−08, A8 = −7.99425e−11

2nd surface k = 0.000
A4 = −1.27577e−05, A6 = 2.22192e−07, A8 = −3.29968e−09

5th surface k = 0.000
A4 = 1.09704e−05, A6 = 6.44001e−07, A8 = 3.49708e−09

8th surface k = 0.000
A4 = −1.54512e−04, A6 = −1.80912e−06, A8 = −2.03039e−08

13th surface k = 0.000
A4 = 7.54296e−05, A6 = −9.52666e−07

15th surface k = 0.000
A4 = 2.58189e−06, A6 = −3.97178e−08, A8 = 1.56159e−10

-continued

| Unit mm | | | |
|---|---|---|---|
| Zoom data Zoom ratio 2.85 | | | |
| | WE | ST | TE |
| Focal length | 14.35 | 24.24 | 40.95 |
| Fno. | 3.64 | 4.45 | 5.82 |
| Angle of view 2ω | 83.56 | 48.01 | 29.60 |
| Image height | 11.15 | 11.15 | 11.15 |
| fb (in air) | 14.61 | 14.61 | 14.61 |
| Lens total length (in air) | 60.75 | 54.28 | 62.73 |
| d4 | 18.94 | 6.38 | 0.60 |
| d11 | 3.05 | 7.63 | 11.46 |
| d13 | 4.00 | 5.51 | 15.92 |

| Unit focal length | | | |
|---|---|---|---|
| f1 = −21.37 | f2 = 15.52 | f3 = −21.68 | f4 = 33.33 |

EXAMPLE 12

| Unit mm | | | | |
|---|---|---|---|---|
| Surface data | | | | |
| Surface no. | r | d | nd | νd |
| Object plane | ∞ | ∞ | | |
| 1 | 26.253 | 0.80 | 1.88300 | 40.76 |
| 2 | 13.010 | 3.50 | | |
| 3* | −39.585 | 0.50 | 1.85400 | 40.39 |
| 4* | 38.478 | 0.20 | | |
| 5 | 15.857 | 1.50 | 1.94595 | 17.98 |
| 6 | 29.708 | (Variable) | | |
| 7* | 8.477 | 3.00 | 1.76802 | 49.24 |
| 8 | 15.849 | 0.60 | 1.80810 | 22.76 |
| 9 | 9.273 | 2.00 | | |
| 10 (Stop) | ∞ | 1.00 | | |
| 11* | 17.709 | 2.00 | 1.76802 | 49.24 |
| 12 | −15.221 | 0.40 | 1.80810 | 22.76 |
| 13 | −35.312 | (Variable) | | |
| 14 | 28.845 | 0.40 | 1.58313 | 59.38 |
| 15* | 10.847 | (Variable) | | |
| 16 | −23.194 | 2.80 | 1.76802 | 49.24 |
| 17* | −15.427 | 12.00 | | |
| 18 | ∞ | 3.00 | 1.51633 | 64.14 |
| 19 | ∞ | 0.65 | | |
| Image plane (Image pickup surface) | ∞ | | | |

Aspherical surface data

3th surface k = 0.000
A4 = 6.18405e−05, A6 = 2.82992e−07, A8 = −1.72231e−09
4th surface k = 0.000
A4 = 8.80144e−05, A6 = 4.63885e−07, A8 = −7.09644e−10
7th surface k = 0.000
A4 = −6.32074e−05, A6 = −5.95081e−07, A8 = −6.00273e−09
11th surface k = 0.000
A4 = −1.30179e−04, A6 = −7.86812e−07, A8 = −2.63639e−08
15th surface k = 0.000
A4 = 6.45661e−05, A6 = −1.91054e−06

-continued

| Unit mm | | | |
|---|---|---|---|
| 17th surface | | | | k = 0.000
A4 = −3.96751e−06, A6 = 1.65529e−08, A8 = −4.60492e−11

| Zoom data Zoom ratio 2.85 | | | |
|---|---|---|---|
| | WE | ST | TE |
| Focal length | 14.35 | 24.24 | 40.95 |
| Fno. | 3.64 | 4.45 | 5.83 |
| Angle of view 2ω | 83.28 | 48.26 | 29.89 |
| Image height | 11.15 | 11.15 | 11.15 |
| fb (in air) | 14.58 | 14.58 | 14.58 |
| Lens total length (in air) | 58.36 | 53.57 | 60.35 |
| d6 | 16.82 | 5.97 | 0.60 |
| d13 | 4.25 | 8.81 | 12.63 |
| d15 | 4.00 | 5.50 | 13.84 |

| Unit focal length | | | |
|---|---|---|---|
| f1 = −19.74 | f2 = 14.72 | f3 = −30.06 | f4 = 51.86 |

EXAMPLE 13

| Unit mm | | | | |
|---|---|---|---|---|
| Surface data | | | | |
| Surface no. | r | d | nd | νd |
| Object plane | ∞ | ∞ | | |
| 1 | 33.889 | 0.80 | 1.88300 | 40.76 |
| 2 | 13.101 | 3.50 | | |
| 3* | −76.255 | 0.50 | 1.85400 | 40.39 |
| 4* | 37.934 | 0.20 | | |
| 5 | 15.214 | 1.50 | 1.94595 | 17.98 |
| 6 | 26.122 | (Variable) | | |
| 7* | 8.154 | 2.40 | 1.76802 | 49.24 |
| 8 | 11.279 | 0.60 | 1.80810 | 22.76 |
| 9 | 8.606 | 2.00 | | |
| 10 (Stop) | ∞ | 1.00 | | |
| 11 | 14.609 | 0.40 | 1.80810 | 22.76 |
| 12 | 8.383 | 2.70 | 1.76802 | 49.24 |
| 13* | −69.528 | (Variable) | | |
| 14 | 36.433 | 0.40 | 1.58313 | 59.38 |
| 15* | 12.312 | (Variable) | | |
| 16 | −25.221 | 2.80 | 1.76802 | 49.24 |
| 17* | −16.102 | 12.00 | | |
| 18 | ∞ | 3.00 | 1.51633 | 64.14 |
| 19 | ∞ | 0.65 | | |
| Image plane (Image pickup surface) | ∞ | | | |

Aspherical surface data

3th surface k = 0.000
A4 = 1.07603e−05, A6 = 8.22641e−07, A8 = −3.03419e−09
4th surface k = 0.000
A4 = 3.78781e−05, A6 = 9.17467e−07, A8 = −1.04299e−09
7th surface k = 0.000
A4 = −6.25297e−05, A6 = −3.77391e−07, A8 = −1.26726e−08
13th surface k = 0.000
A4 = 1.31616e−04, A6 = 1.24879e−06, A8 = 3.14782e−08

-continued

Unit mm

15th surface k = 0.000
A4 = 7.80282e−05, A6 = −1.17984e−06

17th surface k = 0.000
A4 = −1.75007e−06, A6 = 5.75761e−09, A8 = −3.96356e−11

Zoom data
Zoom ratio 2.85

|  | WE | ST | TE |
|---|---|---|---|
| Focal length | 14.35 | 24.24 | 40.95 |
| Fno. | 3.64 | 4.45 | 5.83 |
| Angle of view 2ω | 83.27 | 48.26 | 29.89 |
| Image height | 11.15 | 11.15 | 11.15 |
| fb(in air) | 14.58 | 14.58 | 14.58 |
| Lens total length(in air) | 59.25 | 54.26 | 61.24 |
| d6 | 17.37 | 6.14 | 0.60 |
| d13 | 4.50 | 9.23 | 13.08 |
| d15 | 4.00 | 5.50 | 14.18 |

Unit focal length

| f1 = −20.37 | f2 = 15.23 | f3 = −32.09 | f4 = 51.16 |

EXAMPLE 14

Unit mm
Surface data

| Surface no. | r | d | nd | vd |
|---|---|---|---|---|
| Object plane | ∞ | ∞ | | |
| 1 | 60.000 | 0.90 | 1.91082 | 35.25 |
| 2 | 12.991 | 5.25 | | |
| 3* | −39.482 | 0.80 | 1.59201 | 67.02 |
| 4* | 94.022 | 0.52 | | |
| 5 | 41.845 | 2.50 | 1.92286 | 18.90 |
| 6 | −1238.605 | (Variable) | | |
| 7* | 13.943 | 2.77 | 1.58313 | 59.38 |
| 8* | −120.649 | 2.00 | | |
| 9 (Stop) | ∞ | 1.00 | | |
| 10 | 15.051 | 2.00 | 1.66998 | 39.27 |
| 11 | 25.000 | 1.00 | 1.80518 | 25.42 |
| 12 | 10.003 | 1.41 | | |
| 13 | 17.250 | 2.50 | 1.80610 | 40.92 |
| 14 | −15.568 | 1.00 | 1.84666 | 23.78 |
| 15 | −117.920 | (Variable) | | |
| 16* | 46.691 | 1.00 | 1.85135 | 40.10 |
| 17* | 14.483 | (Variable) | | |
| 18 | −38.544 | 3.04 | 1.83481 | 42.71 |
| 19 | −20.000 | 12.34 | | |
| 20 | ∞ | 2.66 | 1.51633 | 64.14 |
| 21 | ∞ | 1.00 | | |
| Image plane (Image pickup surface) | ∞ | | | |

Aspherical surface data

3th surface k = 0.000
A4 = 2.33547e−06, A6 = −1.51329e−07

4th surface k = 0.000
A4 = −1.61652e−05, A6 = −1.76376e−07

7th surface k = 0.000
A4 = −3.83243e−05

8th surface k = 0.000
A4 = 6.69603e−06, A6 = 1.11614e−07

16th surface k = 0.000
A4 = −1.01940e−04, A6 = −6.25158e−07

17th surface k = 0.000
A4 = −3.21030e−05, A6 = −1.10392e−06

Zoom data
Zoom ratio 2.88

|  | WE | ST | TE |
|---|---|---|---|
| Focal length | 12.62 | 21.72 | 36.34 |
| Fno. | 2.86 | 3.78 | 5.17 |
| Angle of view 2ω | 92.10 | 54.51 | 33.49 |
| Image height | 11.15 | 11.15 | 11.15 |
| fb (in air) | 15.09 | 15.09 | 15.09 |
| Lens total length (in air) | 67.08 | 63.14 | 67.09 |
| d6 | 19.87 | 7.61 | 0.30 |
| d15 | 1.50 | 4.10 | 8.12 |
| d17 | 2.94 | 8.64 | 15.89 |

Unit focal length

| f1 = −19.66 | f2 = 15.80 | f3 = −25.02 | f4 = 46.34 |

Next, values of conditional expressions from conditional expression (1) to conditional expression (24) in each example will be given below. A hyphen ('-') denotes that a value does not exist. This is because an arrangement (an element) for calculating a value of conditional expression does not exist.

| Conditional expression | Example 1 | Example 2 | Example 3 |
|---|---|---|---|
| (1) $(R_{21F} + R_{21R})/(R_{21F} - R_{21R})$ | −4.56785 | −1.27123 | −1.23995 |
| (2) $(R_{22F} + R_{22R})/(R_{22F} - R_{22R})$ | 0.356466 | −0.14939 | −0.00362 |
| (3) $f_w/|R_{22c}|$ | 1.220334 | 1.909596 | 1.722897 |
| (4) $f_2/f_{21}$ | 0.498719 | 0.776994 | 0.807445 |
| (5) $d_{212}/f_w$ | 0.185719 | 0.257243 | 0.29887 |
| (6) $v_{22p} - v_{22n}$ | 41.6 | 33.48 | 33.48 |
| (7) $N_{22p} - N_{22n}$ | −0.21317 | −0.28695 | −0.28695 |
| (8) $M_3/M_2$ | 0.546602 | 0.702938 | 0.67385 |
| (9) $f_4/|f_3|$ | 1.804772 | 2.485169 | 1.775899 |
| (10) $\beta_{234w}$ | −0.69764 | −0.68613 | −0.62721 |
| (11) $\beta_{2w}$ | −0.45709 | −0.43968 | −0.43091 |
| (12) $f_w/f_2$ | 0.868989 | 0.883203 | 0.777273 |
| (13) $SF_{11n} - SF_{12n}$ | 1.830389 | — | — |
| (14) $R_{1pF}/R_{12nR}$ | 0.556576 | — | — |
| (15) $d_{112}/f_w$ | 0.323289 | — | — |
| (16) $(R_{1nF} + R_{1nR})/(R_{1nF} - R_{1nR})$ | — | 0.9958 | 1.039789 |
| (17) $(R_{1pF} + R_{1pR})/(R_{1pF} - R_{1pR})$ | — | −2.8566 | −2.55088 |
| (18) $d_{12}/f_w$ | — | 0.367021 | 0.4443 |
| (19) $(R_{3F} + R_{3R})/(R_{3F} - R_{3R})$ | 0.965063 | 1.377916 | 0.608207 |
| (20) $(R_{31R} + R_{32F})/(R_{31R} - R_{32F})$ | — | — | — |
| (21) $N_4 - N_{3F}$ | 0 | 0.23216 | 0.23216 |
| (22) $f_w/f_4$ | 0.32131 | 0.197568 | 0.297476 |
| (23) $(R_{4F} + R_{4R})/(R_{4F} - R_{4R})$ | 0.72068 | 4.046946 | 0.242292 |
| (24) $f_b/f_w$ | 1.062204 | 1.195117 | 1.195909 |

| Conditional expression | Example 4 | Example 5 | Example 6 |
|---|---|---|---|
| (1) $(R_{21F} + R_{21R})/(R_{21F} - R_{21R})$ | −1.88866 | −5.66269 | −26.1468 |
| (2) $(R_{22F} + R_{22R})/(R_{22F} - R_{22R})$ | −0.97153 | −1.31616 | −0.30863 |
| (3) $f_w/|R_{22c}|$ | 2.244098 | 1.79382 | 0.978605 |
| (4) $f_2/f_{21}$ | 0.760975 | 0.512643 | 0.302679 |
| (5) $d_{212}/f_w$ | 0.209694 | 0.209365 | 0.209011 |
| (6) $v_{22p} - v_{22n}$ | 50.77 | 56.12 | 26.48 |
| (7) $N_{22p} - N_{22n}$ | −0.12777 | −0.30818 | −0.04008 |
| (8) $M_3/M_2$ | 0.466335 | 0.533552 | 0.520264 |
| (9) $f_4/|f_3|$ | 1.600599 | 1.963527 | 1.659721 |
| (10) $\beta_{234w}$ | −0.72175 | −0.7775 | −0.72311 |
| (11) $\beta_{2w}$ | −0.53158 | −0.5269 | −0.53719 |
| (12) $f_w/f_2$ | 0.92608 | 1.000456 | 0.968277 |
| (13) $SF_{11n} - SF_{12n}$ | 2.418565 | 1.799035 | 2.99657 |
| (14) $R_{1pF}/R_{12nR}$ | −0.00447 | 0.47923 | 0.447568 |
| (15) $d_{112}/f_w$ | 0.243927 | 0.243893 | 0.243903 |
| (16) $(R_{1nF} + R_{1nR})/(R_{1nF} - R_{1nR})$ | — | — | — |
| (17) $(R_{1pF} + R_{1pR})/(R_{1pF} - R_{1pR})$ | — | — | — |
| (18) $d_{12}/f_w$ | — | — | — |
| (19) $(R_{3F} + R_{3R})/(R_{3F} - R_{3R})$ | 1.196051 | 1.179195 | 2.232506 |
| (20) $(R_{31R} + R_{32F})/(R_{31R} - R_{32F})$ | — | — | — |
| (21) $N_4 - N_{3F}$ | 0.18489 | 0.28053 | 0.18489 |
| (22) $f_w/f_4$ | 0.351656 | 0.28111 | 0.276787 |
| (23) $(R_{4F} + R_{4R})/(R_{4F} - R_{4R})$ | 0.667097 | 4.995488 | 4.908887 |
| (24) $f_b/f_w$ | 1.018571 | 1.01679 | 1.01527 |

| Conditional expression | Example 7 | Example 8 | Example 9 |
|---|---|---|---|
| (1) $(R_{21F} + R_{21R})/(R_{21F} - R_{21R})$ | −0.96875 | −1.6538 | −1.6236 |
| (2) $(R_{22F} + R_{22R})/(R_{22F} - R_{22R})$ | −0.34519 | −2.21553 | −2.55118 |
| (3) $f_w/|R_{22c}|$ | 1.282294 | 2.357565 | 2.477333 |
| (4) $f_2/f_{21}$ | 0.440849 | 0.899368 | 0.938817 |
| (5) $d_{212}/f_w$ | 0.206341 | 0.209439 | 0.209962 |
| (6) $v_{22p} - v_{22n}$ | 33.96 | 29.54 | 19.5 |
| (7) $N_{22p} - N_{22n}$ | −0.22205 | −0.21687 | 0.0568 |
| (8) $M_3/M_2$ | 0.456981 | 0.472995 | 0.477159 |
| (9) $f_4/|f_3|$ | 3.071801 | 1.358091 | 1.169435 |
| (10) $\beta_{234w}$ | −1.05078 | −0.67488 | −0.62747 |
| (11) $\beta_{2w}$ | −0.52753 | −0.53228 | −0.52921 |
| (12) $f_w/f_2$ | 1.201774 | 0.883994 | 0.880699 |
| (13) $SF_{11n} - SF_{12n}$ | 1.772711 | — | — |
| (14) $R_{1pF}/R_{12nR}$ | 0.501718 | — | — |
| (15) $d_{112}/f_w$ | 0.243819 | — | — |
| (16) $(R_{1nF} + R_{1nR})/(R_{1nF} - R_{1nR})$ | — | 0.851351 | 0.937822 |
| (17) $(R_{1pF} + R_{1pR})/(R_{1pF} - R_{1pR})$ | — | −3.00939 | −3.53357 |
| (18) $d_{12}/f_w$ | — | 0.243866 | 0.243882 |
| (19) $(R_{3F} + R_{3R})/(R_{3F} - R_{3R})$ | 2.411446 | 1.019545 | 0.800501 |
| (20) $(R_{31R} + R_{32F})/(R_{31R} - R_{32F})$ | −1.52432 | — | — |
| (21) $N_4 - N_{3F}$ | 0 | 0.18489 | 0.18489 |
| (22) $f_w/f_4$ | 0.333808 | 0.37646 | 0.412112 |
| (23) $(R_{4F} + R_{4R})/(R_{4F} - R_{4R})$ | 2.476263 | 1.146386 | 0.989398 |
| (24) $f_b/f_w$ | 1.008847 | 1.01552 | 1.016766 |

| Conditional expression | Example 10 | Example 11 | Example 12 |
|---|---|---|---|
| (1) $(R_{21F} + R_{21R})/(R_{21F} - R_{21R})$ | −3.19226 | −2.22034 | −22.2985 |
| (2) $(R_{22F} + R_{22R})/(R_{22F} - R_{22R})$ | −1.79612 | −0.50061 | −0.332 |
| (3) $f_w/|R_{22c}|$ | 1.881861 | 1.71805 | 0.942821 |
| (4) $f_2/f_{21}$ | 0.798123 | 0.710376 | 0.319312 |
| (5) $d_{212}/f_w$ | 0.212879 | 0.210027 | 0.209048 |
| (6) $v_{22p} - v_{22n}$ | 19.5 | 31.3 | 26.48 |
| (7) $N_{22p} - N_{22n}$ | −0.0568 | −0.21087 | −0.04008 |
| (8) $M_3/M_2$ | 0.489162 | 0.586314 | 0.540122 |
| (9) $f_4/|f_3|$ | 0.975499 | 1.53688 | 1.725526 |
| (10) $\beta_{234w}$ | −0.58382 | −0.67149 | −0.72701 |
| (11) $\beta_{2w}$ | −0.53401 | −0.48356 | −0.53083 |
| (12) $f_w/f_2$ | 0.83523 | 0.924875 | 0.974664 |
| (13) $SF_{11n} - SF_{12n}$ | — | — | 2.950424 |
| (14) $R_{1pF}/R_{12nR}$ | — | — | 0.412096 |
| (15) $d_{112}/f_w$ | — | — | 0.243889 |
| (16) $(R_{1nF} + R_{1nR})/(R_{1nF} - R_{1nR})$ | 0.835466 | 0.580245 | — |
| (17) $(R_{1pF} + R_{1pR})/(R_{1pF} - R_{1pR})$ | −3.91849 | −1.9644 | — |
| (18) $d_{12}/f_w$ | 0.243839 | 0.243893 | — |
| (19) $(R_{3F} + R_{3R})/(R_{3F} - R_{3R})$ | 1.210356 | 0.740115 | 2.205309 |
| (20) $(R_{31R} + R_{32F})/(R_{31R} - R_{32F})$ | — | — | — |
| (21) $N_4 - N_{3F}$ | 0.18489 | 0.18489 | 0.18489 |
| (22) $f_w/f_4$ | 0.409413 | 0.430623 | 0.276701 |
| (23) $(R_{4F} + R_{4R})/(R_{4F} - R_{4R})$ | 1.474009 | 1.030381 | 4.972499 |
| (24) $f_b/f_w$ | 1.016323 | 1.018004 | 1.016113 |

| Conditional expression | Example 13 | Example 14 |
|---|---|---|
| (1) $(R_{21F} + R_{21R})/(R_{21F} - R_{21R})$ | −37.1374 | −0.79281 |
| (2) $(R_{22F} + R_{22R})/(R_{22F} - R_{22R})$ | −0.65273 | 4.96343 |
| (3) $f_w/|R_{22c}|$ | 1.711827 | 0.504767 |
| (4) $f_2/f_{21}$ | 0.280742 | 0.731471 |
| (5) $d_{212}/f_w$ | 0.208981 | 0.237734 |
| (6) $v_{22p} - v_{22n}$ | 26.48 | 13.85 |
| (7) $N_{22p} - N_{22n}$ | −0.04008 | −0.1352 |
| (8) $M_3/M_2$ | 0.542768 | 0.661813 |
| (9) $f_4/|f_3|$ | 1.594552 | 1.852433 |
| (10) $\beta_{234w}$ | −0.70448 | −0.64195 |
| (11) $\beta_{2w}$ | −0.53178 | −0.45397 |
| (12) $f_w/f_2$ | 0.942423 | 0.798774 |
| (13) $SF_{11n} - SF_{12n}$ | 1.924813 | 1.961224 |
| (14) $R_{1pF}/R_{12nR}$ | 0.401054 | 0.445055 |
| (15) $d_{112}/f_w$ | 0.243892 | 0.416057 |
| (16) $(R_{1nF} + R_{1nR})/(R_{1nF} - R_{1nR})$ | — | — |
| (17) $(R_{1pF} + R_{1pR})/(R_{1pF} - R_{1pR})$ | — | — |
| (18) $d_{12}/f_w$ | — | — |
| (19) $(R_{3F} + R_{3R})/(R_{3F} - R_{3R})$ | 2.020849 | 1.899306 |
| (20) $(R_{31R} + R_{32F})/(R_{31R} - R_{32F})$ | — | — |
| (21) $N_4 - N_{3F}$ | 0.18489 | −0.01654 |
| (22) $f_w/f_4$ | 0.280483 | 0.272295 |
| (23) $(R_{4F} + R_{4R})/(R_{4F} - R_{4R})$ | 4.531632 | 3.15709 |
| (24) $f_b/f_w$ | 1.016119 | 1.194801 |

Further, values of the parameters will be given below.

| | Example 1 | Example 2 | Example 3 | Example 4 |
|---|---|---|---|---|
| $R_{21F}$ | 11.4799 | 12.1797 | 13.5152 | 11.2175 |
| $R_{21R}$ | 17.9151 | 101.9917 | 126.1658 | 36.4635 |
| $R_{22F}$ | 35.5447 | 17.8467 | 22.4768 | 23.7065 |
| $R_{22R}$ | −16.8631 | −24.1155 | −22.64 | −1641.6 |
| $f_w$ | 14.53808 | 12.61918 | 12.61919 | 14.34854 |
| $|R_{22c}|$ | 11.9132 | 6.6083 | 7.3244 | 6.3939 |
| $f_2$ | 16.72988 | 14.28798 | 16.23521 | 15.49384 |
| $f_{21}$ | 33.5457 | 18.3888 | 20.1069 | 20.3605 |
| $d_{212}$ | 2.7 | 3.2462 | 3.7715 | 3.0088 |
| $v_{22p}$ | 67.02 | 58.9 | 58.9 | 81.54 |
| $v_{22n}$ | 25.42 | 25.42 | 25.42 | 30.77 |
| $N_{22p}$ | 1.59201 | 1.51823 | 1.51823 | 1.497 |
| $N_{22n}$ | 1.80518 | 1.80518 | 1.80518 | 1.62477 |
| $M_2$ | 20.26785 | 18.32353 | 21.22567 | 19.25047 |
| $M_3$ | 11.07845 | 12.8803 | 14.30291 | 8.97717 |
| $f_4$ | 45.24624 | 63.87263 | 42.42084 | 40.80275 |
| $|f_3|$ | 25.07034 | 25.70152 | 23.88696 | 25.49217 |
| $SF_{11n}$ | 1.87931 | — | — | 1.391025 |
| $R_{11nF}$ | 42.5685 | — | — | 70.3369 |
| $R_{11nR}$ | 13 | — | — | 11.50289 |
| $SF_{12n}$ | 0.048925 | — | — | −1.02754 |
| $R_{12nF}$ | −43.6419 | — | — | −50.9907 |
| $R_{12nR}$ | 39.5707 | — | — | −3754.01 |
| $R_{1pF}$ | 22.0241 | — | — | 16.7812 |
| $R_{12nR}$ | 39.5707 | — | — | −3754.01 |
| $d_{112}$ | 4.7 | — | — | 3.5 |
| $R_{1nF}$ | — | −4899.81 | 552.5776 | — |

-continued

|  | | | | |
|---|---|---|---|---|
| $R_{1nR}$ | — | 10.3105 | 10.7789 | — |
| $R_{1p}$ | — | 20.8236 | 24.1135 | — |
| $R_{1pR}$ | — | 43.2556 | 55.21 | — |
| $d_{12}$ | — | 4.6315 | 5.6067 | — |
| $R_{3F}$ | −754.403 | 67.2836 | −60.8153 | 151.4837 |
| $R_{3R}$ | 13.4127 | 10.6932 | 14.8159 | 13.5236 |
| $R_{31R}$ | — | — | — | — |
| $R_{32F}$ | — | — | — | — |
| $N_4$ | 1.52542 | 1.72916 | 1.72916 | 1.76802 |
| $N_{3F}$ | 1.52542 | 1.497 | 1.497 | 1.58313 |
| $R_{4F}$ | 169.0361 | −33.1279 | 80.7186 | 187.0645 |
| $R_{4R}$ | −27.4398 | −20 | −49.2325 | −37.3549 |
| $f_b$ | 15.4424 | 15.0814 | 15.0914 | 14.615 |

|  | Example 5 | Example 6 | Example 7 | Example 8 |
|---|---|---|---|---|
| $R_{21F}$ | 10.8312 | 8.5763 | 13.6697 | 10.7256 |
| $R_{21R}$ | 15.4771 | 9.2584 | −861.231 | 43.5355 |
| $R_{22F}$ | 12.8153 | 18.0951 | 13.091 | 23.2643 |
| $R_{22R}$ | 93.8845 | −34.2508 | −26.893 | 61.5429 |
| $f_w$ | 14.35056 | 14.34997 | 14.3549 | 14.35215 |
| $|R_{22c}|$ | 8 | 14.6637 | 11.1947 | 6.0877 |
| $f_2$ | 14.34402 | 14.82011 | 11.94476 | 16.23557 |
| $f_{21}$ | 27.9805 | 48.9631 | 27.0949 | 18.0522 |
| $d_{212}$ | 3.0045 | 2.9993 | 2.962 | 3.0059 |
| $v_{22p}$ | 81.54 | 49.24 | 59.38 | 59.38 |
| $v_{22n}$ | 25.42 | 22.76 | 25.42 | 29.84 |
| $N_{22p}$ | 1.497 | 1.76802 | 1.58313 | 1.58313 |
| $N_{22n}$ | 1.80518 | 1.8081 | 1.80518 | 1.8 |
| $M_2$ | 17.84566 | 18.23398 | 15.32842 | 20.04194 |
| $M_3$ | 9.52158 | 9.48649 | 7.00479 | 9.47974 |
| $f_4$ | 51.04957 | 51.84474 | 43.00346 | 38.12395 |
| $|f_3|$ | 25.99891 | 31.23703 | 13.99943 | 28.07171 |
| $SF_{11n}$ | 1.95172 | 3.079713 | 2.054115 | — |
| $R_{11nF}$ | 39.1277 | 25.1602 | 32.9681 | — |
| $R_{11nR}$ | 12.6159 | 12.8259 | 11.3788 | — |
| $SF_{12n}$ | 0.152684 | 0.083143 | 0.281404 | — |
| $R_{12nF}$ | −48.3864 | −41.8359 | −46.9033 | — |
| $R_{12nR}$ | 35.5679 | 35.4132 | 26.3028 | — |
| $R_{1pF}$ | 17.0452 | 15.8498 | 13.1966 | — |
| $R_{12nR}$ | 35.5679 | 35.4132 | 26.3028 | — |
| $d_{112}$ | 3.5 | 3.5 | 3.5 | — |
| $R_{1nF}$ | — | — | — | −151.957 |
| $R_{1nR}$ | — | — | — | 12.201 |
| $R_{1p}$ | — | — | — | 20.5757 |
| $R_{1pR}$ | — | — | — | 41.0552 |
| $d_{12}$ | — | — | — | 3.5 |
| $R_{3F}$ | 141.3132 | 29.3177 | 30.615 | 1674.858 |
| $R_{3R}$ | 11.6202 | 11.1784 | 12.6666 | 16.2095 |
| $R_{31R}$ | — | — | 12.6666 | — |
| $R_{32F}$ | — | — | 60.9825 | — |
| $N_4$ | 1.76802 | 1.76802 | 1.76802 | 1.76802 |
| $N_{3F}$ | 1.48749 | 1.58313 | 1.76802 | 1.58313 |
| $R_{4F}$ | −23.2526 | −23.4896 | −46.6982 | −401.569 |
| $R_{4R}$ | −15.4959 | −15.539 | −19.8313 | −27.3875 |
| $f_b$ | 14.5915 | 14.5691 | 14.4819 | 14.5749 |

|  | Example 9 | Example 10 | Example 11 |
|---|---|---|---|
| $R_{21F}$ | 10.4275 | 8.8507 | 10.9283 |
| $R_{21R}$ | 43.8706 | 16.9252 | 28.8385 |
| $R_{22F}$ | 36.9218 | 25.3564 | 19.878 |
| $R_{22R}$ | 84.5265 | 89.0564 | −59.7307 |
| $f_w$ | 14.35119 | 14.35371 | 14.35053 |
| $|R_{22c}|$ | 5.793 | 7.6274 | 8.3528 |
| $f_2$ | 16.29523 | 17.18534 | 15.51618 |
| $f_{21}$ | 17.3572 | 21.5322 | 21.8422 |
| $d_{212}$ | 3.0132 | 3.0556 | 3.014 |
| $v_{22p}$ | 49.34 | 49.34 | 61.14 |
| $v_{22n}$ | 29.84 | 29.84 | 29.84 |
| $N_{22p}$ | 1.7432 | 1.7432 | 1.58913 |
| $N_{22n}$ | 1.8 | 1.8 | 1.8 |
| $M_2$ | 20.28059 | 21.13037 | 20.33403 |
| $M_3$ | 9.67707 | 10.33618 | 11.92212 |
| $f_4$ | 34.82353 | 35.05927 | 33.32507 |
| $|f_3|$ | 29.77809 | 35.93985 | 21.68359 |
| $SF_{11n}$ | — | — | — |
| $R_{11nF}$ | — | — | — |
| $R_{11nR}$ | — | — | — |

-continued

|  | | | |
|---|---|---|---|
| $SF_{12n}$ | — | — | — |
| $R_{12nF}$ | — | — | — |
| $R_{12nR}$ | — | — | — |
| $R_{1pF}$ | — | — | — |
| $R_{12nR}$ | — | — | — |
| $d_{112}$ | — | — | — |
| $R_{1nF}$ | −394.439 | −168.268 | −54.8722 |
| $R_{1nR}$ | 12.6561 | 15.0838 | 14.5755 |
| $R_{1p}$ | 19.8325 | 21.978 | 28.8651 |
| $R_{1pR}$ | 35.4883 | 37.0392 | 88.7263 |
| $d_{12}$ | 3.5 | 3.5 | 3.5 |
| $R_{3F}$ | −174.212 | 199.0949 | −97.4346 |
| $R_{3R}$ | 19.3031 | 18.9475 | 14.5518 |
| $R_{31R}$ | — | — | — |
| $R_{32F}$ | — | — | — |
| $N_4$ | 1.76802 | 1.76802 | 1.76802 |
| $N_{3F}$ | 1.58313 | 1.58313 | 1.58313 |
| $R_{4F}$ | 5043.898 | −115.357 | −1686.36 |
| $R_{4R}$ | −26.8801 | −22.1019 | −25.2331 |
| $f_b$ | 14.5918 | 14.588 | 14.6089 |

|  | Example 12 | Example 13 | Example 14 |
|---|---|---|---|
| $R_{21F}$ | 8.4768 | 8.1544 | 13.9431 |
| $R_{21R}$ | 9.2728 | 8.6057 | −120.649 |
| $R_{22F}$ | 17.7089 | 14.6091 | 15.0511 |
| $R_{22R}$ | −35.3121 | −69.5275 | 10.0033 |
| $f_w$ | 14.35077 | 14.35059 | 12.61917 |
| $|R_{22c}|$ | 15.2211 | 8.3832 | 25 |
| $f_2$ | 14.72381 | 15.22734 | 15.7981 |
| $f_{21}$ | 46.111 | 54.2396 | 21.5977 |
| $d_{212}$ | 3 | 2.999 | 3 |
| $v_{22p}$ | 49.24 | 49.24 | 39.27 |
| $v_{22n}$ | 22.76 | 22.76 | 25.42 |
| $N_{22p}$ | 1.76802 | 1.76802 | 1.66998 |
| $N_{22n}$ | 1.8081 | 1.8081 | 1.80518 |
| $M_2$ | 18.22385 | 18.75944 | 19.5725 |
| $M_3$ | 9.8431 | 10.18203 | 12.95334 |
| $f_4$ | 51.86376 | 51.16387 | 46.3438 |
| $|f_3|$ | 30.05678 | 32.08668 | 25.0178 |
| $SF_{11n}$ | 2.964603 | 2.260411 | 1.552697 |
| $R_{11nF}$ | 26.2534 | 33.8892 | 60 |
| $R_{11nR}$ | 13.0095 | 13.1009 | 12.9909 |
| $SF_{12n}$ | 0.014178 | 0.335597 | −0.40853 |
| $R_{12nF}$ | −39.5847 | −76.2554 | −39.4822 |
| $R_{12nR}$ | 38.4779 | 37.9338 | 94.0224 |
| $R_{1pF}$ | 15.85661 | 15.2135 | 41.8451 |
| $R_{12nR}$ | 38.4779 | 37.9338 | 94.0224 |
| $d_{112}$ | 3.5 | 3.5 | 5.2503 |
| $R_{1nF}$ | — | — | — |
| $R_{1nR}$ | — | — | — |
| $R_{1p}$ | — | — | — |
| $R_{1pR}$ | — | — | — |
| $d_{12}$ | — | — | — |
| $R_{3F}$ | 28.8449 | 36.4331 | 46.691 |
| $R_{3R}$ | 10.8467 | 12.312 | 14.4826 |
| $R_{31R}$ | — | — | — |
| $R_{32F}$ | — | — | — |
| $N_4$ | 1.76802 | 1.76802 | 1.83481 |
| $N_{3F}$ | 1.58313 | 1.58313 | 1.85135 |
| $R_{4F}$ | −23.1945 | −25.2212 | −38.5435 |
| $R_{4R}$ | −15.4274 | −16.1023 | −20 |
| $f_b$ | 14.582 | 14.5819 | 15.0774 |

Figure 29:
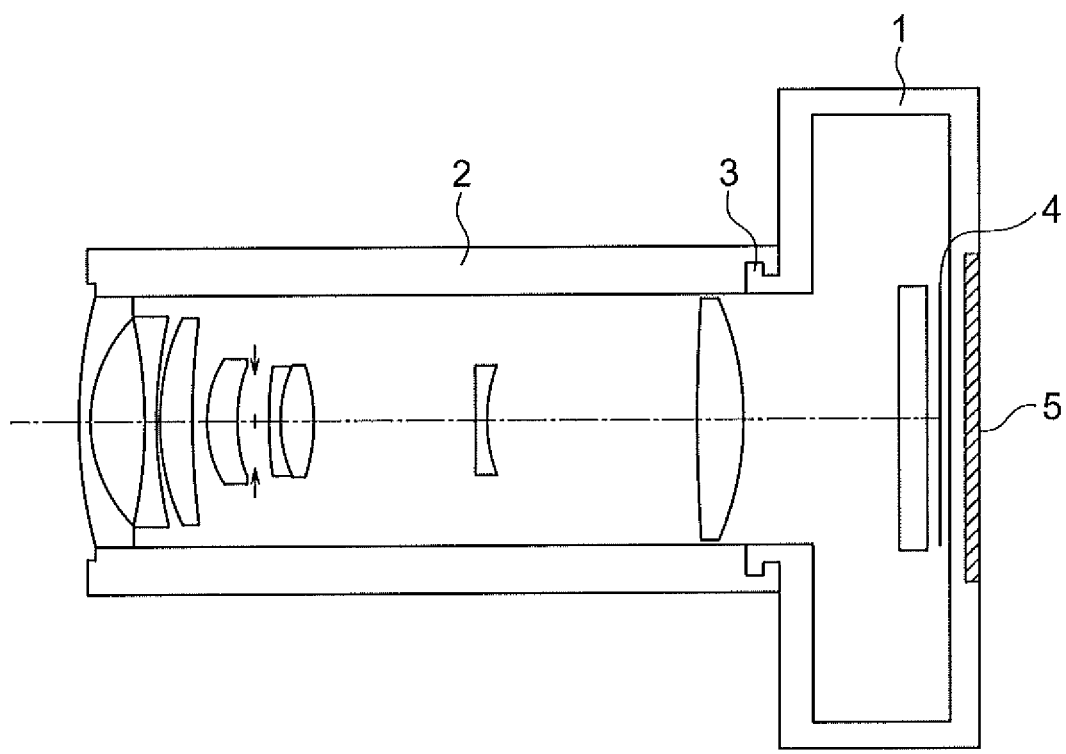
FIG. 29 is a cross-sectional view of an interchangeable lens camera in which, the image forming optical system according to the present example has been used as an interchangeable lens.

FIG. 29 is a cross-sectional view of a single-lens mirrorless camera as an electronic image pickup apparatus. In FIG. 29, a taking lens system 2 is disposed inside a lens barrel of a single-lens mirrorless camera 1. Amount portion 3 enables the taking lens system 2 to be detachable from a body of the single-lens mirrorless camera 1. As the mount portion 3, a mount such as a screw-type mount and a bayonet-type mount is to be used. In this example, a bayonet-type mount is used. Moreover, an image pickup element surface 4 and a back monitor 5 are disposed in the body of the single-lens mirrorless camera 1. As an image pickup element, an element such as a small-size CCD (charge coupled device) or a CMOS (complementary metal-oxide semiconductor) is to be used.

Moreover, as the taking lens system 2 of the single-lens mirrorless camera 1, the image forming optical system described in any one of the examples from the first example to the fourteenth example is to be used.

Figure 30:
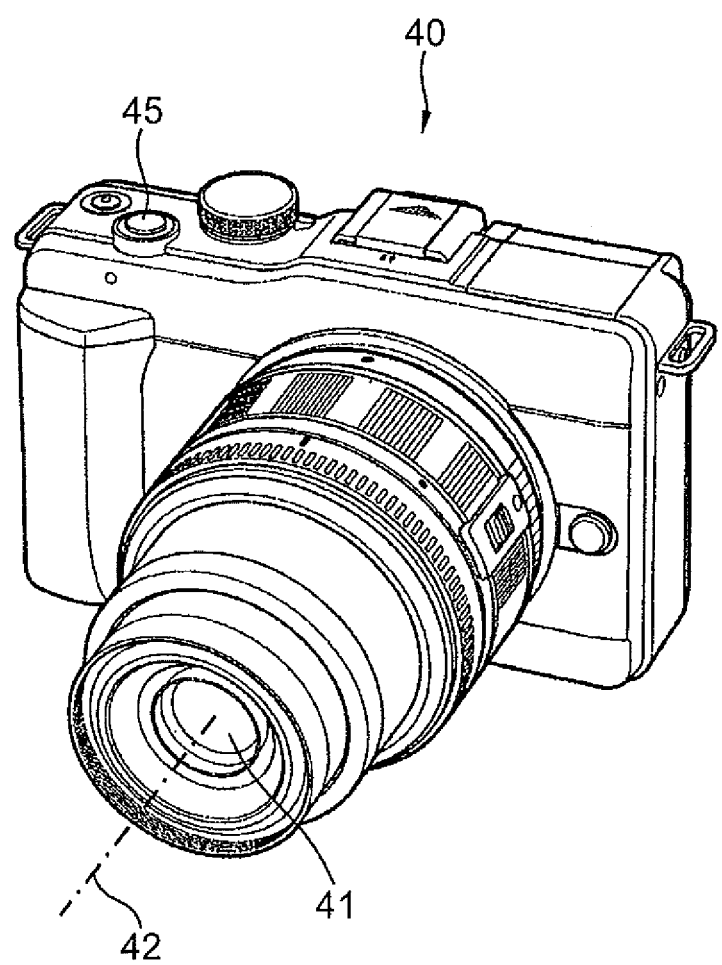
FIG. 30 is a front perspective view showing an appearance of an interchangeable lens camera according to the present example.
Figure 31:
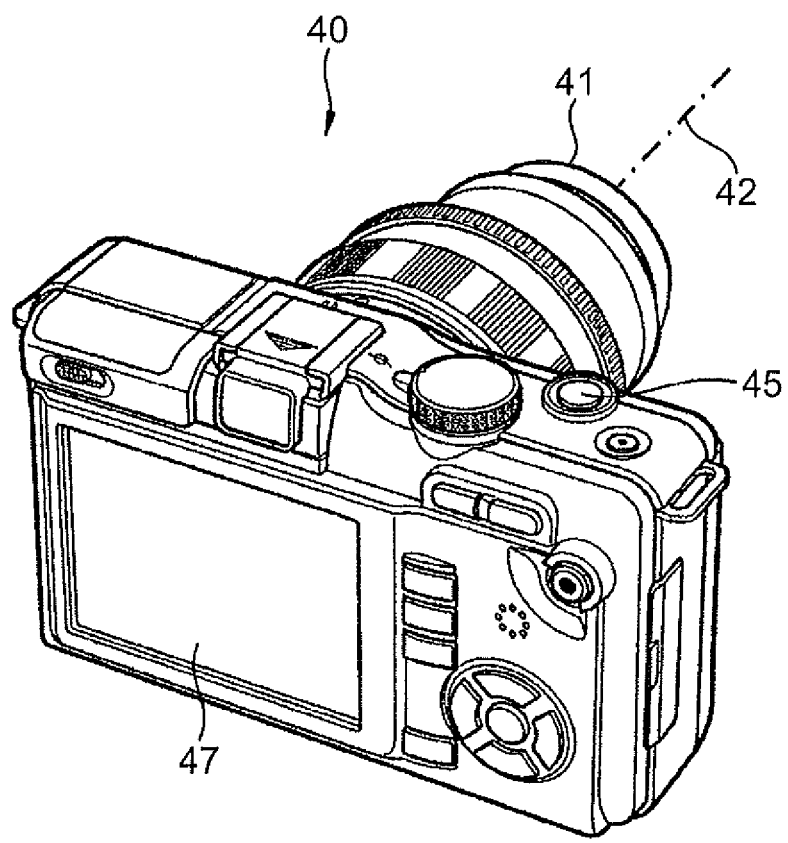
FIG. 31 is a rear perspective view of the interchangeable lens camera in FIG. 16.

FIG. 30 and FIG. 31 are conceptual diagrams of an arrangement of the image pickup apparatus which has the image forming optical system according to the present example. FIG. 30 is a front perspective view showing an appearance of a single-lens mirrorless camera 40 as the image pickup apparatus, and FIG. 31 is a rear perspective view of the single-lens mirrorless camera 40. The image forming optical system according to the present example is used in a photographic optical system 41 of the single-lens mirrorless camera 40.

The single-lens mirrorless camera 40 according to the present embodiment includes the photographic optical system. 41 which is positioned in a photographic optical path 42, a shutter button 45, and a liquid-crystal display monitor 47. As the shutter button 45 disposed on an upper portion of the single-lens mirrorless camera 40 is pressed, in conjunction with the pressing of the shutter button 45, photography is carried out by the photographic optical system 41 such as the image forming optical system according to the first example. An object image which is formed by the photographic optical system 41 is formed on an image pickup element (photoelectric conversion surface) which is provided near an image forming surface. The object image which has been received optically by the image pickup element is displayed on the liquid-crystal display monitor 47 which is provided to a rear surface of the camera, as an electronic image by a processing means. Moreover, it is possible to record the electronic image which has been photographed, in a recording means.

FIG. 31 is a structural block diagram of an internal circuit of main components of the single-lens mirrorless camera 40. In the following description, the processing means described above includes for instance, a CDS/ADC section 24, a temporary storage memory 117, and an image processing section 18, and a storage means consists of a storage medium section 19 for example.

As shown in FIG. 31, the single-lens mirrorless camera 40 includes an operating section 12, a control section 13 which is connected to the operating section 12, the temporary storage memory 17 and an imaging drive circuit 16 which are connected to a control-signal output port of the control section 13, via a bus 14 and a bus 15, the image processing section 18, the storage medium section 19, a display section 20, and a set-information storage memory section 21.

The temporary storage memory 17, the image processing section 18, the storage medium section 19, the display section 20, and the set-information storage memory section 21 are structured to be capable of mutually inputting and outputting data via a bus 22. Moreover, the CCD 49 and the CDS/ADC section 24 are connected to the imaging drive circuit 16.

The operating section 12 includes various input buttons and switches, and informs the control section 13 of event information which is input from outside (by a user of the digital camera) via these input buttons and switches. The control section 13 is a central processing unit (CPU), and has a built-in computer program memory which is not shown in the diagram. The control section 13 controls the entire single-lens mirrorless camera 40 according to a computer program stored in this computer program memory.

The CCD 49 is driven and controlled by the imaging drive circuit 16, and which converts an amount of light for each pixel of the object image to an electric signal, and outputs to the CDS/ADC section 24.

The CDS/ADC section 24 is a circuit which amplifies the electric signal which is input from the CCD 49, and carries out analog/digital conversion, and outputs to the temporary storage memory 17 image raw data (Bayer data, hereinafter called as 'RAW data') which is only amplified and converted to digital data.

The temporary storage memory 17 is a buffer which includes an SDRAM (Synchronous Dynamic Random Access Memory) for example, and is a memory device which stores temporarily the RAW data which is output from the CDS/ADC section 24. The image processing section 18 is a circuit which reads the RAW data stored in the temporary storage memory 17, or the RAW data stored in the storage medium section 19, and carries out electrically various image-processing including the distortion correction, based on image-quality parameters specified by the control section 13.

The storage medium section 19 is a recording medium in the form of a card or a stick including a flash memory for instance, detachably mounted. The storage medium section 19 records and maintains the RAW data transferred from the temporary storage memory 17 and image data subjected to image processing in the image processing section 18 in the card flash memory and the stick flash memory.

The display section 20 includes the liquid-crystal display monitor, and displays images and operation menu on the liquid-crystal display monitor. The set-information storage memory section 21 includes a ROM section in which various image quality parameters are stored in advance, and a RAM section which stores image quality parameters which are selected by an input operation on the operating section 12, from among the image quality parameters which are read from the ROM section.

In the single-lens mirrorless camera 40 structured in such manner, it is possible to provide a thin and small-sized image forming optical system with an improved imaging performance (optical performance).

The single-lens mirrorless camera 40 structured in such manner can be an image pickup apparatus in which the imaging performance (optical performance) is high, and that is thin and small-sized.

The present invention can have various modified examples without departing from the scope of the invention. For instance, shapes of lenses and the number of lenses are not necessarily restricted to the shapes of the lenses and the number of the lenses shown in each example. Moreover, in each example, the cover glass C may not be disposed necessarily. A lens which is not shown in diagrams of the aforementioned examples, and which practically does not have a refractive power may be disposed inside or outside of each lens unit.

According to the present invention, it is possible to provide a thin and small-sized image forming optical system with an improved imaging performance (optical performance), which has a desired back focus, and an electronic image pickup apparatus which includes such image forming optical system.

As described heretofore, the present invention is suitable for a small-sized and thin image forming optical system with an improved imaging performance (optical performance), which has a desired back focus, and an electronic image pickup apparatus which includes such image forming optical system.

What is claimed is:

1. An image forming optical system comprising in order from an object side:
   a first lens unit having a negative refractive power;
   a second lens unit having a positive refractive power;
   a third lens unit having a negative refractive power; and
   a fourth lens unit having a positive refractive power, wherein
   at the time of zooming, distances between adjacent lens units change, and
   at the time of zooming from a wide angle end to a telephoto end, the first lens unit, after moving toward an image side, moves toward the object side, and a second lens unit moves only toward the object side, and
   a lens component is one of a single lens and a cemented lens, and
   the first lens unit consists of a first negative lens, a second negative lens, and a positive lens in order from the object side, and
   the second lens unit comprises in order from the object side, a first lens component and a second lens component, and
   a total number of lens components included in the second lens unit is two, and
   the first lens component either consists of a positive single lens, or consists of a cemented lens in which, a positive lens and a negative lens are cemented in order of the positive lens and the negative lens, and
   the second lens component consists of a cemented lens, and
   the third lens unit consists of either one lens or two lenses as a whole, and comprises a lens having an absolute value of a curvature of a surface on the image side larger than an absolute value of a curvature of a surface on the object side, which is disposed nearest to the object side, and
   the fourth lens unit consists of one positive lens component, wherein the following conditional expression (2) is satisfied:

$$-10<(R_{22F}+R_{22R})/(R_{22F}-R_{22R})<10 \quad (2)$$

where,
   $R_{22F}$ denotes a paraxial radius of curvature of a surface nearest to an object of the second lens component, and
   $R_{22R}$ denotes a paraxial radius of curvature of a surface nearest to an image of the second lens component.

2. The image forming optical system according to claim 1, wherein
   an aperture stop is disposed between the first lens component and the second lens component.

3. The image forming optical system according to claim 1, wherein
   the cemented lens in the second lens component comprises a negative lens, and a positive lens which is cemented to the negative lens, and
   the following conditional expressions (6) and (7) are satisfied:

$$0<v_{22p}-v_{22n}<80 \quad (6)$$

$$-0.7<N_{22p}-N_{22n}<0.2 \quad (7)$$

where,
   $N_{22p}$ denotes a refractive index for d-line of one of the positive lenses cemented to the negative lens in the second lens component,
   $V_{22p}$ denotes Abbe's number with reference to d-line of one of the positive lenses in the second lens component,
   $N_{22n}$ denotes a refractive index for d-line of one of the negative lenses cemented to one of the positive lenses in the second lens component, and
   $V_{22n}$ denotes Abbe's number with reference to d-line of one of the negative lenses in the second lens component.

4. The image forming optical system according to claim 1, wherein
   the following conditional expression (8) is satisfied:

$$0.0<M_3/M_2<0.85 \quad (8)$$

where, $$M_2=|M_{2w}-M_{2t}|,\ M3=|M_{3w}-M_{3t}|,$$

$M_{2w}$ denotes a position of the second lens unit at a wide angle end,
   $M_{2t}$ denotes a position of the second lens unit at a telephoto end,
   $M_{3w}$ denotes a position of the third lens unit at the wide angle end, and
   $M_{3t}$ denotes a position of the third lens unit at a telephoto end, and
   $M_{2w}$, $M_{2t}$, $M_{3w}$, and $M_{3t}$ are positions at the time of infinite object point focusing.

5. The image forming optical system according to claim 1, wherein
   the fourth lens unit is fixed at the time of zooming and at the time of focusing, and
   the following conditional expression (24) is satisfied:

$$0.8<f_b/f_w<1.5 \quad (24)$$

where,
   $f_b$ denotes a distance on an optical axis from the last surface of the fourth lens unit up to a Gauss image point, and
   $f_w$ denotes the focal length of the overall image forming optical system at the wide angle end.

6. The image forming optical system according to claim 1, wherein
   the image forming optical system is a zoom lens which consists of four lens unit.

7. An electronic image pickup apparatus comprising:
   an image forming optical system according to claim 1; and
   an image pickup element which has an image pickup surface.

8. The image forming optical system according to claim 1, wherein
   the following conditional expression (2') is satisfied:

$$-10<(R_{22F}+R_{22R})/(R_{22F}-R_{22R})<6 \quad (2').$$

9. An image forming optical system comprising in order from an object side:
   a first lens unit having a negative refractive power;
   a second lens unit having a positive refractive power;
   a third lens unit having a negative refractive power; and
   a fourth lens unit having a positive refractive power, wherein
   at the time of zooming, distances between adjacent lens units change, and
   at the time of zooming from a wide angle end to a telephoto end, the first lens unit, after moving toward an image side, moves toward the object side, and the second lens unit moves only toward the object side, and
   a lens component is one of a single lens and a cemented lens, and the first unit comprises in order from the object side, a negative lens and a positive lens, and a total number of lenses included in the first lens unit is two, and the second lens unit consists of a first lens component, a second lens component, and a third lens component in order from the object side, and the first lens component either consists of a positive single lens, or consists of a cemented lens in which, a positive lens and a negative lens are cemented in order of the positive lens and the negative lens, and the second lens component consists of a cemented lens, and the third lens unit consists of either one lens or two lenses as a whole, and comprises a lens having an absolute value of a curvature of a surface on the image side larger than an absolute value of a curvature of a surface on the object side, which is disposed nearest to the object side, and the fourth lens unit consists of one positive lens component.

10. An electronic image pickup apparatus comprising:
an image forming optical system according to claim 9; and
an image pickup element which has an image pickup surface.

11. An image forming optical system comprising in order from an object side:
a first lens unit having a negative refractive power;
a second lens unit having a positive refractive power;
a third lens unit having a negative refractive power; and
a fourth lens unit having a positive refractive power, wherein at the time of zooming, distances between adjacent lens units change, and at the time of zooming from a wide angle end to a telephoto end, a first lens unit, after moving toward an image side, moves toward the object side, and the second lens unit moves only toward the object side, and a lens component is one of a single lens and a cemented lens, and the first lens unit consists of a first negative lens, a second negative lens, and a positive lens in order from the object side, and the second lens unit comprises in order from the object side, a first lens component and a second lens component, or further consists of a third lens component on the image side of the second lens component, and the first lens component either consists of a positive single lens, or consists of a cemented lens in which, a positive lens and a negative lens are cemented in order of the positive lens and the negative lens, and the second lens component consists of a cemented lens, and the third lens unit consists of either one lens or two lenses as a whole, and comprises a lens having an absolute value of a curvature of a surface on the image side larger than an absolute value of a curvature of a surface on the object side, which is disposed nearest to the object side, and the fourth lens unit consists of one positive lens component, and the following conditional expressions (1) and (13') are satisfied:

$$-100<(R_{21F}+R_{21R})/(R_{21F}-R_{21R})<-0.2 \quad (1)$$

$$1<SF_{11n}-SF_{12n}<3.35 \quad (13')$$

where, $R_{21F}$ denotes a paraxial radius of curvature of a surface nearest to an object of the first lens component, $R_{21R}$ denotes a paraxial radius of curvature of a surface nearest to an image of the first lens component, $$SF_{11n}=(R_{11nF}+R_{11nR})/(R_{11nF}-R_{11nR}) \quad (13a),$$

$$SF_{12n}=(R_{12nF}+R_{12nR})/(R_{12nF}-R_{12nR}) \quad (13b),$$

$R_{11nF}$ denotes a paraxial radius of curvature of an object-side surface of the first negative lens in the first lens unit, $R_{11nR}$ denotes a paraxial radius of curvature of an image-side surface of the first negative lens in the first lens unit, $R_{12nF}$ denotes a paraxial radius of curvature of an object-side surface of the second negative lens in the first lens unit, and $R_{12nR}$ denotes a paraxial radius of curvature of an image-side surface of the second negative lens in the first lens unit.

12. An electronic image pickup apparatus comprising:
an image forming optical system according to claim 11; and
an image pickup element which has an image pickup surface.

13. An image forming optical system comprising in order from an object side:
a first lens unit having a negative refractive power;
a second lens unit having a positive refractive power;
a third lens unit having a negative refractive power; and
a fourth lens unit having a positive refractive power, wherein at the time of zooming, distances between adjacent lens units change, and at the time of zooming from a wide angle end to a telephoto end, the first lens unit, after moving toward an image side, moves toward the object side, and a second lens unit moves only toward the object side, and a lens component is one of a single lens and a cemented lens, and the first lens unit consists of a first negative lens, a second negative lens, and a positive lens in order from the object side, and the second lens unit comprises in order from the object side, a first lens component and a second lens component, and a total number of lens components included in the second lens unit is two, and the first lens component either consists of a positive single lens, or consists of a cemented lens in which, a positive lens and a negative lens are cemented in order of the positive lens and the negative lens, and the second lens component consists of a cemented lens, and the third lens unit consists of either one lens or two lenses as a whole, and comprises a lens having an absolute value of a curvature of a surface on the image side larger than an absolute value of a curvature of a surface on the object side, which is disposed nearest to the object side, and the fourth lens unit consists of one positive lens component, wherein
the following conditional expression (13) is satisfied:

$$1 < SF_{11n} - SF_{12n} < 4.0 \quad (13)$$

where, $$SF_{11n} = (R_{11nF} + R_{11nR})/(R_{11nF} - R_{11nR}) \quad (13a),$$

$$SF_{12n} = (R_{12nF} + R_{12nR})/(R_{12nF} - R_{12nR}) \quad (13b),$$

$R_{11nF}$ denotes a paraxial radius of curvature of an object-side surface of the first negative lens in the first lens unit, $R_{11nR}$ denotes a paraxial radius of curvature of an image-side surface of the first negative lens in the first lens unit, $R_{12nF}$ denotes a paraxial radius of curvature of an object-side surface of the second negative lens in the first lens unit, and $R_{12nR}$ denotes a paraxial radius of curvature of an image-side surface of the second negative lens in the first lens unit.

14. An image forming optical system comprising in order from an object side:
a first lens unit having a negative refractive power;
a second lens unit having a positive refractive power;
a third lens unit having a negative refractive power; and
a fourth lens unit having a positive refractive power, wherein
at the time of zooming, distances between adjacent lens units change, and
at the time of zooming from a wide angle end to a telephoto end, the first lens unit, after moving toward an image side, moves toward the object side, and a second lens unit moves only toward the object side, and
a lens component is one of a single lens and a cemented lens, and
the first lens unit consists of a first negative lens, a second negative lens, and a positive lens in order from the object side, and
the second lens unit comprises in order from the object side, a first lens component and a second lens component, and
a total number of lens components included in the second lens unit is two, and
the first lens component either consists of a positive single lens, or consists of a cemented lens in which, a positive lens and a negative lens are cemented in order of the positive lens and the negative lens, and
the second lens component consists of a cemented lens, and
the third lens unit consists of either one lens or two lenses as a whole, and comprises a lens having an absolute value of a curvature of a surface on the image side larger than an absolute value of a curvature of a surface on the object side, which is disposed nearest to the object side, and
the fourth lens unit consists of one positive lens component, wherein
the following conditional expression (14) is satisfied:

$$-0.1 < R_{1pF}/R_{12nR} < 1 \quad (14)$$

where, $R_{1pF}$ denotes a paraxial radius of curvature of an object-side surface of the positive lens in the first lens unit, and $R_{12nR}$ denotes the paraxial radius of curvature of the image-side surface of the second negative lens in the first lens unit.

15. An image forming optical system comprising in order from an object side:
a first lens unit having a negative refractive power;
a second lens unit having a positive refractive power;
a third lens unit having a negative refractive power; and
a fourth lens unit having a positive refractive power, wherein
at the time of zooming, distances between adjacent lens units change, and
at the time of zooming from a wide angle end to a telephoto end, the first lens unit, after moving toward an image side, moves toward the object side, and a second lens unit moves only toward the object side, and
a lens component is one of a single lens and a cemented lens, and
the first lens unit consists of a first negative lens, a second negative lens, and a positive lens in order from the object side, and
the second lens unit comprises in order from the object side, a first lens component and a second lens component, and
a total number of lens components included in the second lens unit is two, and
the first lens component either consists of a positive single lens, or consists of a cemented lens in which, a positive lens and a negative lens are cemented in order of the positive lens and the negative lens, and
the second lens component consists of a cemented lens, and
the third lens unit consists of either one lens or two lenses as a whole, and comprises a lens having an absolute value of a curvature of a surface on the image side larger than an absolute value of a curvature of a surface on the object side, which is disposed nearest to the object side, and
the fourth lens unit consists of one positive lens component, wherein
the following conditional expression (15) is satisfied:

$$0.1 < d_{112}/f_w < 0.7 \quad (15)$$

where, $d_{112}$ denotes an air space on an optical axis between the first negative lens and the second negative lens in the first lens unit, and $f_w$ denotes a focal length of the overall image forming optical system at a wide angle end.

16. An image forming optical system comprising in order from an object side:
a first lens unit having a negative refractive power;
a second lens unit having a positive refractive power;
a third lens unit having a negative refractive power; and
a fourth lens unit having a positive refractive power, wherein
at the time of zooming, distances between adjacent lens units change, and
at the time of zooming from a wide angle end to a telephoto end, the first lens unit, after moving toward an image side, moves toward the object side, and the second lens unit moves only toward the object side, and
a lens component is one of a single lens and a cemented lens, and
the first unit comprises in order from the object side, a negative lens and a positive lens, and
a total number of lenses included in the first lens unit is two, and the second lens unit comprises in order from the object side, a first lens component and a second lens component, and a total number of lens components included in the second lens unit is two, and the first lens component either consists of a positive single lens, or consists of a cemented lens in which, a positive lens and a negative lens are cemented in order of the positive lens and the negative lens, and the second lens component consists of a cemented lens, and the third lens unit consists of either one lens or two lenses as a whole, and comprises a lens having an absolute value of a curvature of a surface on the image side larger than an absolute value of a curvature of a surface on the object side, which is disposed nearest to the object side, and the fourth lens unit consists of one positive lens component, and the following conditional expressions (1') is satisfied:

$$-100 < (R_{21F} + R_{21R})/(R_{21F} - R_{21R}) < -0.75 \quad (1')$$

where, $R_{21F}$ denotes a paraxial radius of curvature of a surface nearest to an object of the first lens component, $R_{21R}$ denotes a paraxial radius of curvature of a surface nearest to an image of the first lens component.

17. An electronic image pickup apparatus comprising:

an image forming optical system according to claim 16; and an image pickup element which has an image pickup surface.

* * * * *